US008046799B2

(12) United States Patent
Noble

(10) Patent No.: US 8,046,799 B2
(45) Date of Patent: Oct. 25, 2011

(54) DAYPART BASED NAVIGATION PARADIGM

(75) Inventor: Taber B. Noble, Palos Verdes Estates, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 2415 days.

(21) Appl. No.: 09/818,230

(22) Filed: Mar. 27, 2001

(65) Prior Publication Data

US 2002/0188944 A1 Dec. 12, 2002

Related U.S. Application Data

(60) Provisional application No. 60/253,303, filed on Nov. 27, 2000.

(51) Int. Cl.

| | |
|---|---|
| ***H04N 5/445*** | (2011.01) |
| ***G06F 13/00*** | (2006.01) |
| ***G06F 3/00*** | (2006.01) |

(52) U.S. Cl. .............................. 725/52; 725/39; 725/42

(58) Field of Classification Search .................... 725/39, 725/42, 52

See application file for complete search history.

(56) References Cited

U.S. PATENT DOCUMENTS

| | | | | |
|---|---|---|---|---|
| 5,880,768 | A | 3/1999 | Lemmons et al. | |
| 6,005,565 | A * | 12/1999 | Legall et al. | 715/721 |
| 6,075,575 | A | 6/2000 | Schein et al. | |
| 6,177,931 | B1 * | 1/2001 | Alexander et al. | 725/52 |
| 6,219,839 | B1 * | 4/2001 | Sampsell | 725/40 |
| 6,233,389 | B1 | 5/2001 | Barton et al. | |
| 6,268,849 | B1 * | 7/2001 | Boyer et al. | 725/40 |
| 6,330,610 | B1 | 12/2001 | Docter et al. | |
| 6,463,585 | B1 | 10/2002 | Hendricks et al. | |
| 6,698,020 | B1 | 2/2004 | Zigmond et al. | |
| 6,718,551 | B1 | 4/2004 | Swix et al. | |
| 2001/0003845 | A1 | 6/2001 | Tsukamoto et al. | |
| 2002/0129362 | A1 | 9/2002 | Chang et al. | |

FOREIGN PATENT DOCUMENTS

EP 0 963 109 A1 12/1999

(Continued)

OTHER PUBLICATIONS

Michael Robin et al., *Digital Television Fundamentals—Design and Installation of Video and Audio Systems*, McGraw-Hill, Chapter 8, title page(s) and pp. 345-425, 1998.

(Continued)

*Primary Examiner* — Hunter Lonsberry

(57) ABSTRACT

A method, apparatus, article of manufacture, and a memory structure for providing media program information to a user is disclosed. The method comprises the steps of accepting a command to provide a menu guide from a plurality of menu guides defining a media program information space segmented by a daypart, wherein the menu guide is associated with a first daypart, and providing a menu guide comprising a menu guide content portion presenting at least some of the media program information. The apparatus comprises a receiver having a tuner for receiving the media program and the media program information, a processor, communicatively coupled to the tuner for providing a menu guide having a menu guide content portion presenting at least some of the media program information, wherein the menu guide is selectable from a plurality of menu guides together defining a program information space segmented by a daypart. The foregoing daypart-based presentation of the media program information provides for an efficient use of display space by initially providing information programs the user is likely to be interested in, while still permitting the user to intuitively navigate to other media program information as well.

114 Claims, 55 Drawing Sheets

FOREIGN PATENT DOCUMENTS

| | | | |
|---|---|---|---|
| WO | WO 97/13368 | | 4/1997 |
| WO | 97/30547 | A1 | 8/1997 |
| WO | 99/65242 | A1 | 12/1999 |
| WO | 0021287 | A1 | 4/2000 |
| WO | 0110115 | A1 | 2/2001 |

OTHER PUBLICATIONS

EPO Communication dated Apr. 7, 2009 in European Patent Application No. 01128048.4 filed Nov. 26, 2001 by Taber B. Noble.

Non-final Office Action dated Jul. 20, 2009 in U.S. Appl. No. 10/046,841, filed Jan. 15, 2002 by Taber B. Noble et al.

Final Rejection dated Feb. 23, 2010 in U.S. Appl. No. 10/046,841, filed Jan. 15, 2002 by Taber B. Noble et al.

EPO Communication dated Jun. 30, 2010 in European Patent Application No. 01128048.4 filed Nov. 26, 2001 by Taber B. Noble.

EPO Communication dated Nov. 29, 2010 in European Patent Application No. 01128048.4 filed Nov. 26, 2001 by Taber B. Noble.

* cited by examiner

DAYPART BASED NAVIGATION PARADIGM

CROSS-REFERENCE TO RELATED APPLICATIONS

This application claims benefit of U.S. Provisional Patent Application No. 60/253,303, entitled "DAYPART BASED NAVIGATION PARADIGM," by Taber B. Noble, filed Nov. 27, 2000, which application is hereby incorporated by reference herein.

BACKGROUND OF THE INVENTION

1. Field of the Invention

The present invention relates to systems and methods for presenting data regarding media programs to subscribers, and in particular to a method and apparatus for navigating media program information based on a daypart paradigm.

2. Description of the Related Art

Program guides for television programming are known in the art. A common method for obtaining television programming information is by consulting paper television programming guides or schedules. This method of disseminating information, however, has limitations. A paper guide may become obsolete or a schedule may change, rendering the paper copy useless. Additionally, the paper schedule may easily be lost.

Electronic program guides have been used to alleviate some of the limitations of paper. One example is a cable system that provides a continuous feed of guide information to a dedicated television channel. The channel displays continuous program listings. The continuous nature of the link allows the guide to be updated and reflect current scheduling information. An alternate method of providing guide content is to send it, along with program content, through satellite transmissions to receiving stations.

Typically, electronic program guides are based around the use of a scheduling grid. This grid typically involves one axis that corresponds to time and another axis that corresponds to transmission channels. At the intersection of each channel and time slot is a "cell" which typically displays the title of the program that is being shown on that channel at that time.

The number of media programs available to the consumer has been increasing dramatically. As a result, on screen guide information density is increasing exponentially as well. Due largely to resolution limitations, conventional scheduling grids are ill suited to present the increased number of available media programs to the user in a meaningful way. For example, as a general rule, any information provided in a program guide should be legible when presented on a 19 inch NTSC television with 250 scan lines of resolution at a distance of 15 feet. This substantially limits the amount of information that can be presented at one time. Such limitations are especially problematic for scheduling grids, because the grids present information the viewer is not interested in (channels time slots that are not of interest), and not enough information about what the viewer is interested in (more detailed information about future broadcasts on the current channel or other channels).

Current grid guides, especially those that incorporate a PIG or "picture in guide" suffer as channel capacity and therefore information density increases. Reduced screen real estate brought on by the video window results in limited viewable time line (1.5 hrs ahead is typical), limited channel display area, limited space for program descriptions, limited overall legibility and cumbersome navigation. All of these factors negatively impact the real world usefulness of a grid guide.

When taken on whole, a "snap shot" of the most sophisticated grid guide exhibits a remarkable lack of useful information. In many cases, program titles in the grid are reduced to single words making them unidentifiable unless highlighted. System latencies slow the highlighting process. Program descriptions are displayed one at a time. Incorporating advertising, whether in the grid or blocked along side will impact the information capacity even further.

Also, if a user wishes to determine what programs will be available on a particular channel two hours in the future, the user must typically scroll through a number of screens to obtain this information. Then, after the user has done so, the information presented by the scheduling grid is minimal at best, and shared with other programs that are not of interest (i.e. those broadcast on other channels).

One way of overcoming the space limitations is to reduce guide fonts. However, this increases visual clutter and decreases legibility. Cumbersome and complex graphic "animations" must be employed to display second level information in the limited screen real estate. Current attempts to overcome these limitations try to cram ever more complex information display metaphors into less space with the result being more equaling less.

U.S. Pat. No. 6,075,575, issued to Schein et al. on Jun. 13, 2000, for example, shows a typical grid-based program guide. While the program guide permits the user to view a wide range of information, it still suffers the same limitations as the grid guides of old in that it presents information that the user is not interested in and does not present information that the user is likely to be interested in. The resulting waste of display real estate requires the user to pass through a maze of complicated commands with far more user inputs than is really necessary.

What is needed is a user interface that displays information in a way that presents information the user is interested in, and which does not waste screen space presenting information of no interest. What is also needed is a new information and navigation paradigm that streamlines the accessing, manipulating, and sorting of guide data related to broadcast, stored and streamed video and interactive service offerings.

The present invention satisfies that need.

SUMMARY OF THE INVENTION

To address the requirements described above, the present invention discloses a method, apparatus, article of manufacture, and a memory structure for providing media program information to a user.

This is accomplished by presenting media information according to a context that takes viewer habits and proclivities into account. In one embodiment, the invention makes use of broadcasting "daypart" or general time of day programming category as the broad filtering mechanism to organize guide and video information. The "daypart" paradigm is particularly useful in situations where viewers tend to watch television at the same time each day. For instance, a viewer who works during the day tends to watch television at night during prime time. Programming providers and advertisers tend to target their limited resources in both available airtime time and media dollars in order to target that viewer effectively.

The paradigm organizes the available and pertinent program guide information according to convenient categories such as dayparts, and targets or parses it in a similar fashion. It focuses the vast pool of data that makes up the on air guide by imposing filtering that is based on the current daypart the viewer is residing in. It gives the user only the data they need exactly when they need it. For illustrative purposes of this disclosure, dayparts can be defined as follows: ( )=daypart name displayed by the guide.

| Time of Day | Actual Daypart Name | Name Displayed by Guide |
|---|---|---|
| 6:00 AM-10:00 AM | Morning | Today |
| 10:00 AM-4:00 PM | Daytime | Today |
| 4:00 PM-8:00 PM | Fringe | This or 'DAYNAME' Evening |
| 8:00 PM-12:00 PM | Primetime | Tonight |
| 12:00 PM-2:00 AM | Late Night | Late Night |
| 2:00 AM-6:00 AM | Early Morning | Early Morning |

The invention employs a lexicon of broadcasting and on air promotion used in linearly televised content and applies it as a navigation tool to a fully interactive and dynamic non-linear environment. The invention applies program categorizations as navigation tools to a fully interactive, dynamic, and non-linear environment. These categorizations can be made consistent with lexicons used in broadcasting and on-air promotion. In one embodiment, program instances are based on cross-references to dayparts indicating where the system is currently in real time. The present invention can be implemented in next-generation integrated receiver/decoders (IRDs) and set-top boxes to assemble and package, in real time, menu based programming lineup information, tailored to the daypart the viewer is in, in a brandable, user configurable fashion.

The menu guide paradigm described herein enhances the amount of useful, usable, navigable and program pertinent information it is possible to display in an interactive NTSC-based environment. This is accomplished through development of this vastly more scalable, integrated user interface.

The present invention has numerous advantages over grid or spreadsheet-based on-screen programming guides and their variations.

First, the invention separates guide data and multimedia content into multi-dimensional "information planes" that configure their internal content relative to the channel space and time placement perspective of the viewer/user. These planes can, as in this example, contain programming information configured in daypart context for the viewer. That is, by default, the viewer is first presented with programming information filtered by the current time period of the broadcast day or "daypart". This initial contextualization of the information bases the ensuing navigation path and parsing of guide information directly on the fundamental viewing habits of individual users.

It allows viewers to find, manage and access linear and non-linear (transmitted, streamed or stored) programming from a single unified interface. That is, all available video media and interactive assets on the service or stored in the IRD are brought into one seamless content manager. This integrates broadcast content with personal video recorder (PVR) based video content, interactive services, enhanced broadcast layers and other technologies. The result is a program guide that is seamless, fully integrated and, most importantly, intuitive, and user friendly. These user interfaces carry channel information, branding information, advertising, programming specific information, scheduling, and include a control interface for PVR functionality.

The present invention allows more useful program information to be displayed at any given time. Channels surfed within the menu guide metaphor display full titles and abbreviated content descriptions five or six programs at a time going forward up to six hours or one full daypart. This is accomplished without scrolling or the need to highlight or cursor over each individual title as in current grids in order to see a single, abbreviated program description. By contrast, grid or spreadsheet guides display channels five or six at a time with ONE highlighted description visible. This is typically across a time line of only 1.5 hours. Individual titles are often abbreviated within these grids to the point of being unidentifiable requiring the user to highlight the item.

Channel menu guide lineups for each daypart can be displayed as fast as the channel selector can be scrolled. That is, at every screen refresh, the menu guide displays five or six titles with descriptions at a time. Therefore, more programming selections can be viewed in the same given time spent using the guide function.

Similarly, while going forward in time within the context of the current daypart, the menu guide displays five or six titles with descriptions at a time, whole days at a time. By example, a channel's entire prime time schedule for a full week can be displayed in seven clicks, as fast as the system can update. This is not possible with a grid-based guide.

Each individual menu guide page or plane can be developed into an alternative revenue stream by providing channel branding opportunities for the channel or content provider.

Advertising is appropriately placed in a setting tied to the channel content provider.

The menu guide design reduces on screen clutter by accepting advertisements in an integrated fashion. It avoids the displacement of program information resulting from placing ads in current grid guides.

The menu guide design contextualizes the advertisements. In doing so eliminates the possibility of on-screen ad "conflicts". Example: A paid ad for CNN sharing screen space with a "free" NBC Nightly News program. Or an interactive CHEER ad on the same screen as a TIDE sponsored program. This would be a distinct possibility with grid guides as they are currently implemented. The menu guide places the onus on the content provider to draw viewers to and take ownership of the ads. The menu guide allows for advertisers to purchase inventory by day, daypart or by individual program. The menu guide also allows for "click through" to deeper ad content without leaving the navigation paradigm. The menu guide also brings under utilized features such as "power user" functions such as channel, category and genre sorting features to the top level of the interface. It also allows Fourteen-day guide management, especially as it relates to integrating personal video recorder (PVR) functionality, to become viable for the user. Further, the menu guide paradigm allows for larger screen fonts and reduces screen clutter.

Unlike the spread sheet format of grid guides, the menu guide places the visual display reference point, the look and feel, firmly in the television idiom by displaying interactive information in a form the viewer is accustomed to seeing on linear television. Virtual channels and other interactive services can be seamlessly integrated into the paradigm and navigated within the identical structure. This reduces user confusion, increases comfort level and therefore increases frequency of use.

Because of it's daypart based nature, the menu guide paradigm allows for the unique ability to display all the programming that is available, pertinent to the daypart selected, sorted by channel, up to eighteen programs at a time to the viewer. This ability display "what's on now" or "what's on next, tonight, tomorrow night". etc can be accomplished only through the use of the filtering imposed by the daypart paradigm this invention employs to re-order, filter and parse program information data.

Finally, the present invention can be easily implemented with a simple user input device.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
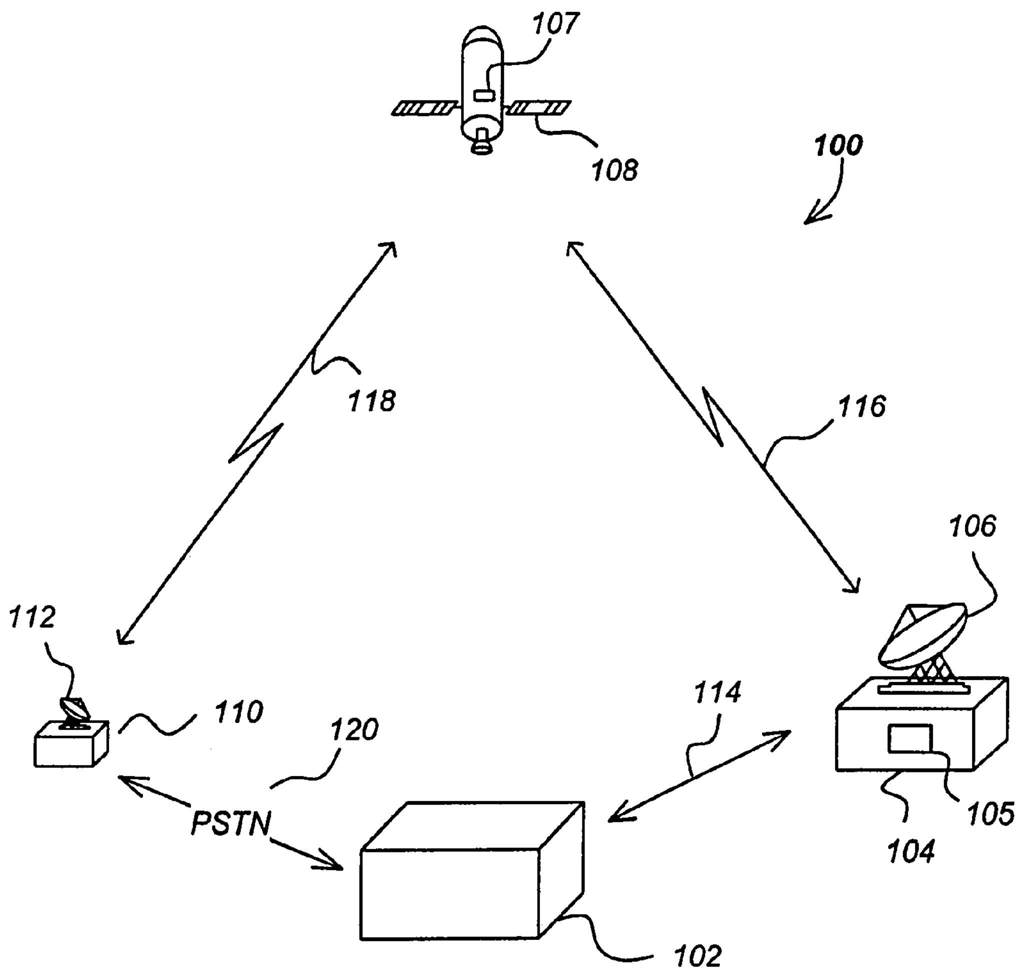
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground link 114 and with a subscriber 110 via a public switched telephone network (PSTN) or other link 120. The control center 102 provides program material to the uplink center 104, coordinates with the subscribers 110 to offer pay-per-view (PPV) program services, including billing and associated decryption of video programs.

The uplink center receives program material and program control information from the control center 102, and using an uplink antenna 106 and transmitter 105, transmits the program material and program control information to the satellite 108. The satellite receives and processes this information, and transmits the video programs and control information to the subscriber via downlink 118 using transmitter 107. The subscriber 110 receiving station receives this information using the subscriber antenna 112.

In one embodiment, the subscriber antenna 112 is an 18-inch slightly oval-shaped Ku-band antenna. The slight oval shape is due to the 22.5 degree offset feed of the LNB (low noise block converter) which is used to receive signals reflected from the subscriber antenna 112. The offset feed positions the LNB out of the way so it does not block any surface area of the antenna 112 minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information as well.

Uplink Configuration

Figure 2:
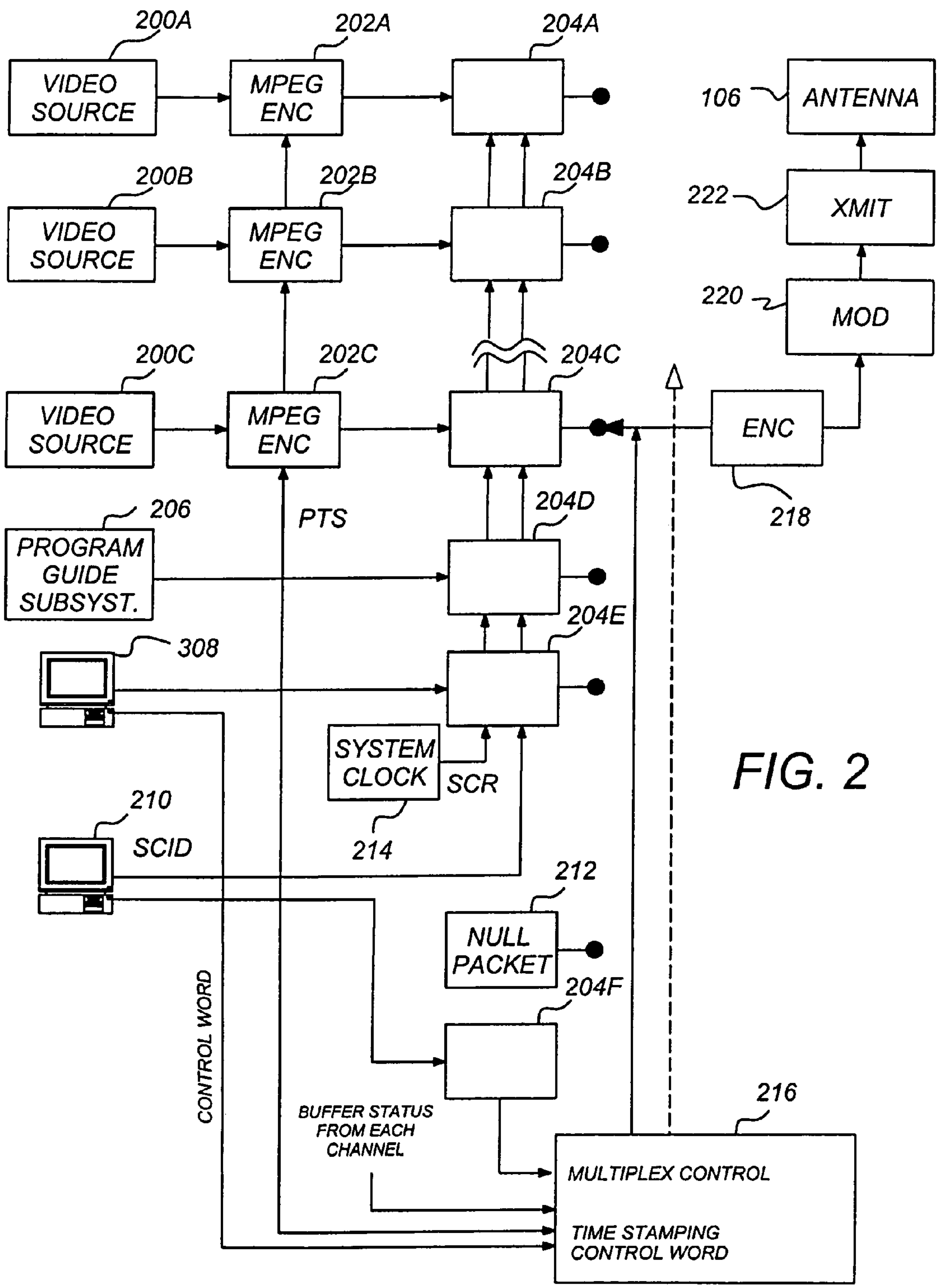
FIG. 2 is a block diagram of an integrated receiver/decoder for practicing the present invention.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a program guide subsystem 206.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 (SCR), and from the conditional access manager 208, which provides the SCID to the packetizers 204 for use in generating the data packets. These data packets are then multiplexed into serial data and transmitted.

Program Guide Subsystem

Figure 3:
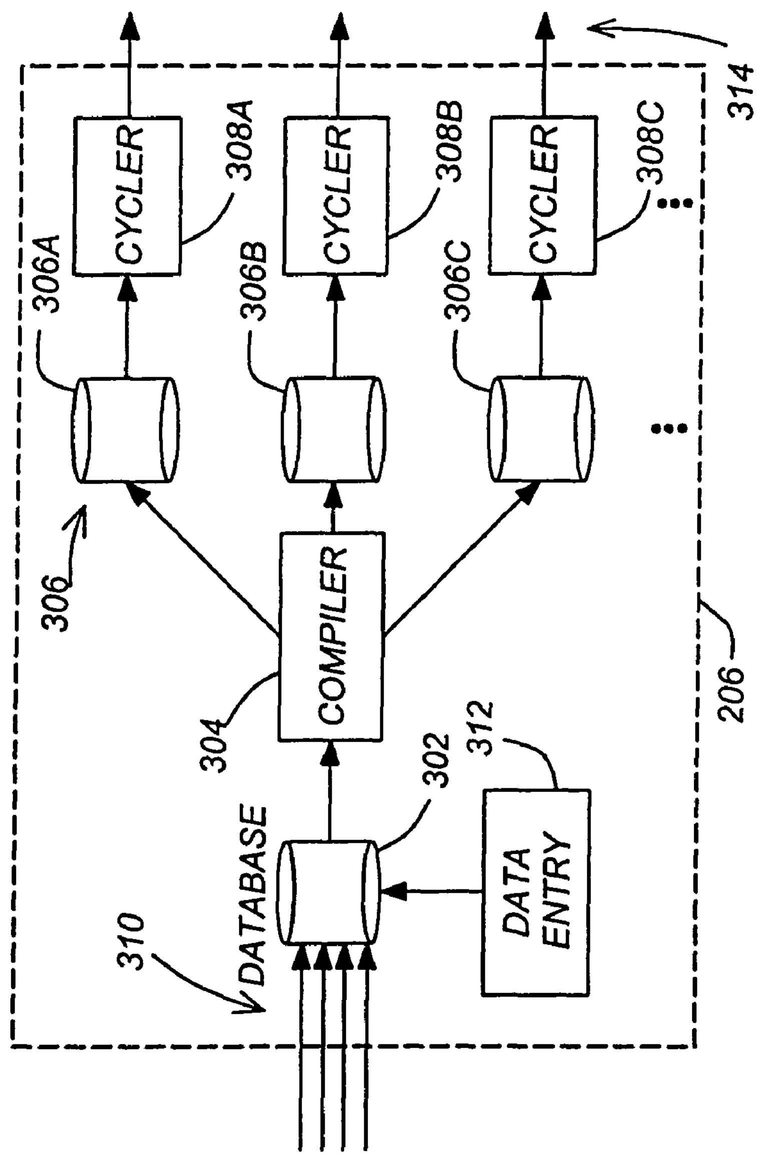
FIG. 3 is a block diagram showing a typical uplink configuration showing how video program material is uplinked to a satellite for transmission to subscribers using a single transponder.

FIG. 3 is a block diagram of one embodiment of the program guide subsystem 206. The program guide data transmitting system 206 includes program guide database 302, compiler 304, sub-databases 306A-306C (collectively referred to as sub-databases 306) and cyclers 308A-308C (collectively referred to as cyclers 308).

Schedule feeds 310 provide electronic schedule information about the timing and content of various television channels, such as that found in television schedules contained in newspapers and television guides. Schedule feeds 310 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines to program guide database 302. These companies provide television schedule data for all of the television stations across the nation plus the nationwide channels, such as SHOWTIME, HBO, and the DISNEY CHANNEL. The specific format of the data that are provided by these companies varies from company to company. Program guide database 302 preferably includes schedule data for televisions channels across the entire nation including all nationwide channels and local channels, regardless of whether the channels are transmitted by the transmission station.

Program guide database 302 is a computer-based system that receives data from schedule feeds 310 and organizes the data into a standard format. Compiler 304 reads the standard form data out of program guide database 302, identifies common schedule portions, converts the program guide data into the proper format for transmission to users (specifically, the program guide data are converted into objects as discussed below) and outputs the program guide data to one or more of sub-databases 308.

Program guide data are also manually entered into program guide database 302 through data entry station 312. Data entry station 312 allows an operator to enter additional scheduling information, as well as combining and organizing data supplied by the scheduling companies. As with the computer organized data, the manually entered data are converted by the compiler into separate objects and sent to one or more of sub-databases 306.

The program guide objects are temporarily stored in sub-databases 306 until cyclers 308 request the information. Each of cyclers 308 preferably transmits objects at a different rate than the other cyclers 308. For example, cycler 308A may transmit objects every second, while cyclers 308B and 308C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown in 12 hours or more. Thus, the program guide objects for the most current programs are sent to a cycler 308 with a high rate of transmission, while program guide objects for later programs are sent to cyclers 308 with a lower rate of transmission. All of the objects output by the plurality of cyclers 308 are combined as depicted in FIG. 2.

Broadcast Data Stream Format and Protocol

Figure 4A:
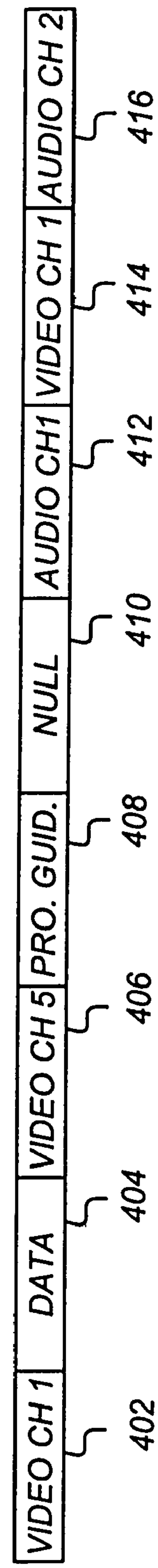
FIG. 4 is a diagram showing further details regarding the program guide subsystem.

FIG. 4A is a diagram of a representative data stream. The first packet segment 402 comprises information from video channel 1 (data coming from, for example, the first video program source 300A). The next packet segment 404 comprises computer data information that was obtained, for example from the computer data source 306. The next packet segment 406 comprises information from video channel 5 (from one of the video program sources 300), and the next packet segment includes information from video channel 1 (again, coming from the first video program source 300A). The next packet segment 408 comprises program guide information such as the information provided by the program guide subsystem 206.

The data stream therefore comprises a series of packets from any one of the data sources in an order determined by the controller 316. The data stream is encrypted by the encryption module 318, modulated by the modulator 320 (typically using a QPSK modulation scheme), and provided to the transmitter 322, which broadcasts the modulated data stream on a frequency bandwidth to the satellite via the antenna 106. The receiver 200 receives these signals, and using the SCID, reassembles the packets to regenerate the program material for each of the channels. As shown in FIG. 4A, null packets created by the null packet module 312 may be inserted into the data stream as desired.

Figure 4B:
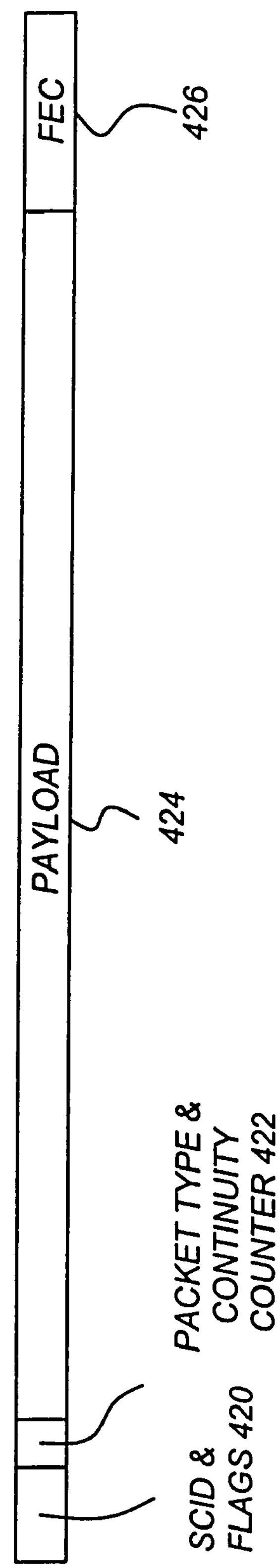

FIG. 4B is a diagram of a data packet. Each data packet (e.g. 402-416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 422 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 424 comprises 127 bytes of payload data, which is a portion of the video program provided by the video program source 300. The final packet segment 426 is data required to perform forward error correction.

Integrated Receiver/Decoder

Figure 5:
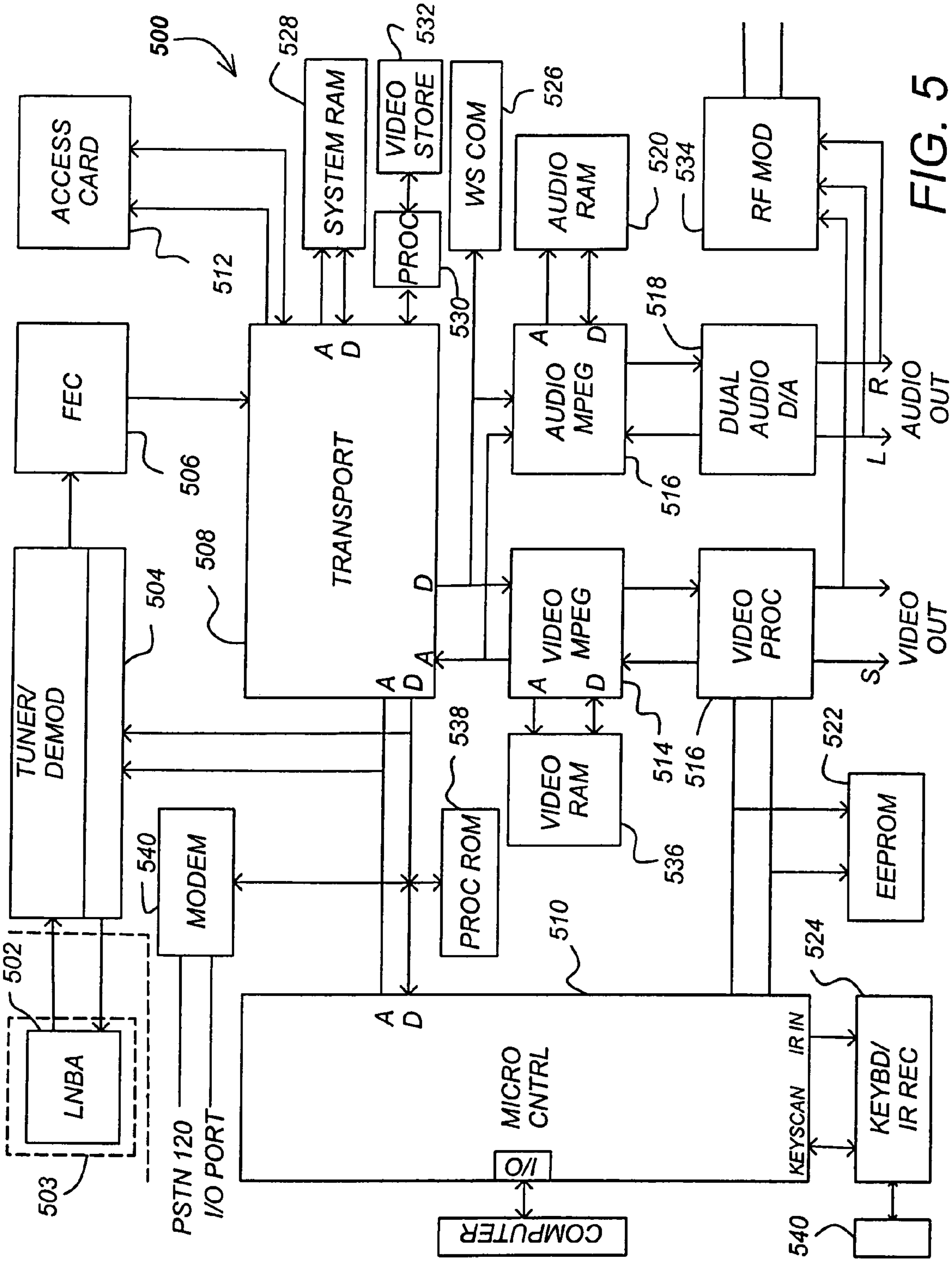
FIG. 5A is a diagram of a representative data stream received from a satellite.
FIG. 5B is a diagram illustrating the structure of a data packet.

FIG. 5 is a block diagram of an integrated receiver/decoder (IRD) 500 (also hereinafter alternatively referred to as receiver 500). The receiver 500 comprises a tuner/demodulator 504 communicatively coupled to an outdoor unit (ODU) 503 having one or more low noise block converters (LNB) 502. The LNB 502 converts the 12.2- to 12.7 GHz downlink 118 signal from the satellites 108 to, e.g., a 950-1450 MHz signal required by the receiver's 500 tuner/demodulator 504. The LNB 502 may provide either a dual or a single output. The single-output LNB 502 has only one RF connector, while the dual output LNB 502 has two RF output connectors and can be used to feed a second receiver or some other form of distribution system.

The tuner/demodulator 504 isolates a single, digitally modulated 24 MHz transponder, and converts the modulated data to a digital data stream. The digital data stream is then supplied to a forward error correction (FEC) decoder 506. This allows the receiver 500 to reassemble the data transmitted by the uplink center 104 (which applied the forward error correction to the desired signal before transmission to the subscriber 110) verify that the correct data signal was received, and correct errors, if any. The error-corrected data may be fed from the FEC decoder module 506 to the transport module via an 8-bit parallel interface.

The transport module 508 performs many of the data processing functions performed by the receiver 500. The transport module 508 processes data received from the FEC decoder module 506 and provides the processed data to the video MPEG decoder 514 and the audio MPEG decoder 516. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microcontroller 510 and the video and audio MPEG decoders 514, 516. As set forth more fully hereinafter, the transport module also works with the access card 512 to determine whether the subscriber 110 is permitted to access certain program material. Data from the transport module can also be supplied to external communication module 526.

The access card 512 functions in association with other elements to decode an encrypted signal from the transport module 508. The access card 512 may also be used for tracking and billing these services. In one embodiment of the present invention, the access card is a smart card, having contacts cooperatively interacting with contacts in the receiver 500 to pass information. In order to implement the processing performed in the access card 512, the receiver 500, and specifically the transport module 508 provides a clock signal to the access card 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if ATSC high definition programming is processed.

Audio data is likewise decoded by the MPEG audio decoder 516. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example multi-channel digital audio formats, such as DOLBY DIGITAL AC-3.

A description of the processes performed in the encoding and decoding of video streams, particularly with respect to MPEG and JPEG encoding/decoding, can be found in Chapter 8 of "Digital Television Fundamentals, by Michael Robin and Michel Poulin, McGraw-Hill, 1998, which is hereby incorporated by reference herein.

Microcontroller 510 receives and processes command signals from the remote control 524, a receiver 500 keyboard interface, and/or another input device. The microcontroller receives commands for performing its operations from a processor programming memory, which permanently stores such instructions for performing such commands. The processor programming memory may comprise a read only memory (ROM) 538, an electrically erasable programmable read only memory (EEPROM) or, similar memory device. The microcontroller 510 also controls the other digital devices of the receiver 500 via address and data lines (denoted "A" and "D" respectively, in FIG. 2).

The modem 540 connects to the customer's phone line via the PSTN port 120. It calls e.g. the program provider and transmits the customer's program purchases for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. Video storage device 532 can be a hard disk drive, a read/writable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 output can be directly supplied as a video output to a viewing device such as a video or computer monitor. In addition the video and/or audio outputs can be supplied to an RF modulator 534 to produce an RF output and/or 8 vestigal side band (VSB) suitable as an input signal to a conventional television tuner. This allows the receiver 500 to operate with televisions without a video output.

Each of the satellites 108 comprises a transponder, which accepts program information from the uplink center 104, and relays this information to the subscriber 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the receiver 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map the channel numbers to satellite transponders and service channel identifications (SCIDs), and also provide TV program listing information to the subscriber identifying program events.

Program Guides

Figure 6:
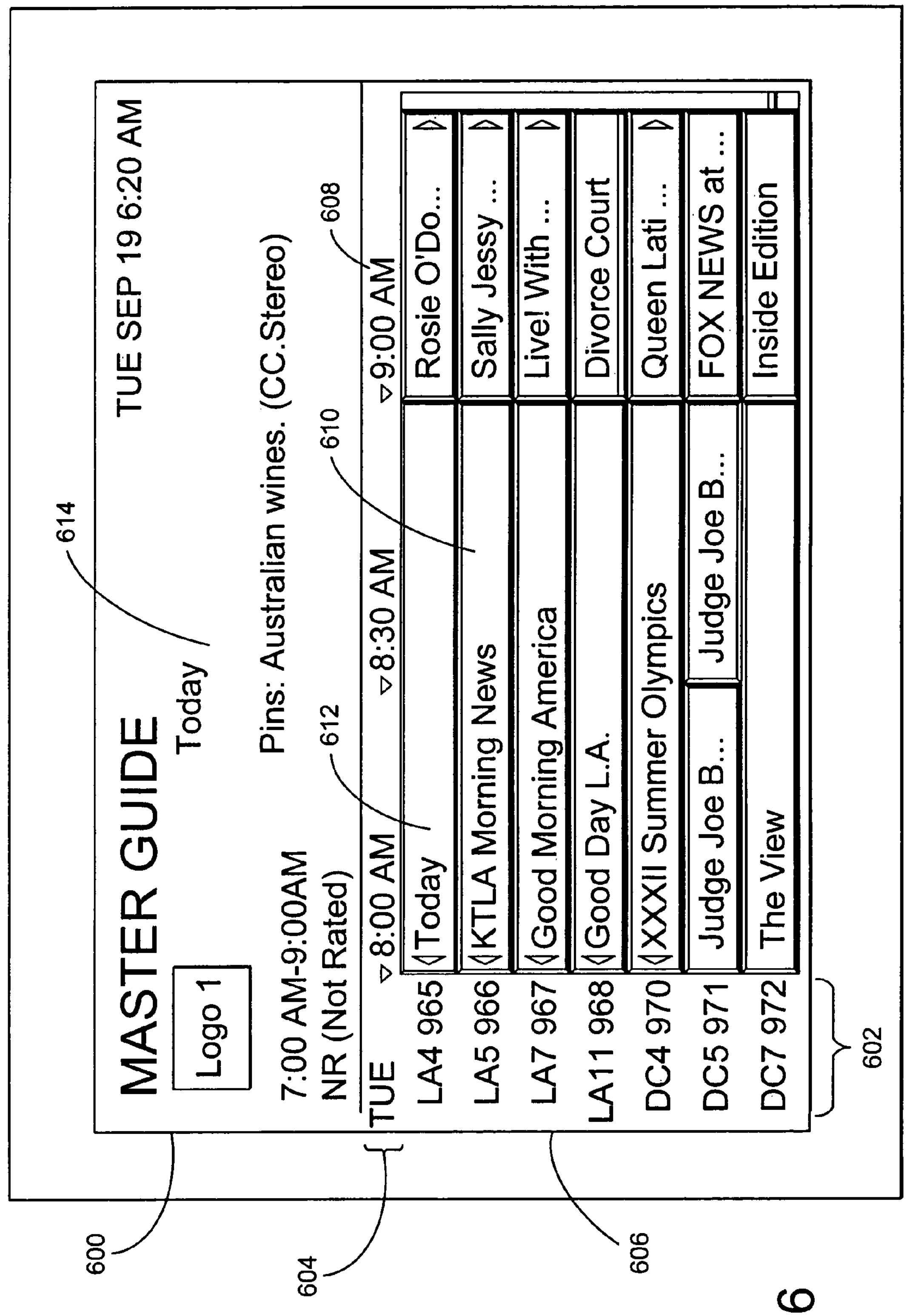
FIG. 6 is a diagram depicting a typical grid-based program guide.

FIG. 6 is a diagram depicting a typical grid-based program guide 600. The grid-based guide 600 includes a plurality of cells 610 arranged by a channel axis 602 and a time axis 604. The channel axis presents a plurality of channels 606 designated by alphanumeric characters and the time axis 604 presents a plurality of time slots 608. The duration of each time slot 608 is selected to be of sufficient resolution so that every program to be depicted in the program guide occupies at least one time slot 608. Typically, the time slot duration is thirty minutes.

Using a remote control 540, the user can designate a selected cell 612. More detailed information regarding the program broadcast during the selected cell 610 is presented in second area 614 of the program guide 600. If the user wants to determine programming for channels not displayed in the grid-based program guide 600, the user selects buttons on the remote control 540 (or the IRD 500) to move the selected cell forward in time or to a different channel. Note that to see what is showing on channel 965 (which corresponds to a local station broadcast to the Los Angeles market on conventional television channel 4) at 10 AM, the user must depress the remote control buttons selecting this function a number of times (or must depress and hold the button for an extended period of time). Note also that if the user wishes to see program guide information regarding programs broadcast in the evening of the same day, a large number of remote control 540 user inputs are required. Also noteworthy is that the grid-based program guide 600 presents a limited number of channels (in the illustration, only seven channels are displayed). This is especially problematic when one considers that the number of channels can approach or exceed 2000. Also, the information provided for each channel is minimal at best, even requiring the use of ellipses and abbreviated titles.

Figure 7:
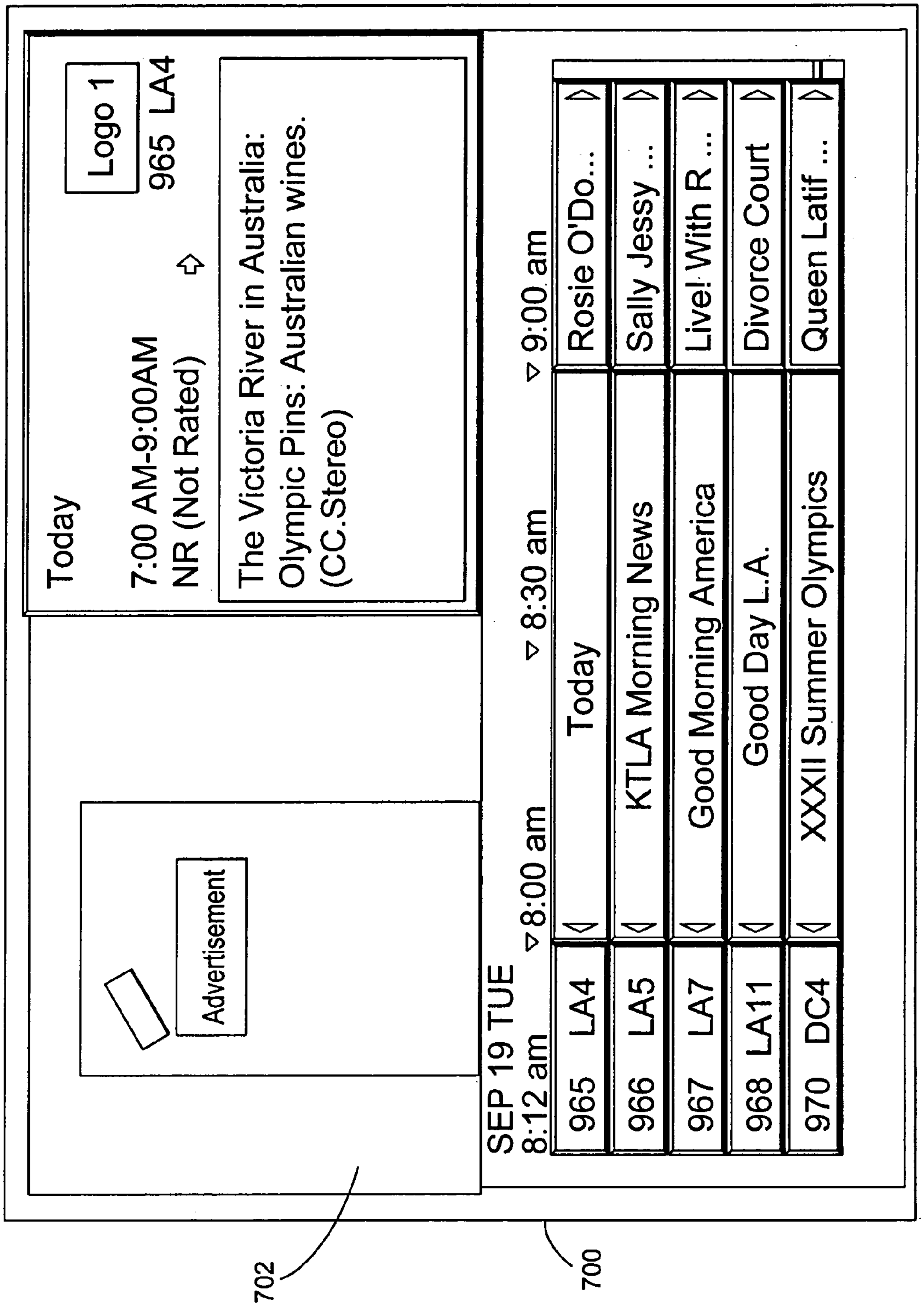
FIG. 7 is a diagram depicting an example of a grid based program guide having advertising content.

FIG. 7 is a diagram depicting an example of a grid-based program guide 700 having advertising content. This grid based program guide has all the disadvantages of the gird-based guide presented in FIG. 6. In addition, the addition of advertising content 702 further reduces the amount of useful information that is presented to the user. For example, the grid based program guide 700 depicted in FIG. 7 presents information regarding only five channels.

Figure 8:
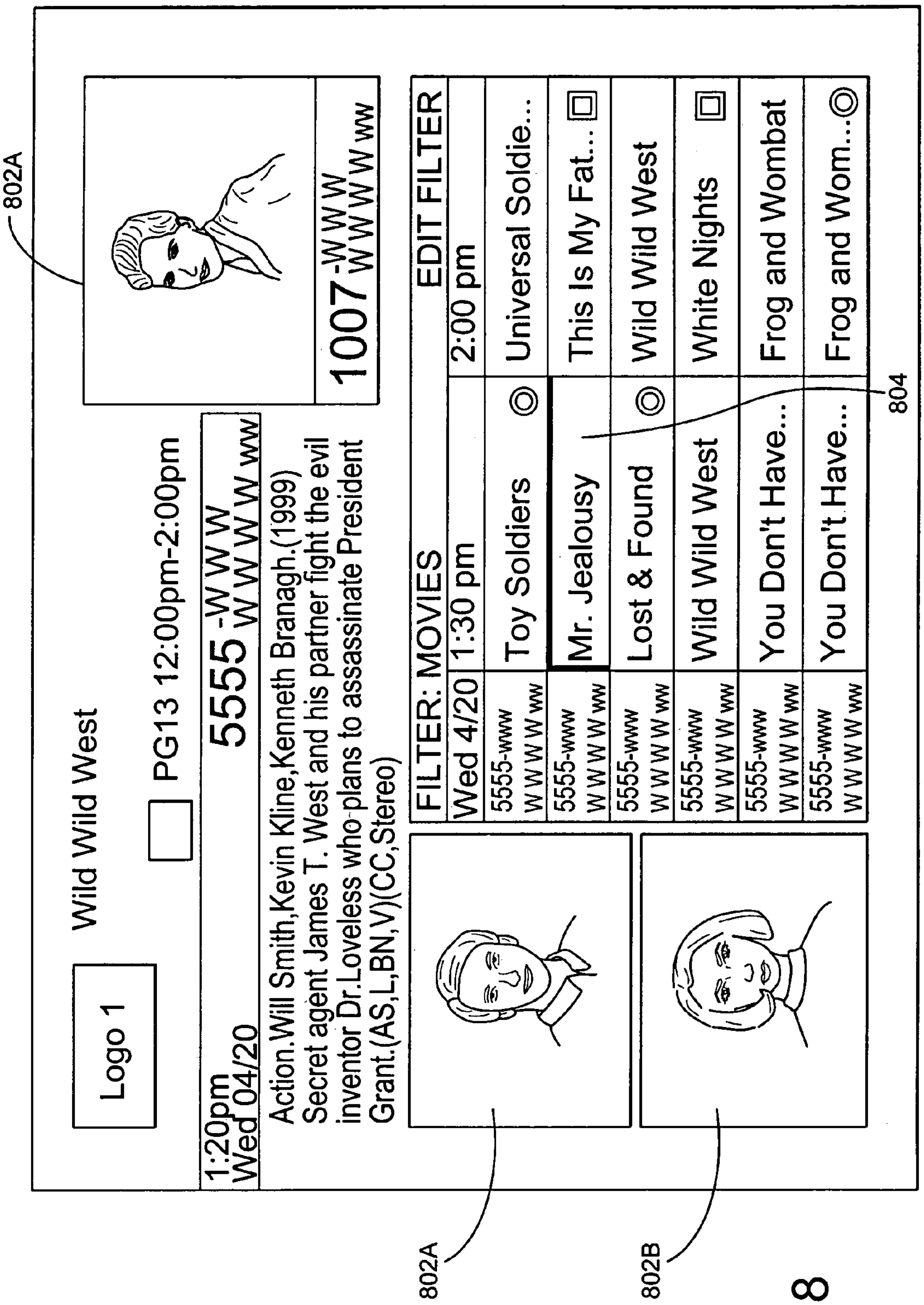
FIG. 8 is diagram depicting another example of a grid-based program guide having advertising content.

FIG. 8 is diagram depicting another example of a grid-based program guide 800, also having advertising content. In this example, the advertising content 802 includes advertising content 802A and advertising content 802B. Note that to keep the text presented in the program guide 800 large enough to be readable on a sufficient number of user's television sets, the amount of text that can be presented in each cell of the program guide is extremely limited, rendering the program guide difficult to use.

As can be seen, the program guides presented in FIGS. 6-8 present the user with information that the user is generally not interested in (channels or programs that are not generally of interest) at the expense of programs and other information which is likely to be useful and desired by the viewer. These difficulties are largely overcome by the present invention, which presents information in the media program information space according to a categorical paradigm better tailored to the viewer's interests than a simple grid-guide. An example of this categorical paradigm is the daypart.

Program Information Space

Figure 9:
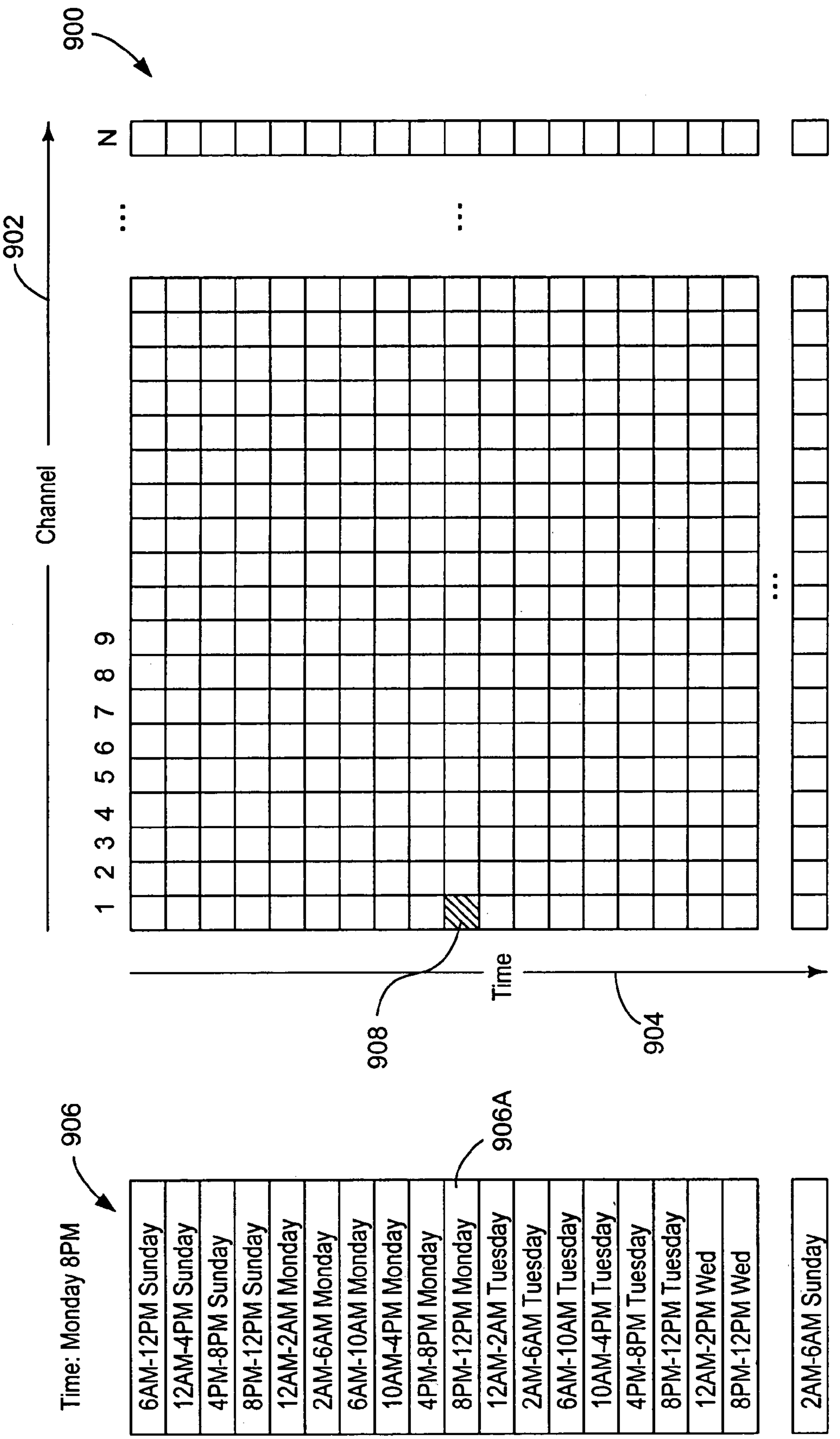
FIG. 9 is a diagram depicting one embodiment of a media program information space.

FIG. 9 is a diagram depicting one embodiment of the media program information space 900. The media information space 900 includes detailed program information for each program (i.e. as may be provided on a particular channel) in particular a particular time period. In the embodiment illustrated in FIG. 9, the time period is one week. However, the media program information space 900 may be two weeks, or may include programming for a time period of any value.

The media program information space 900 includes a channel dimension 902 and a time dimension 904. The time dimension is segmented into dayparts 906.

A daypart 906 is a period of time, typically, but not necessarily periodic over 24 hours, during which viewers characteristically watch programs which are sufficiently related so that an inference may be drawn as to which other programs the viewer would be interested in. In one embodiment, this inference is a time-related inference rather than a content-related inference. The fact that a user has tuned a media program during the daytime daypart provides sufficient information to infer that the user will be interested in program guide information for programs scheduled to be transmitted during that daypart, and it is less likely that the user will be interested in fringe or primetime programming. The use of that inference allows information that is likely to be of interest to be presented intuitively, and information that is not likely to be of interest to not be presented unless requested.

A day may be segmented into dayparts that are not of the same length of time. For example, dayparts can be defined so that the period of time from 6 AM to 10 AM (4 hours) is a first daypart (a morning daypart), the period from 10 AM to 4 PM (6 hours) is a second daypart (a daytime daypart), the period from 4 PM to 8 PM (4 hours) is a third daypart (evening daypart), the period from 8 PM to 12 PM (4 hours) is a fourth daypart (a prime time daypart), the period from 12 AM to 2 AM (2 hours) is a fifth daypart (a late night daypart) and the period from 2 AM to 6 AM (4 hours) is a sixth daypart (an early morning daypart).

Further, daypart organization can change by day. For example, in the embodiment illustrated in FIG. 9, Sunday has been segmented into a 6 hour long daypart (from 6 AM to 12 PM) Sunday, while the corresponding daypart for Monday is 4 hours long (extending from 6 AM to 10 AM). This organization is responsive to viewing patterns which may indicate that viewing habits for typical viewers on Sunday are different than those for Monday. It is also noteworthy that the daypart categorical paradigm can be extended to be adaptive to the viewer's viewing patterns. That is, the present invention can be implemented by recording user viewing patterns, and using these patterns to segment the media program information space 900 into dayparts which accurately reflect viewing patterns for that particular viewer. Further, in embodiments wherein the IRD 500 is aware of the identity of the user (as set forth more fully herein) the daypart organization can also be performed on an user-by user basis, further customizing the presentation of information and assuring that the screen space is efficiently used to present information the viewer is likely to be interested in and to exclude information that the user is not likely to be interested in.

Channels can also be grouped together into channel classifications, if desired. That is, if the user is generally interested primarily in channels 1 and 3, the information regarding programs broadcast on these channels can be combined and presented to the user for a particular daypart. Such channel classifications are hereinafter referred to as channel space segments, and need not include adjacent channels. Similarly, information from multiple dayparts can be combined in the same manner, and as is the case with the channels, combined dayparts need not be adjacent to one another in time.

In the embodiment illustrated in FIG. 9, the current time of day is Monday, and the currently selected channel is Channel 1. Therefore, the portion of the media program information space 900 that has been selected is indicated by block 908. Using the remote control 540 or similar device, the user can scan throughout the media program information space 900, either by channel, by daypart, or as will be seen, by other characteristics.

Menu Guides within the Program Information Space

Figure 10:
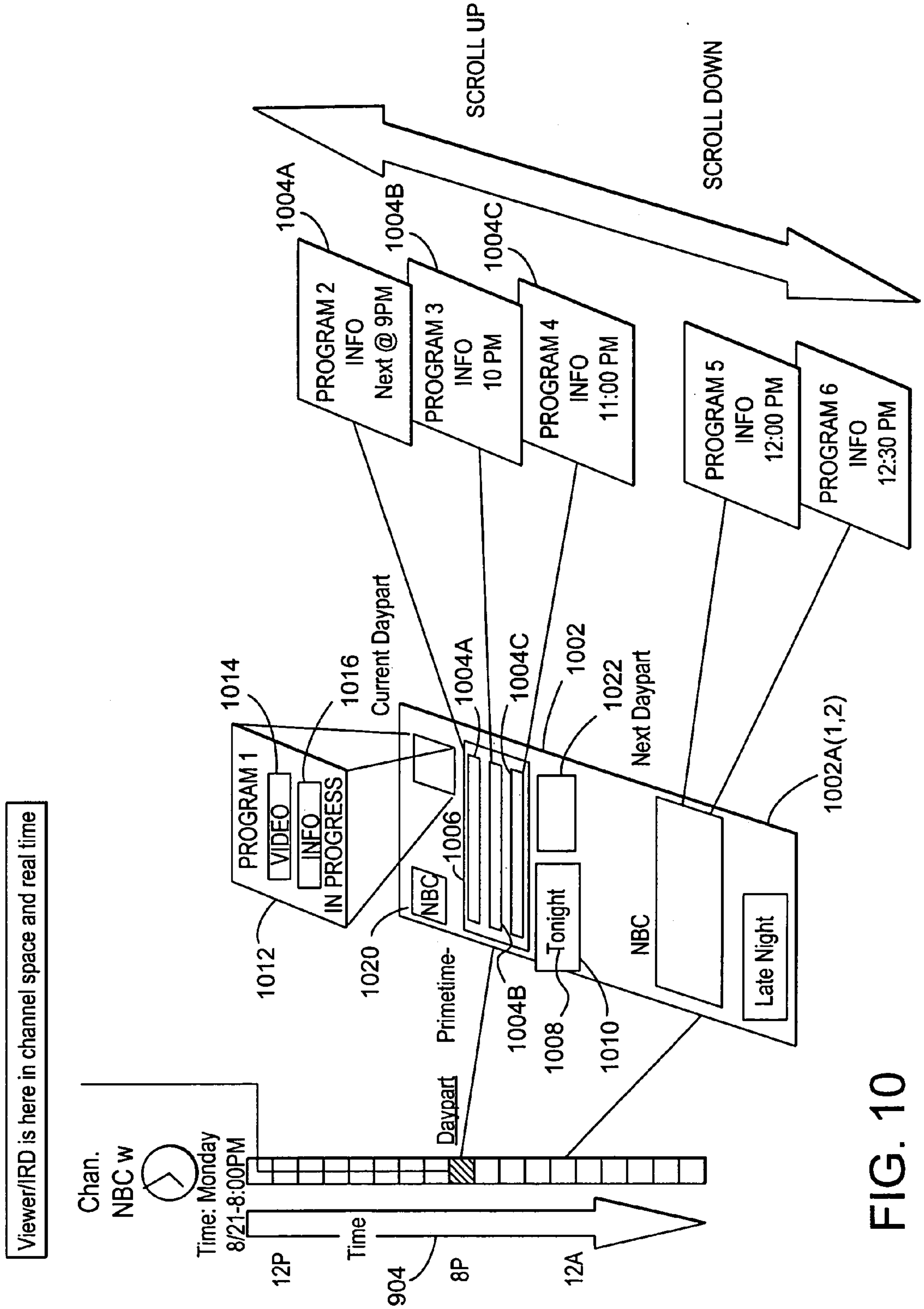
FIG. 10 is a diagram further illustrating the organization and navigation of the media program information space.

FIG. 10 is a diagram further illustrating the organization and navigation of the media program information space 900.

In this illustration, the current time is between 8 PM and 12 midnight, the date is Monday, and the IRD 500 is currently tuned to a channel presenting program material from the National Broadcasting Company (NBC).

When the user selects the program guide when the IRD 500 is tuned to a particular channel, a menu guide 1002 for the current daypart is presented. The menu guide 1002 presents one or more sets of media guide content to the user in a plurality of menu guide portions. The menu guide 1002 includes a menu content portion 1006, which presents a first set of media guide content 1004 including media program guide content regarding a plurality of media programs (including, for example, media program guide content 1004A, media program guide content 1004B, and media program guide content 1004C.

First media program guide content 1004A includes information regarding the next media program to be broadcast on the selected channel (in this case, the currently tuned channel), media program guide content 1004B includes information regarding the next media program to be broadcast on the selected channel, and media program guide content 1004C includes information regarding the media program to be transmitted after the media program described in 1004B.

This technique presents information that the viewer is most likely to be interested in, without presenting information that the viewer is likely not interested in (unless that information is specifically requested). In the foregoing example, in response to a request for the menu guide 1002, the user is provided with information regarding media programs to be transmitted on the currently selected channel for the remainder of the daypart. Since viewing patterns tend to be closely correlated by daypart, this technique provides the viewer with useful information and doesn't waste display space with non-useful information.

In one embodiment, the menu guide 1002 also comprises a channel portion 1020 which indicates the currently selected channel (active channel) and allows the user to select a different channel from among a plurality of selectable channels, if desired.

The daypart corresponding to the displayed media guide content may also presented in the menu guide 1002. In the example illustrated in FIG. 10, the current daypart ("Tonight") is displayed in a menu content description portion 1010 of the menu guide 1002.

The menu guide 1002 may include a picture-in-guide (PIG) portion 1012. The PIG portion 1012 includes a video presentation 1014 of the program transmitted on the channel to which the IRD 500 is currently tuned (e.g the program in process). Additional information 1016 regarding the program in process may also be presented. The current channel or media program provider (in the example shown in FIG. 10, this is NBC) may also be shown in a portion of the menu guide 1002.

The menu guide 1002 may also include an advertising portion 1022, in which advertising content may be presented. Advertising content may be selected in accordance with a variety of criteria. For example, the advertising may be determined by the current channel tuned by the IRD 500, determined according to the menu guide 1022 selections, or other criteria.

Further, the arrangement, shape, and size of the menu guide 1002 portions (e.g. portions 1012, 1022, 1020, and 1006) can be modified as desired in accordance with viewer selections. For example, the size and location of the advertising portion 1022 can be made smaller when screen space is better put to use in presenting as much program information as possible), and larger when the user has selected a particular program for more detailed information. The location and organization of the program guide portions can also be altered or customized by the user to comply with the user's preferences.

Using the remote control 540 or other user input device, the viewer can select the next daypart and other dayparts subsequent to the current daypart. In the illustrated example, the next daypart is the "Late Night" daypart. The menu guide 1002A(1, 2) presented for the late night daypart includes information regarding programs which will be broadcast in the late night daypart, including media program guide content for "program 5" and "program 6".

Accessing and Navigating the Menu Guide

Figure 11B:
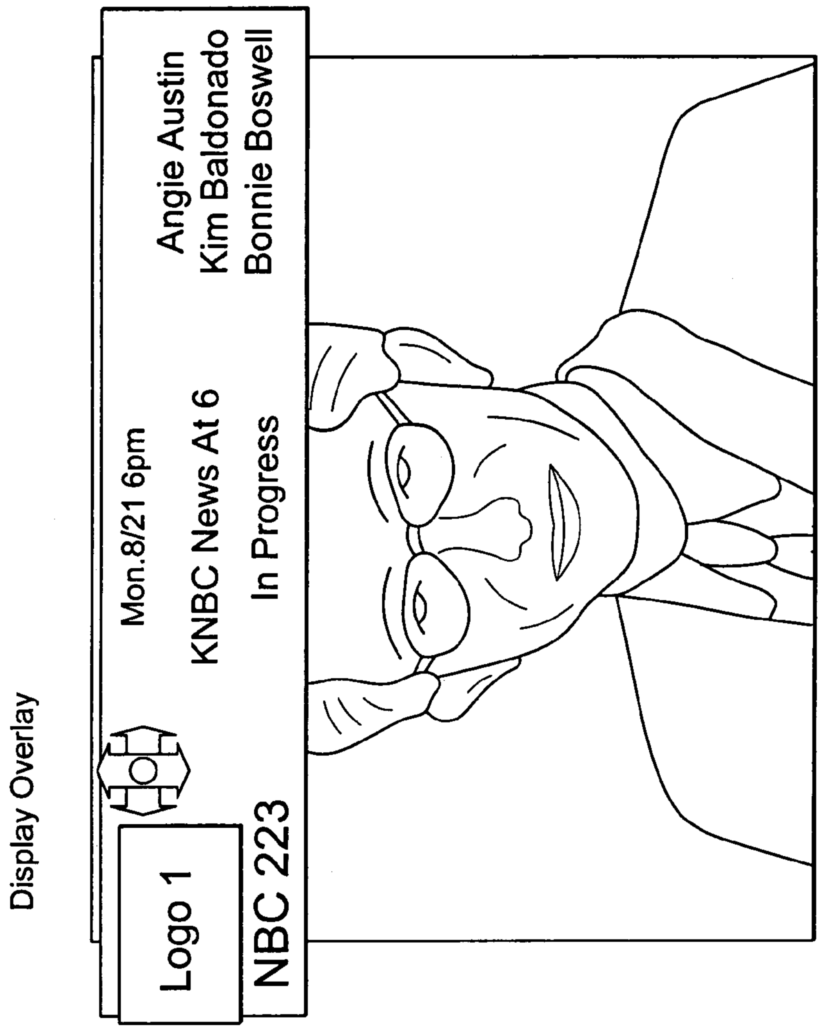
FIG. 11B is a diagram illustrating one embodiment of an overlay.
Figure 11A:
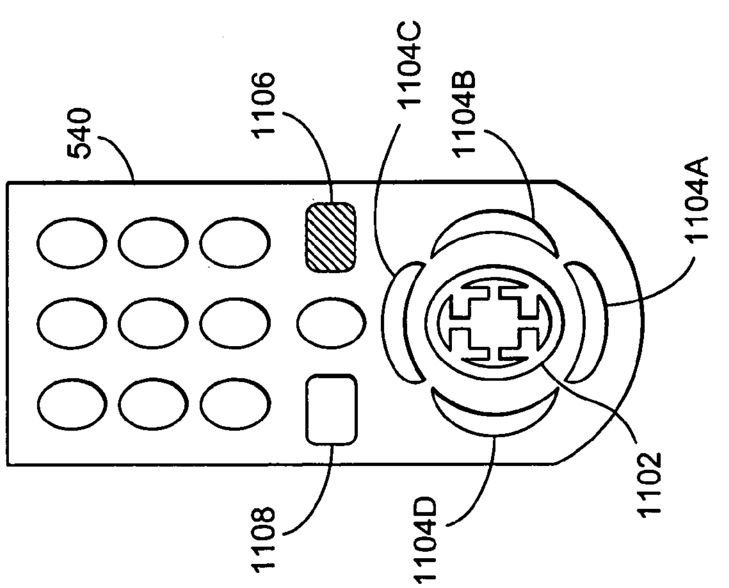
FIG. 11A presents an illustrative embodiment of a remote control.

FIG. 11A presents an illustrative embodiment of a remote control 540. The remote control 540 includes a display overlay button 1108. The selection of the display overlay button 1108 overlays a description of the currently viewed media program on the screen, as shown in FIG. 11B.

The remote control 540 also includes a menu guide button 1106. Selection of the menu guide button 1106 commands the IRD 500 to display menu guide 1002. The remote control 540 also includes a thumb rocker 1102 that can be urged in one of four or more directions to navigate within menu guide 1002 portions (such as selecting portions media program guide content 1004A, 1004B, and 1004C within menu content portion 1006). The thumb rocker also includes a click operation (depressing the center of the thumb rocker 1102) to select. The remote control 540 also includes a plurality of directional tab keys or buttons 1104A-1104D surrounding the thumb rocker 1102 which allow the user to navigate within the menu guide 1002 to different menu guide portions (for example, selecting between menu content portion 1006, and media program guide portion 1012).

The remote control 540 depicted in FIG. 11A is presented for illustrative purposes. The menu guide 1002 can be navigated from the RD 500 (or from another input device communicatively coupled to the IRD 500 such as a home computer), and the arrangement of the controls on the IRD 500 or input device may be different than that which is shown.

Menu Guide

Figure 12B:
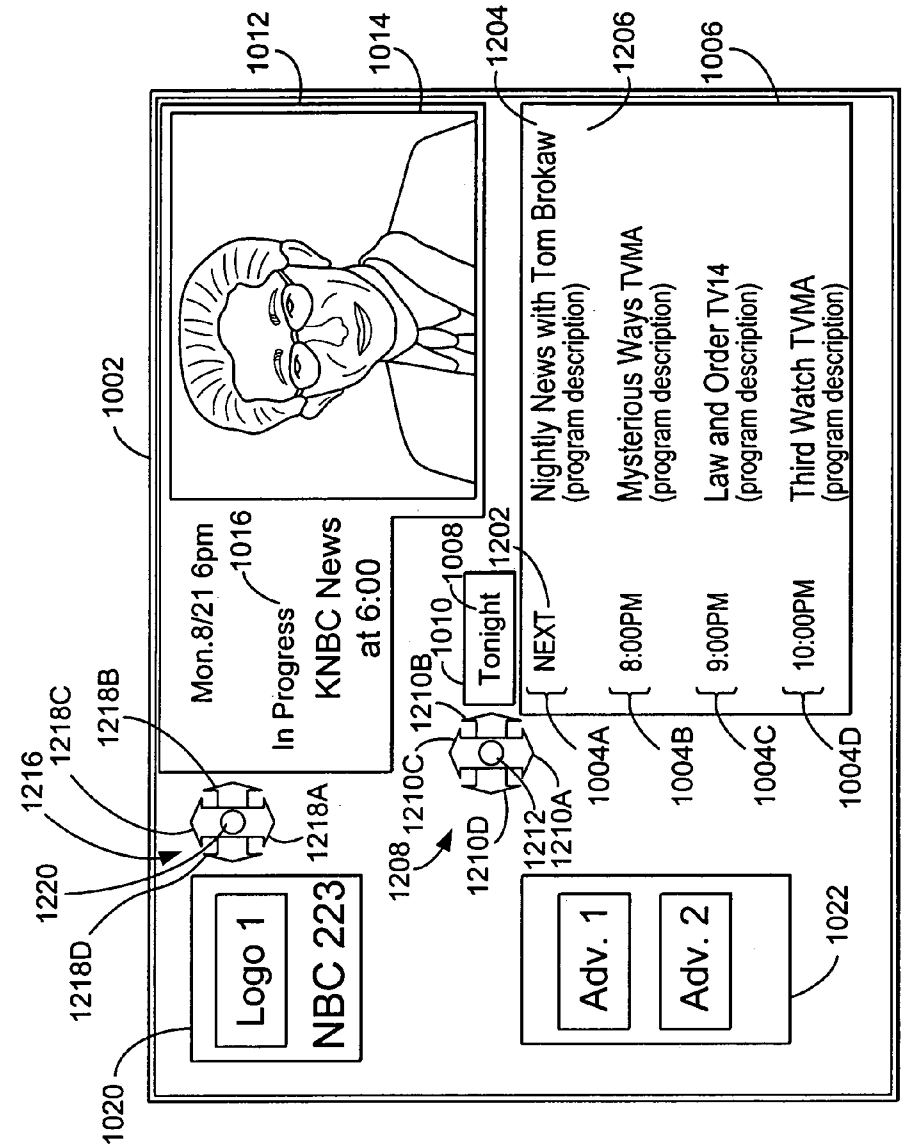
FIGS. 12A and 12B are diagrams depicting an embodiment of remote control buttons and the menu guide presented in response to the viewer selecting a menu guide button, respectively.
Figure 12A:
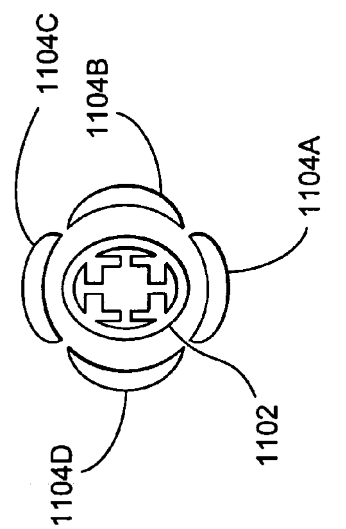

FIGS. 12A and 12B are diagrams of one embodiment of the menu guide 1002 presented in response to the viewer selecting the menu guide button 1106. The menu guide 1002 comprises a menu content portion 1006 and a channel selector portion 1020. In one embodiment, the menu guide 1002 also includes a PIG portion 1012, including a video representation 1014 of the program transmitted on the channel to which the IRD 500 is currently tuned (the "home" channel). Additional information 1016 such as the title of the program, may be provided in the PIG portion 1012 as well.

The menu guide 1002 may also include an advertising portion 1022, having one or more advertisements. The advertising portion 1022 can be used to display a wide variety of advertisements. For example, the advertising portion 1022 may include any combination of scrolling text, still images, icons and or video images. Ordinarily, when the menu guide 1002 is presented to the user audio signal supplied by the IRD 500 to the user's viewing device is based on the media program for the home channel displayed in the PIG portion 1012. However, when advertisements are displayed in the advertising portion 1022, the audio may be switched to advertising-related audio.

The advertisements presented in the advertising portion may be regularly cycled over an appropriate interval. For example, when video is presented in the advertising portion 1022, a video having different advertising content can be presented after the current video is completed. Also, when icons re presented in the advertising portion 1022, those icons may change over a specified interval (e.g. 30 seconds) or may change depending upon user input.

The advertising portion 1022 may include directed advertising that is keyed to the user's interests, as determined through direct user input, historical user viewing patterns, current selections in the menu guide (e.g. the "home channel" presented in the PIG 1012). In one embodiment of the present invention, users may also opt-out of the presentation of advertising in the menu guide 1002. For example, the present invention is capable of supporting a business model wherein users receive media program services for reduced rates if they are willing to allow advertising to be included in the menu guide 1002 and non-reduced rates if they are not.

Further provision is made for the user to obtain additional information regarding any of the products and/or services represented in the advertising portion 1022. This can be accomplished by navigating the menu guide 1002 to the advertising portion (e.g. using buttons 1104) navigating to a particular advertisement in the advertising portion 1022 (e.g. using the thumb rocker 1102), and selecting the desired advertisement (e.g. using the thumb rocker). This allows the user to obtain additional information regarding the products or services described, or to order the product/service itself This may be accomplished by transmitting and/or receiving information via the PSTN connection 120, via two way link 118, via the Internet (e.g. via an Internet-enabled IRD 500) or a computer communicatively coupled to the IRD 500, or any combination thereof.

The menu content portion 1006 includes media program content 1004A, 1004B, 1004C, and 1004D (hereinafter collectively referred to as media program content 1004). The media program guide content 1004 may include the beginning time for the transmission of the media program 1202, the title of the program 1204, and additional information about the media program 1206.

As will be demonstrated by example in this disclosure, the user can navigate within the menu guide 1002 by first selecting a portion of the menu guide (e.g. the channel selector portion 1214, the menu content portion 1006, or the PIG portion 1012), using the remote control buttons 1104A-1104D and then, using the thumb rocker 1102 to select items within the selected menu guide 1002 portion.

To aid in this navigation, the menu guide 1002 may include a menu content navigator icon 1208 and a channel selector portion navigator icon 1216. The menu content navigator icon 1208 includes a plurality of elements such as arrows (1210A-1210D) and an indicator button 1212. The navigator icon 1208 indicates when the menu content portion 1006 is active for navigation (and hence, inputs into the remote control 540 thumb rocker 1102 will allow the user to scroll through the information presented in the first portion 1106). User input into the remote control 540 thumb rocker 1102 can be confirmed by a change in the appearance of the navigator icon 1208. For example, the first arrow of the navigator icon 1210A can change color or otherwise change when button 1104A is depressed, and the indicator button 1212 indicates when the center of the thumb rocker 1102 is depressed (for example, when making a selection within the menu content portion 1006). In addition to or in the alternative to the foregoing, the indicator button 1212 may also change color or otherwise indicate when the appropriate portion of the menu is activated for navigation. Similarly, The channel selector icon 1216 includes a plurality of arrows (1218A-121D) and an indicator button 1220, which indicates that the navigator icon 1216 is active (and hence, inputs into the remote control 540 thumb rocker 1102 will allow the user to scroll through the information presented in the channel portion 1214.

User input into the remote control 540 thumb rocker 1102 can be confirmed by a change in the appearance of the navigator icons 1208 and 1216. For example, the first arrow of the navigator icon 1210A can change color or otherwise change the menu content portion 1006 is active and button 1104A is depressed.

Navigating in Channels and Dayparts

Figure 13:
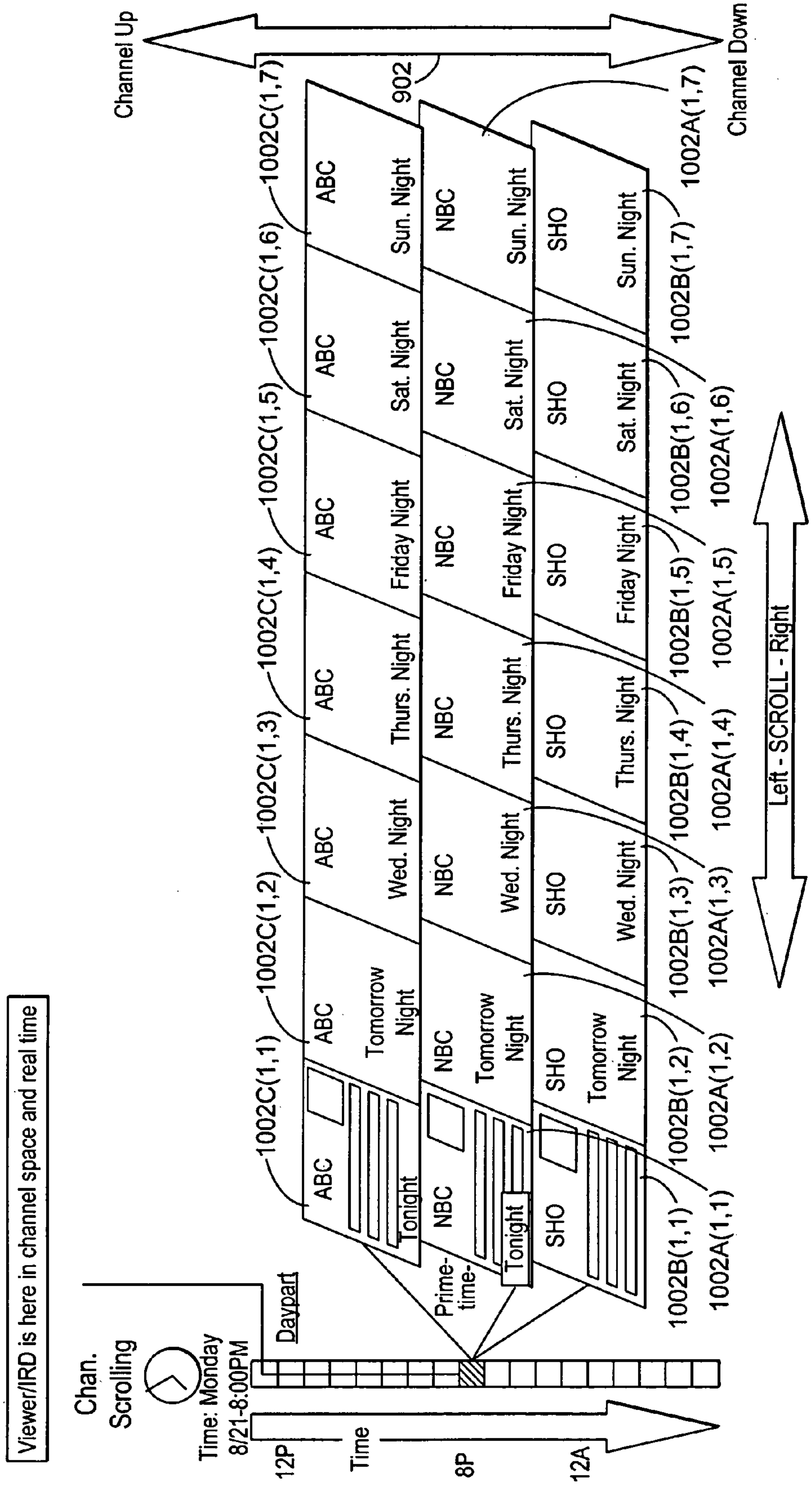
FIG. 13 is a diagram illustrating how daypart information planes can be navigated to display different programming information in accordance with viewer commands.

FIG. 13 is a diagram illustrating the remote control 540 and how daypart information planes can be navigated to display different programming information in accordance with viewer commands. Using appropriate commands, the user can navigate in the channel dimension 902 by scrolling from the current daypart 1002A1 and currently tuned channel (indicated as NBC in FIG. 13), to a menu guide 1002B1 for the same daypart and a different channel (indicated as ABC in FIG. 13), or in the daypart dimension 904 to a menu guide 1002A2 for the same channel and a different daypart (the "Tomorrow Night" daypart shown in FIG. 13). The italicized text of FIG. 13 indicates that the information provided relates to future dayparts. Using the remote control 540, the user can navigate directly within the same daypart to another channel, or to a different daypart on the same channel. Further, the user can obtain detailed information regarding programs that are summarized in each menu guide.

Figure 14B:
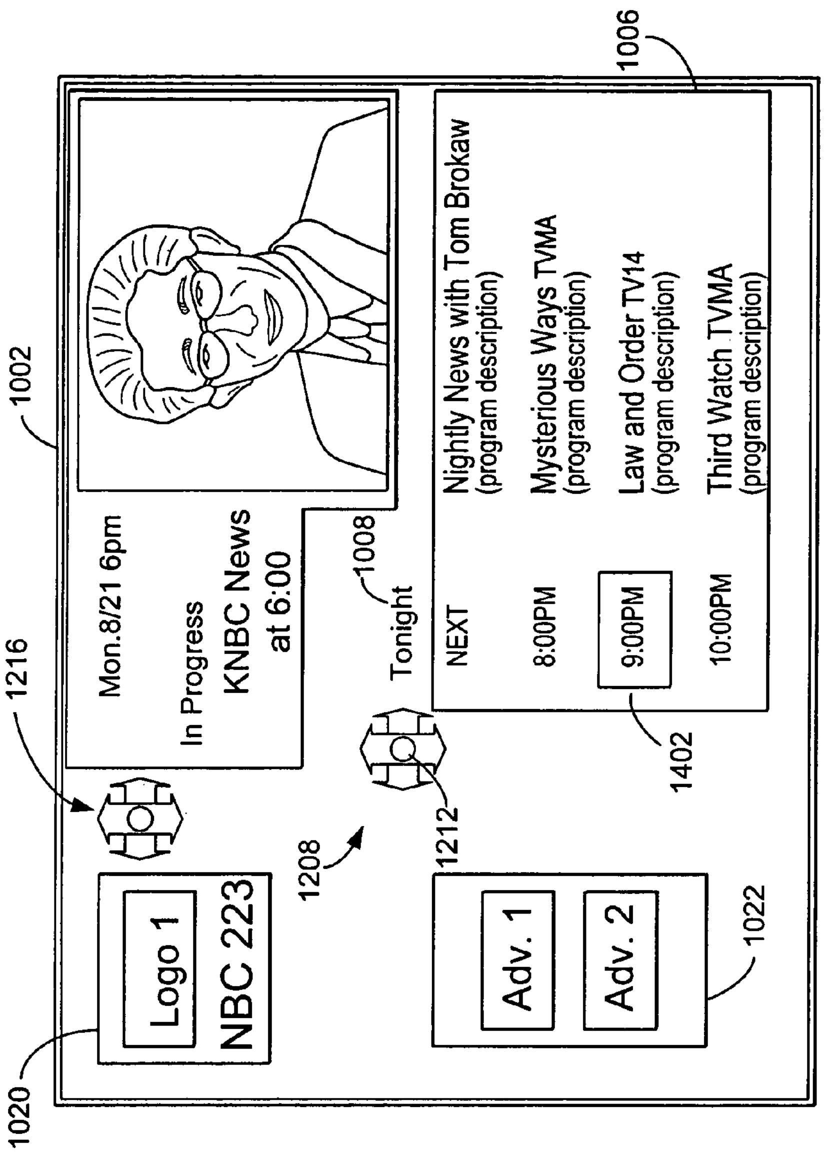
FIGS. 14A and 14B are diagrams illustrating one embodiment of the remote control and how a user can obtain detailed data regarding particular program summarized in a menu guide for a particular channel and daypart.
Figure 14A:
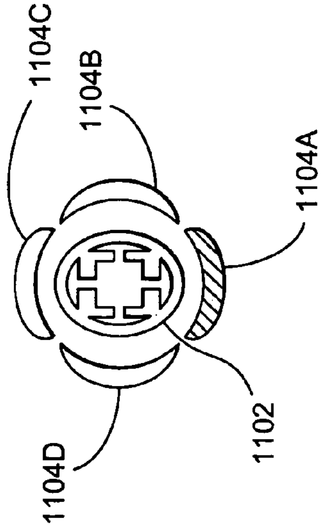

FIGS. 14A and 14B are diagrams illustrating one embodiment of the remote control 540 and how a user can obtain detailed data regarding particular program summarized in a menu guide 1002 for a particular channel and daypart. First, the user navigates to the menu content portion by appropriate manipulation of remote control 540 buttons 1104. In the illustrated embodiment, this is accomplished by depressing button 1104A. Indicator button 1212 changes to indicate that menu content portion 1006 of the menu guide 1002 is currently active, and that manipulation of the rocker button 1102 will select items within the menu content portion 1006.

Once the menu content portion 1006 of the menu guide 1002 is selected, the user can navigate through each media program content items 1004A-1004D in the menu content portion 1006 using the thumb rocker 1102. The user can obtain more detailed information regarding a particular program by manipulating periphery of the rocker button 1102 until a delimiter 1402 is visually associated with the particular program of interest (in the illustrated example, the "Law and Order" program), and pushing the center of the rocker button 1102 to select the program for additional information.

Figure 15B:
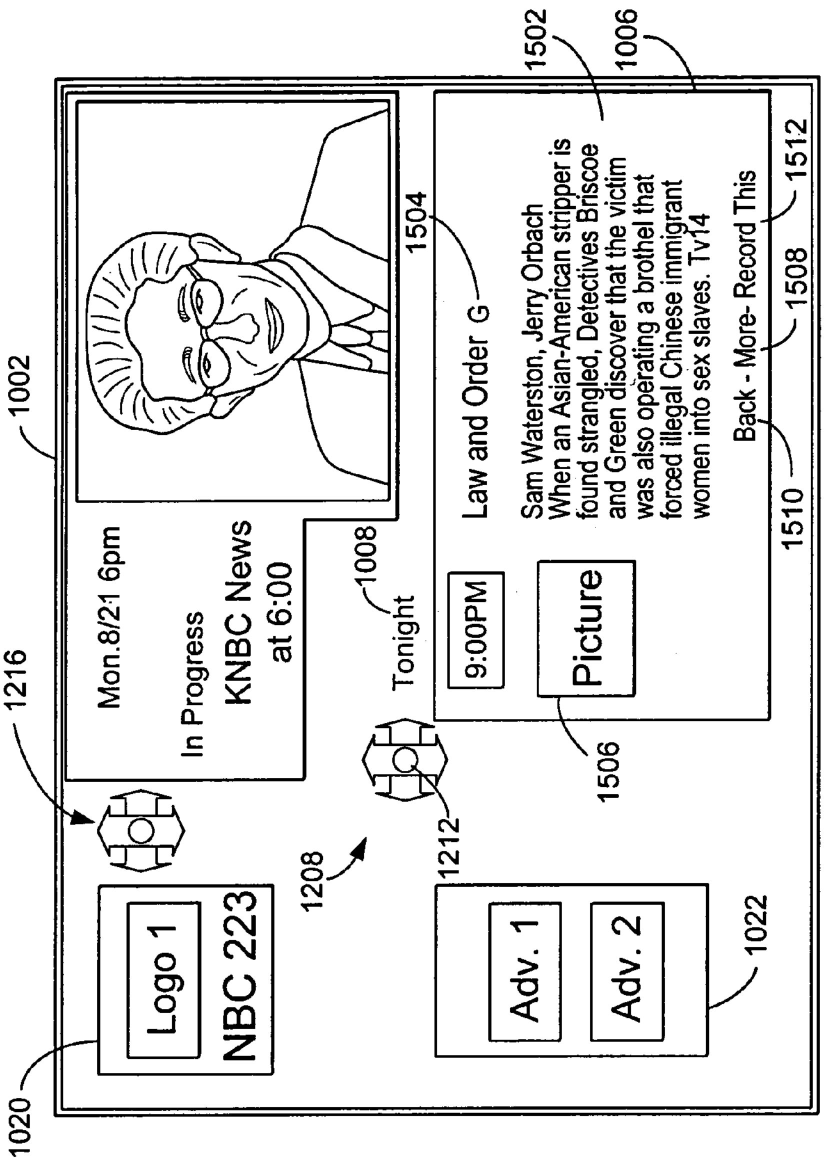
FIGS. 15A and 15B are diagrams illustrating the operation of the remote control an exemplary menu guide presenting detailed information regarding one of the media programs presented in the menu content portion.
Figure 15A:
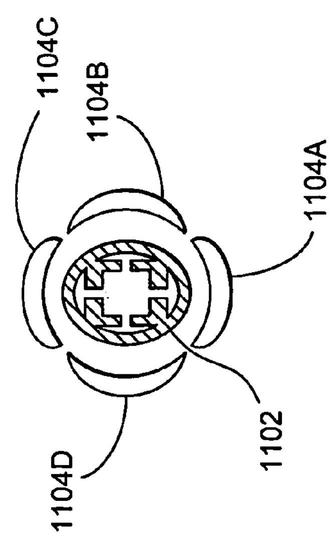

FIGS. 15A and 15B are diagrams illustrating the operation of the remote control 540 an exemplary menu guide 1002 presenting detailed information regarding one of the media programs presented in the menu content portion 1006. Here, the menu content portion 1006 of the menu guide 1002 includes a textural description of the selected program 1502, and may also include a rating 1504 and a photograph or sample video 1506 of the program. If the user wishes even more detailed information about the program (for example, regarding the actors and actresses in the program, or the remainder of the text 1502), the user can indicate as such by manipulating the rocker button 1102 to select an icon or text such the "More" text 1508. If the user wishes to return to the menu guide presented in FIG. 12, the user can select the "Back" text 1510. Further, if the user would like to record the program described on a PVR or other video recording device, this can be accomplished by selecting the "Record This" text 1512. In one embodiment of the invention, the menu guide shown in FIG. 15 and/or the menu guide shown in FIG. 12 also includes an icon indicating that the associated media program is slated for recording by the PVR or video recording device. In this embodiment, selection of the "Record This" text 1512 causes the icon to appear.

Navigating Channels Within a Daypart

Figure 16B:
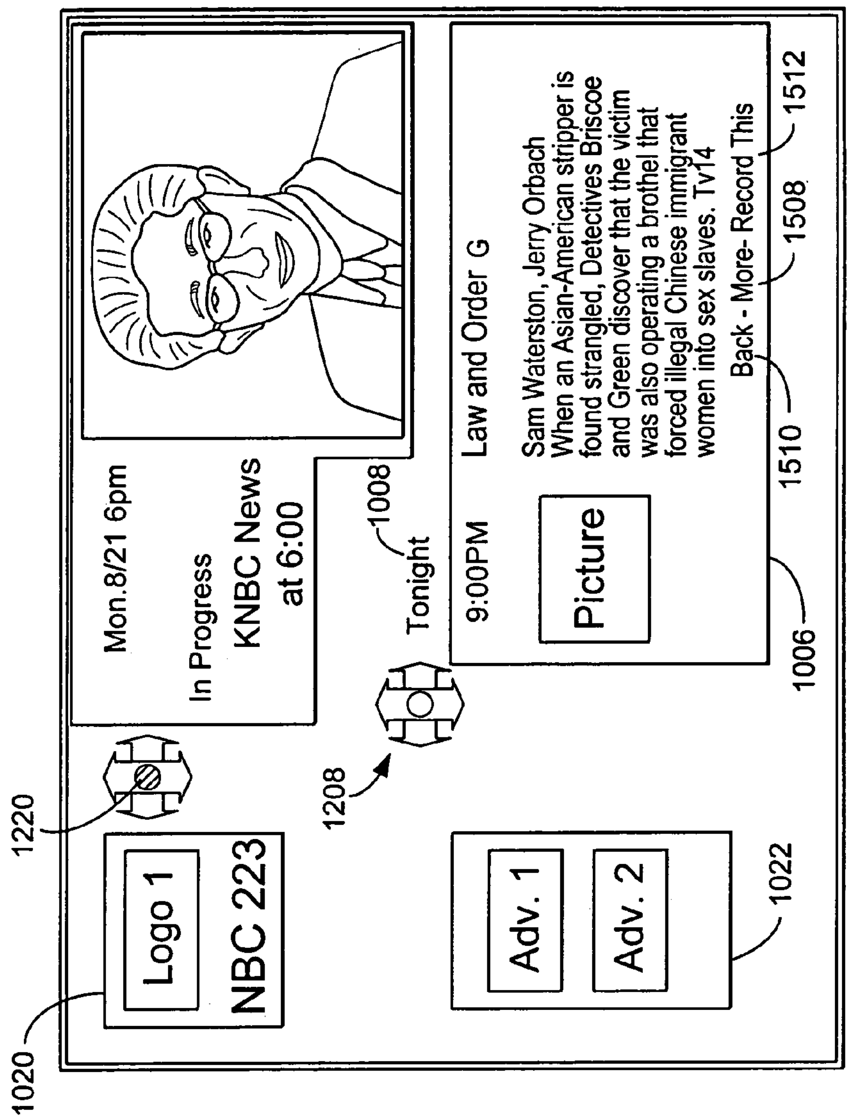
FIGS. 16A and 16B are diagrams illustrating the operation of the remote control and showing how a viewer can navigate within information planes to obtain information regarding programs that are available on other channels during the currently selected daypart.
Figure 16A:
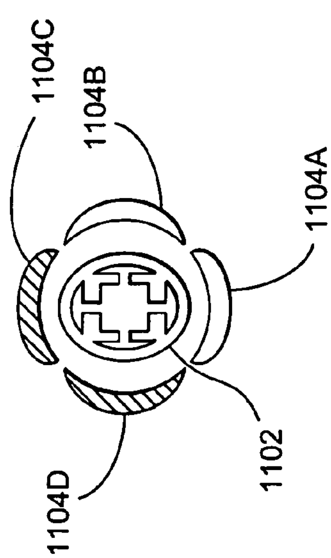

FIGS. 16A and 16B are diagrams illustrating the operation of the remote control 540 and showing how a viewer can navigate within information planes to obtain information regarding programs that are available on other channels during the currently selected daypart. First, the user navigates from the menu content portion 1006 of the menu guide 1002 to the channel selector portion 1020 by selecting the appropriate buttons 1104. Preferably, the appropriate buttons 1104 to select correspond to the visually depicted arrangement of the portions of the menu guide 1002 that the user desires to navigate to and from. For example, in the illustrated example, the channel selector portion 1020 of the menu guide 1002 is above and to the left of the menu content portion 1006, and appropriate buttons 1104 to select are 1104C and 1104D.

The indicator button 1220 of the channel selector portion navigator icon is changed to indicate that the channel selector portion 1020 of the menu guide 1002 is active. At this point, the user can navigate the channel selector portion of the menu guide 1002 to select menu guide information regarding media programs available from different channels (e.g. menu guides 1302A and 1304A of FIG. 13).

Figure 17B:
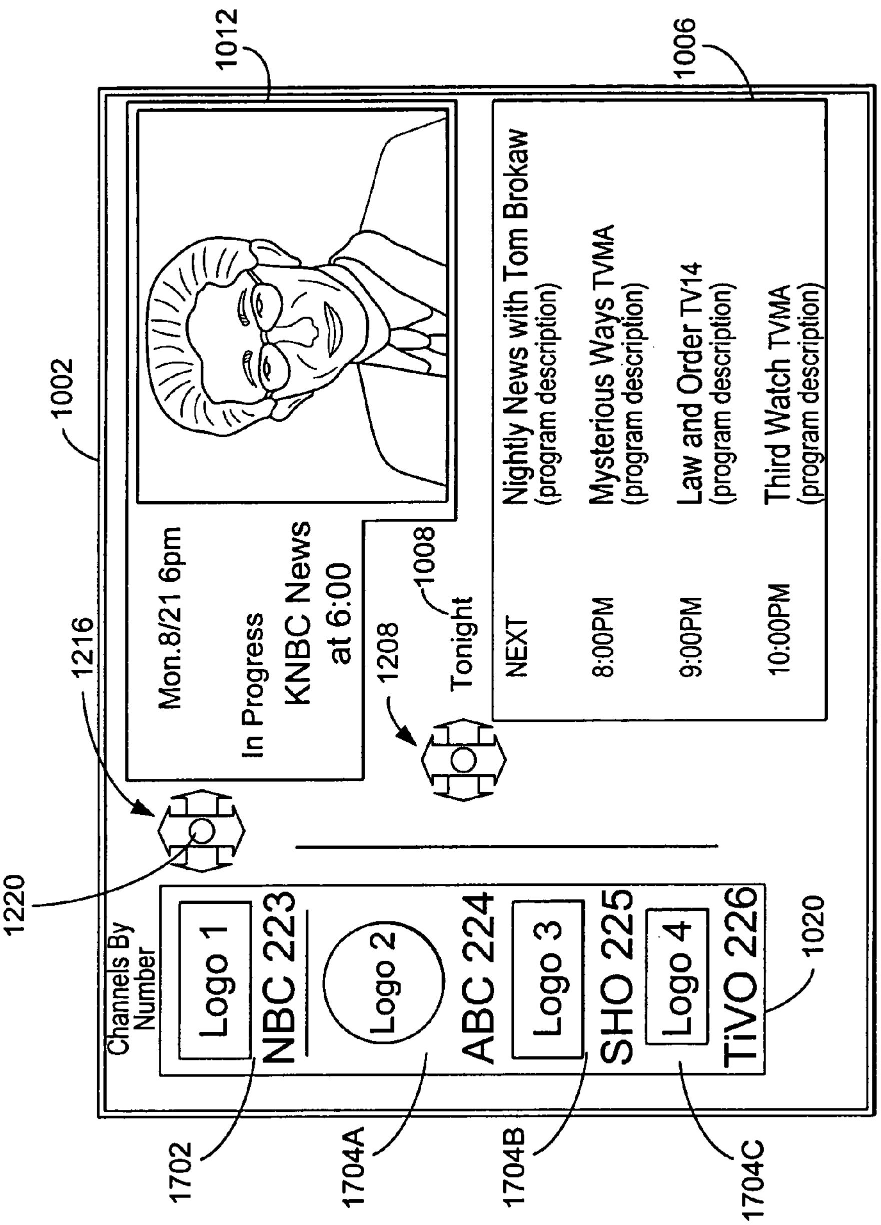
FIGS. 17A and 17B are diagrams illustrating the operation of the remote control in the navigation of the media program information space 900 to provide information regarding media programs available from different channels.
Figure 17A:
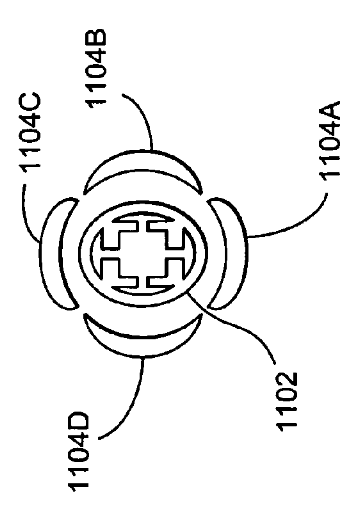

FIGS. 17A and 17B are diagrams illustrating the operation of the remote control in the navigation of the media program information space 900 to provide information regarding media programs available from different channels. Here, the channel selector portion 1020 is active, and provides a dynamic, area which can be navigated by manipulation of the thumb rocker 1102. To select or designate a channel as the active channel 1702 (which is tuned by the IRD 500), the user depresses the top or the bottom of the thumb rocker 1102 to select one of the selectable channels 1704A-1704C. The currently selected channel can be indicated by highlighting, by a suitable associated icon, or, by placing the icon at the upper section of the media. In the illustrated embodiment, the selected channel is underlined and placed in the upper portion of the channel selection portion 1022.

Note that the organization and sizing of the menu guide 1002 portions is contextual. That is, the arrangement and size of the portions can change depending on the information requested by the viewer. For example, in the embodiment disclosed in FIG. 17, the channel selection portion 1022 expanded in size and the advertising portion 1022 is no longer presented.

Figure 18A:
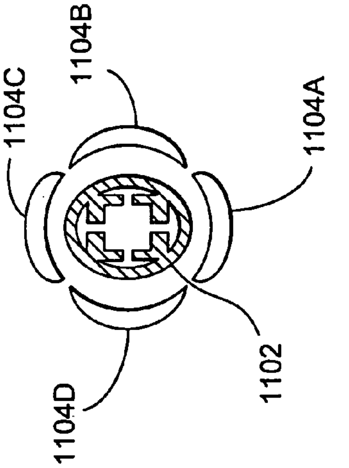
FIGS. 18A and 18B are diagrams illustrating the operation of the remote control in the navigation of the channel selection portion of the menu guide.
Figure 18B:
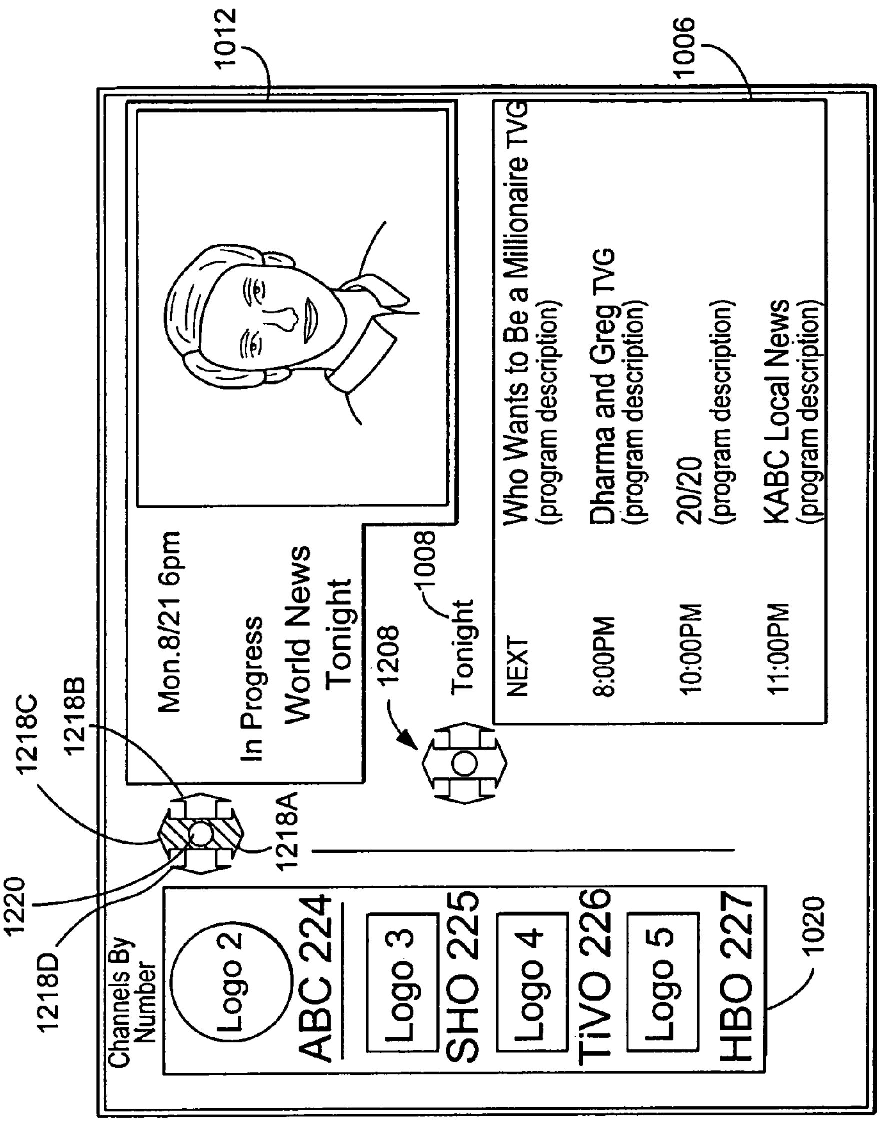

FIGS. 18A and 18B are diagrams illustrating the operation of the remote control 540 in the navigation of the channel selection portion 1022 of the menu guide 1002. In the exemplary illustration provided by FIG. 18, the user has switched the selected channel from a channel providing NBC-provided content (channel 223) to a channel providing ABC-provided content by depressing a lower portion of the thumb rocker 1102. The channel selection icon 1216 confirms this input with a change to one or more of the arrows 1218.

When this is accomplished, the other aspects of the menu guide 1002 change in accordance with the current channel selection (ABC). The PIG portion 1012 changes to reflect the currently transmitted program on the selected channel, and textural information is provided in the PIG portion 1012 about the currently transmitted program on the selected channel. The menu content portion 1006 also changes in response to the selection of a different channel. The daypart (Today) has not changed, but since the selected channel has changed (and hence the media programs provided during the daypart on the selected channel have changed), the media guide content 1004 presented in the menu content portion 1006 changes to present program guide information regarding the programs broadcast during the selected daypart (Today) on the selected channel (ABC) The user may scan quickly through the channels to any desired channel or may directly access any channel by continuously depressing the thumb rocker or depressing numbers (and/or letters) corresponding to the channel and depressing an enter button.

The user can now scan programs within the menu content portion 1006 for more detailed information, as was described with respect to FIGS. 14A and 14B. This is accomplished by selecting the appropriate buttons 1104 on the remote control 540 (in the illustrated case, buttons 1104A and 1104B).

Figure 19B:
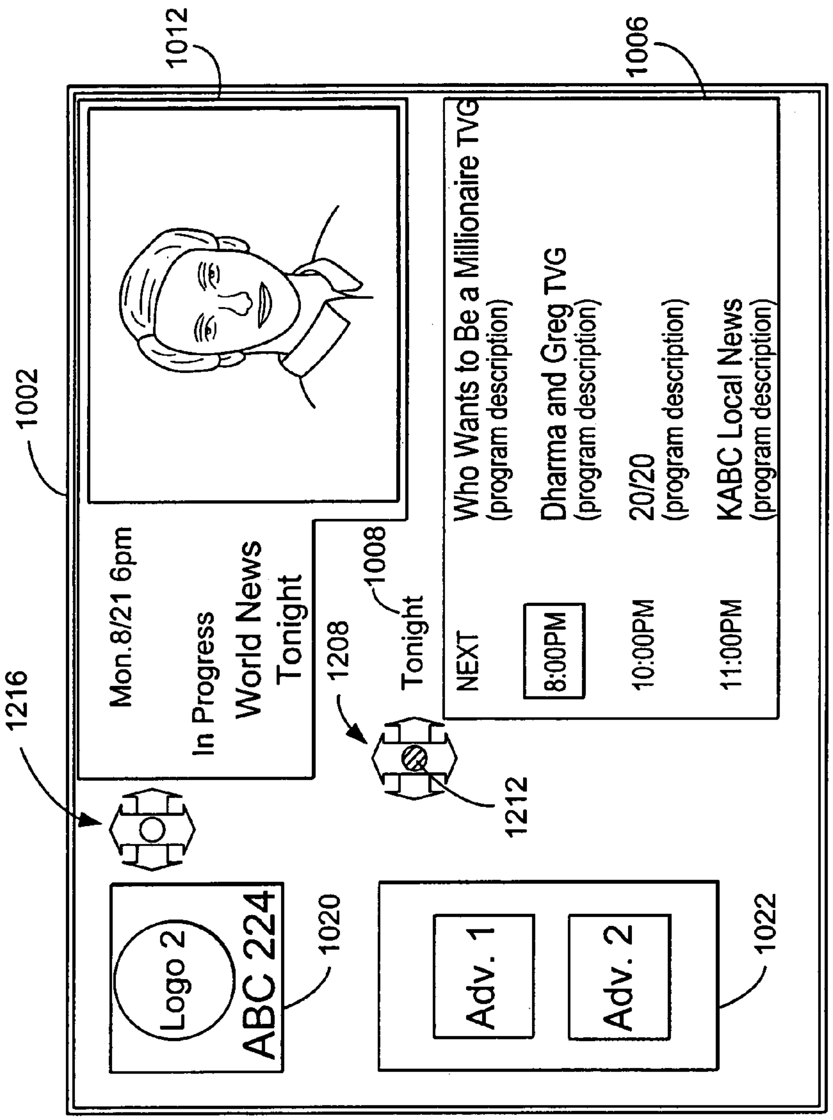
FIGS. 19A and 19B are diagrams illustrating the operation of the remote control and the menu guide after re-selecting the menu content portion 1006 for navigation.
Figure 19A:
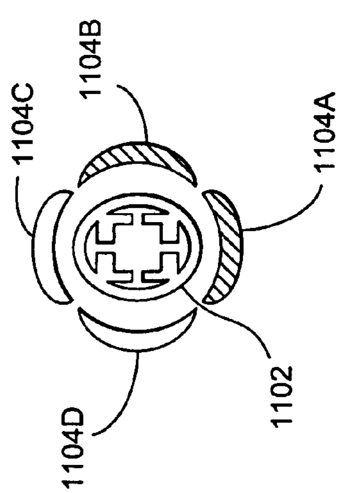
Figure 20B:
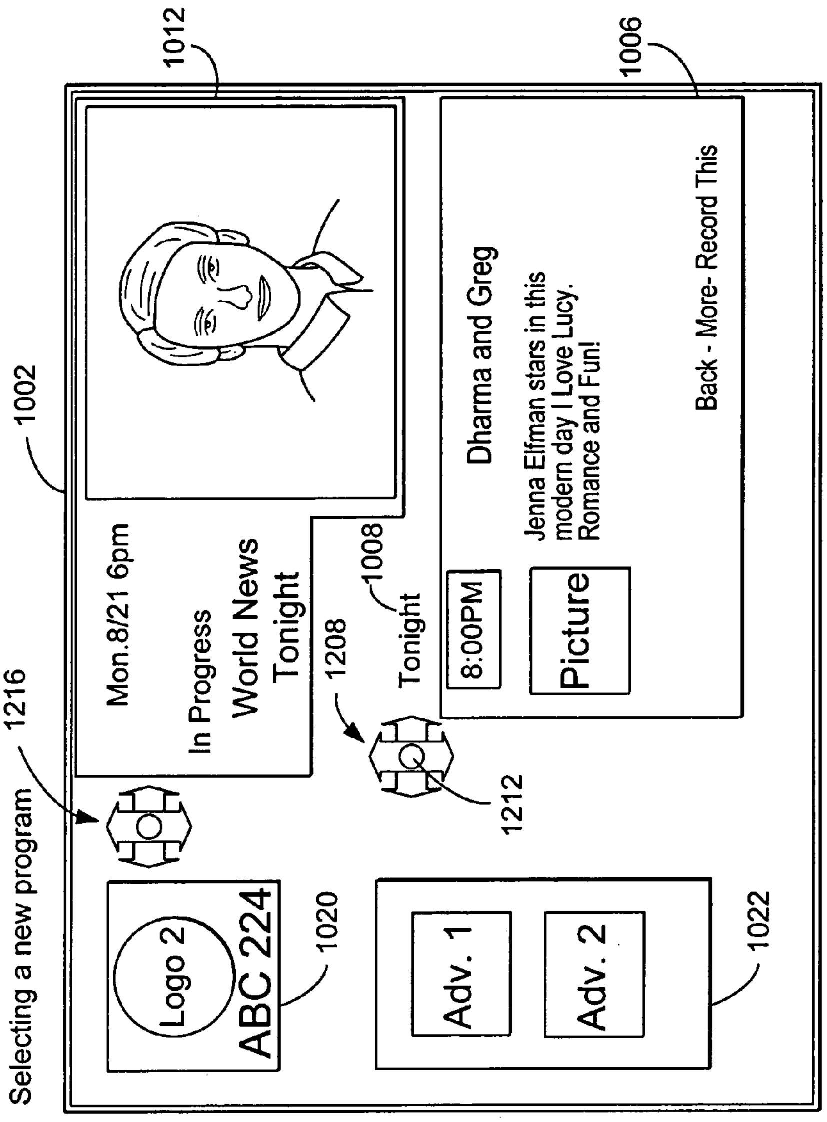
FIGS. 20A and 20B are diagrams depicting navigation through a menu content portion 1006.
Figure 20A:
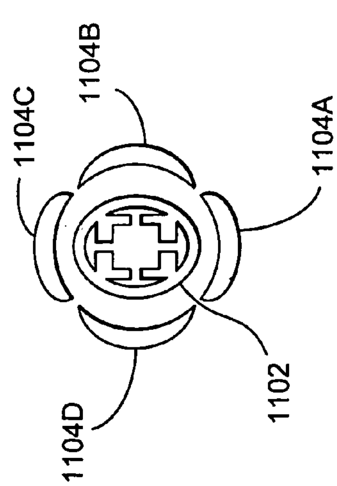

FIGS. 19A and 19B are diagrams illustrating the operation of the remote control 540 and the menu guide 1002 after re-selecting the menu content portion 1006 for navigation. Note that the channel selection portion 1022 now indicates the selected channel only (ABC), and that the advertising portion 1022 is again shown on the menu guide 1002. Note also that the content in the advertising portion is for media programs that are available from the currently selected channel (e.g. ABC). As before, the user can navigate through the menu content portion 1006 and select particular programs for additional program details. This is shown in FIGS. 20A and 20B.

Figure 21B:
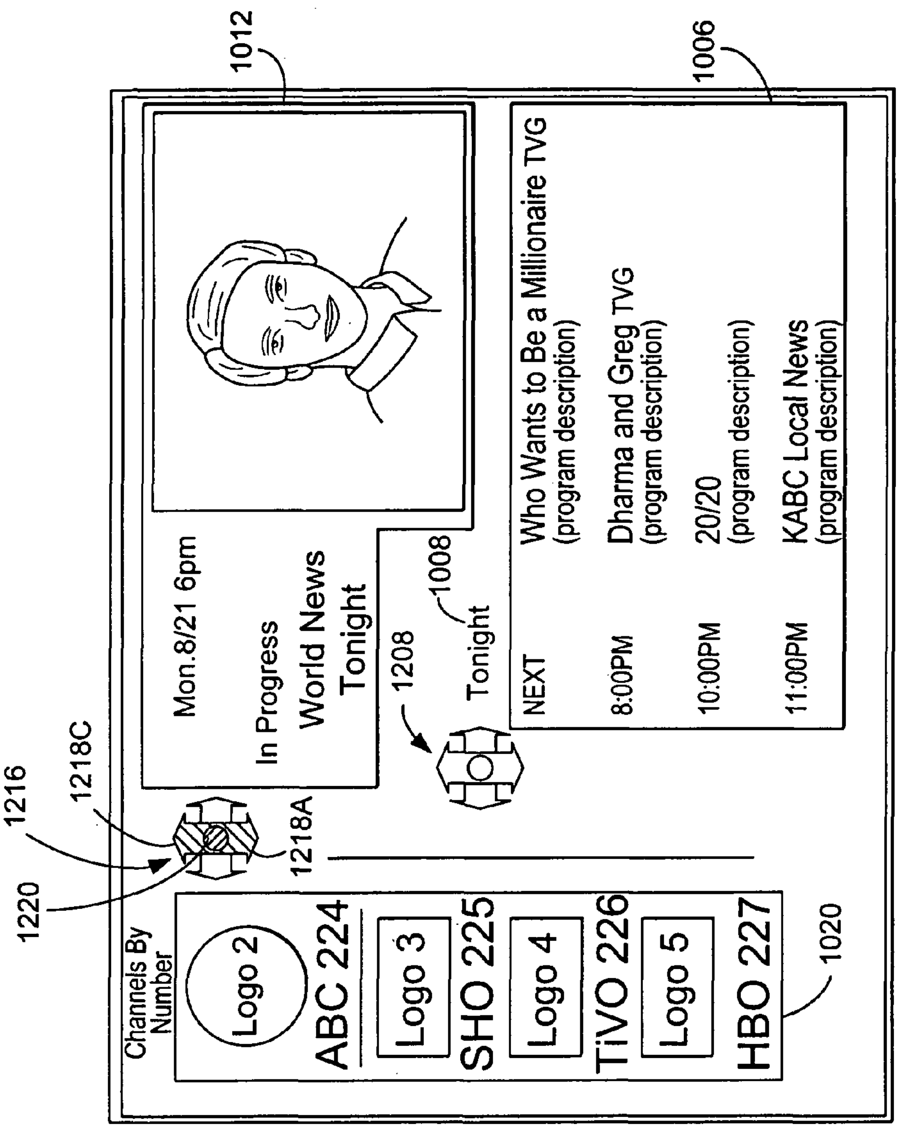
FIGS. 21A and 21B are diagrams further illustrating the navigation of the menu guide.
Figure 21A:
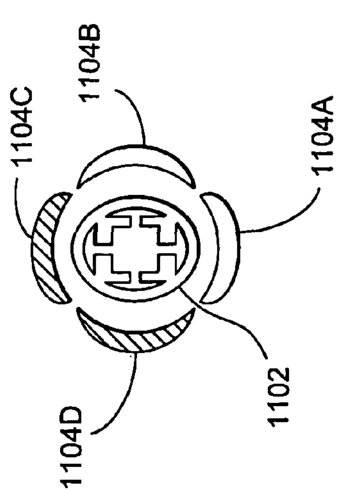
Figure 22B:
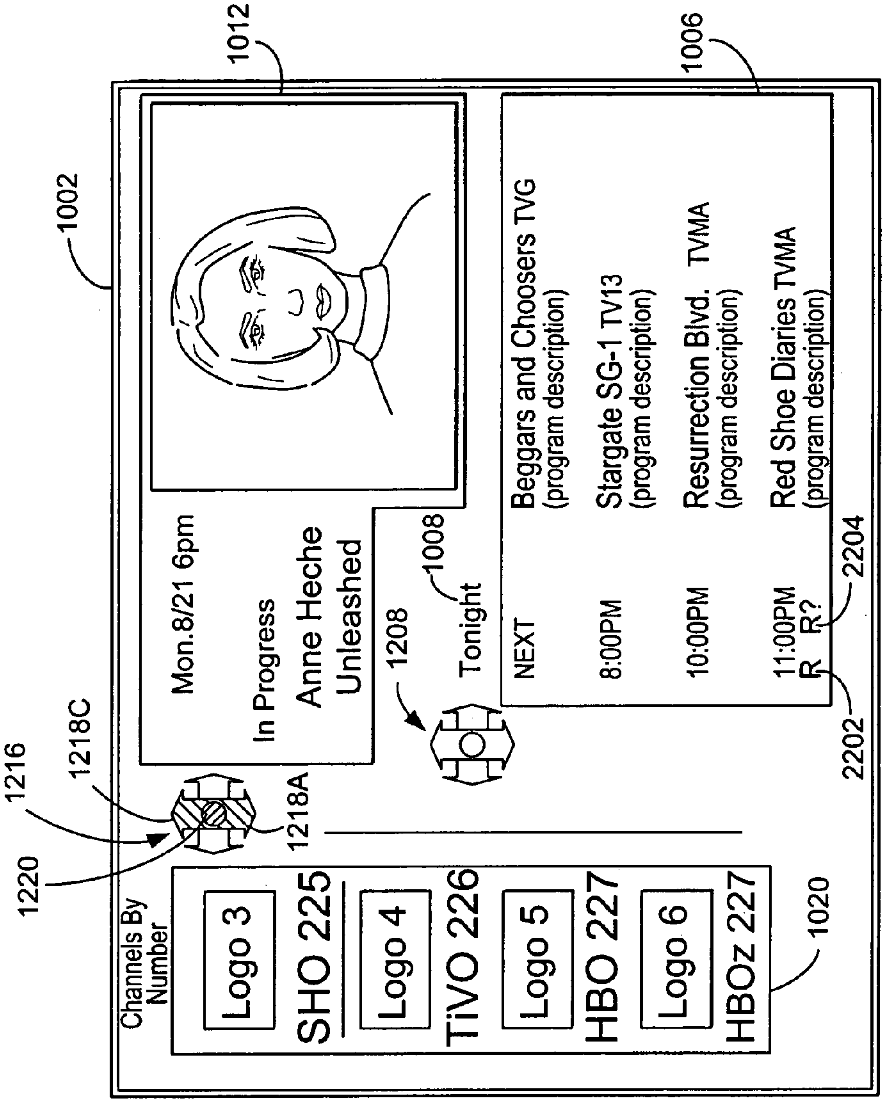
FIGS. 22A and 22B are diagrams further illustrating the navigation of the menu guide.
Figure 22A:
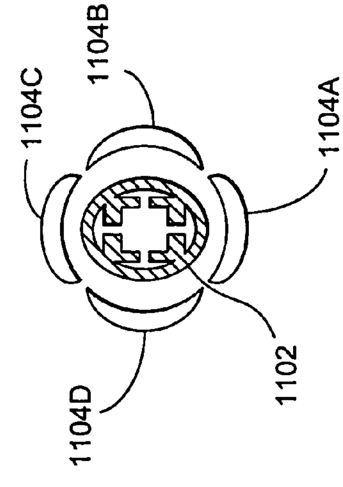

The user may also navigate to a menu guide 1002 for another channel, by selecting the channel selection portion 1022 and scrolling down with the thumb rocker 1102, as shown in FIGS. 21 and 22. In each case, when a different channel is selected, the PIG portion 1012 and the menu content portion 1006 are updated to reflect the in-progress media program transmitted on the selected channel, and the programming for the selected daypart on the selected channel. In the example illustrated in FIGS. 21A and 21B, the user has navigated the menu guide 1002 to channel number 224 (which includes media programs from ABC). In the example illustrated in FIGS. 22A and 22B, the user has navigated the menu guide 1002 to channel number 225 (which includes media programs from SHOWTIME).

The menu content portion 1006 of the menu guide 1002 also shows a first delimiter 2202 and a second delimiter 2204. The first delimiter 2202 suggests to the user that the associated media program is one that the user may want to record with a VCR or PVR. The second delimiter 2204 indicates that the associated media program is set to be recorded when it is transmitted.

Navigating Within a Daypart to Different Days

Figure 23:
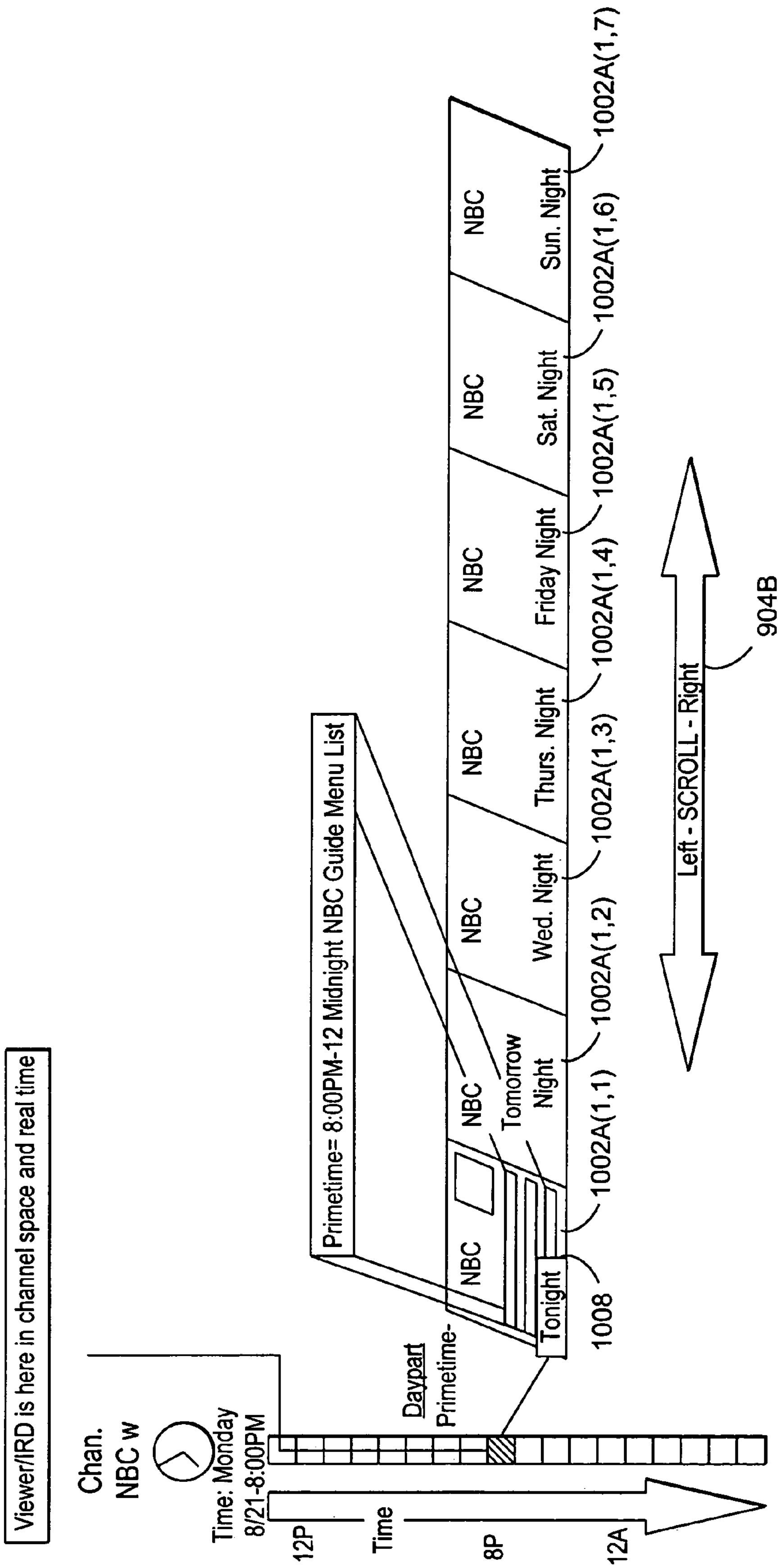
FIG. 23 is a diagram further illustrating navigation within the menu content portion to the same day part.
Figure 26:
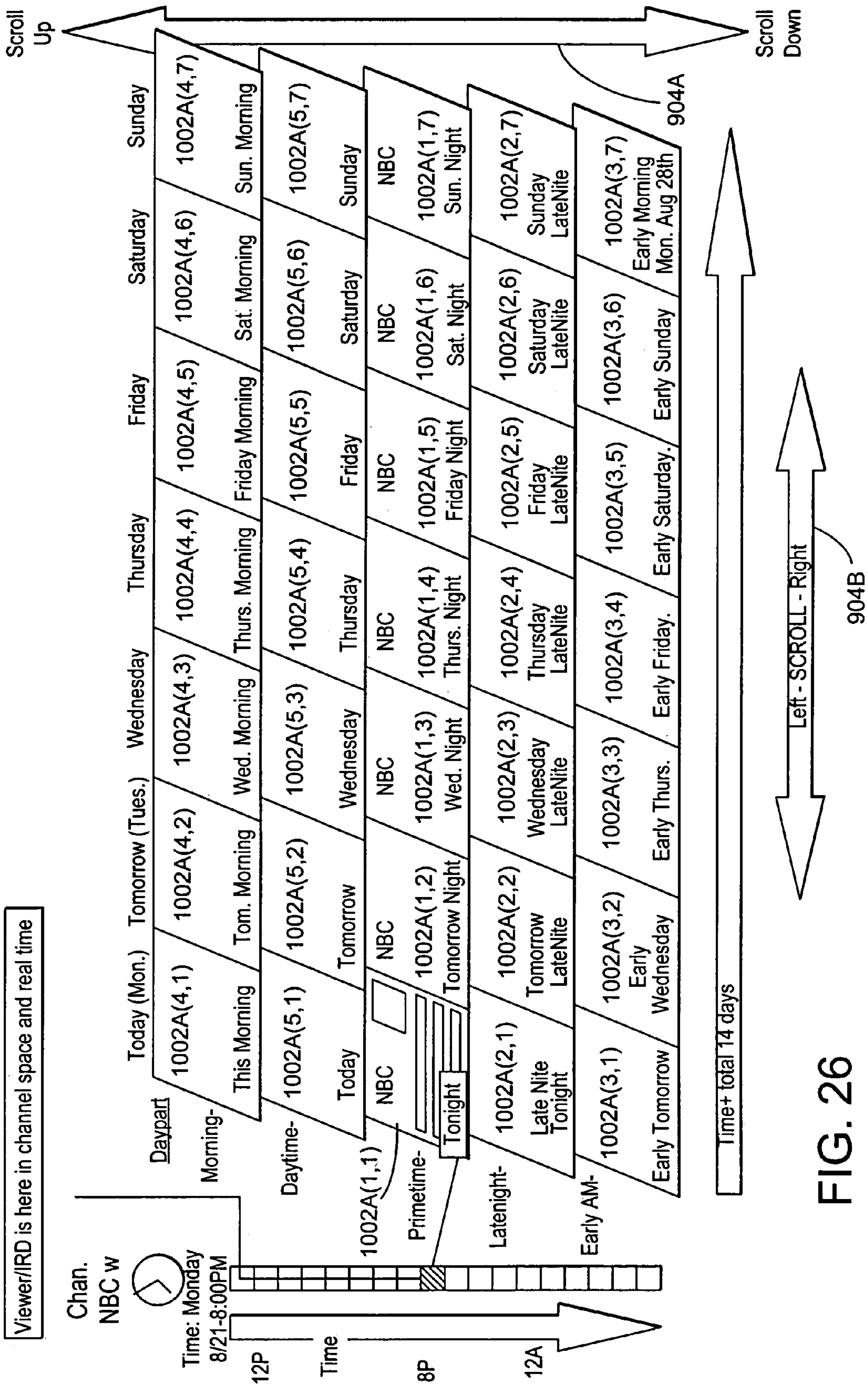
FIG. 26 is a diagram further illustrating navigation within the menu content portion of the menu guide.

FIG. 23 is a diagram further illustrating navigation within the menu content portion 1006 to the same daypart (e.g. "Tonight") but on different days. Navigation of the time dimension 904 described above can be conveniently accomplished by defining the time dimension 904 such that dayparts which immediately precede or follow the current daypart (e.g. if the current daypart is the tonight daypart 1002A(1,1), the Late Night Tonight daypart 1002A(2,1) and the Today daypart 1002(5,1)) are adjacent to the current daypart along a first time dimension 904A, and the dayparts which follow or precede the current daypart by one day (e.g. daypart 1002A(1,2)

in FIG. 26) are adjacent to the current daypart along a second time dimension 904B. This allows the dayparts to be quickly and intuitively navigated.

In the example presented in FIG. 23, scrolling along an axis defined by the second time axis 904 (e.g. left and right) changes the information presented in the menu content portion 1006 to reflect the same daypart as the current daypart, but shifted by one day. Hence, if the menu guide 1002A(1,1) presents program information for the current daypart ("Tonight") which is Monday Night programming, scrolling once to the right will present a menu guide 1002A(1,2) having media program information for "Tomorrow Night" programming in the menu content portion 1006, and doing so again will present a menu guide 1002A(1,3) media program information for Wednesday night programming in the menu content portion 1006.

Figure 24B:
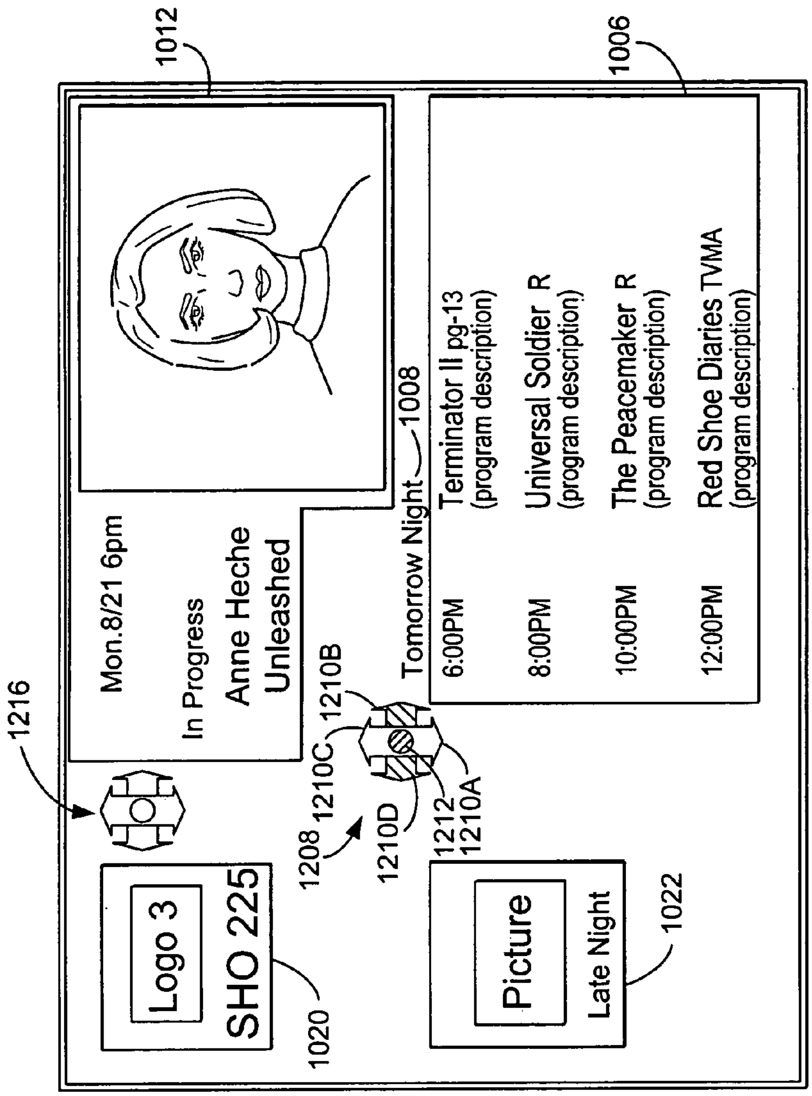
FIGS. 24A and 24B are diagrams further illustrating the navigation of the menu content portion.
Figure 24A:
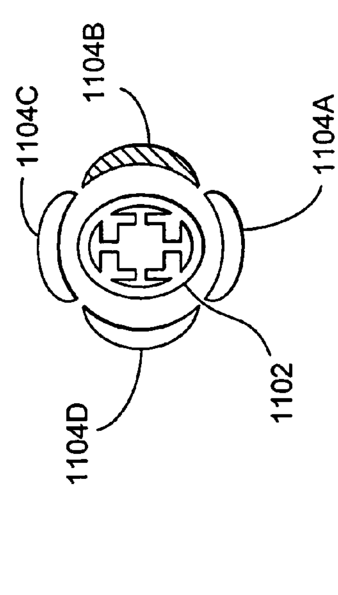

FIGS. 24A and 24B are diagrams illustrating the navigation of the menu content portion 1006. In this example, the user has selected the menu content portion 1006 by selecting the button 1104B on the remote control. The user can then navigate through the menu content portion 1006 to view program information for different media programs. In the embodiment shown in FIG. 25, the user has depressed the right periphery of the thumb rocker 1102. This user input is confirmed by changing the appearance of the navigator icon 1208 arrows 1210B and 1210D. In response to the user command, the menu content portion 1006 of the menu guide 1002 shifts forward to the same daypart, but 24 hours in the future (e.g. "Tomorrow Night"). This is analogous to navigating from menu guide 1002A(1,1) to menu guide 1002A(1,2) as shown in FIG. 23B. The user can now scroll through and select more detailed information regarding the media programs listed in the menu content portion 1006 by manipulating the top and bottom periphery of the thumb rocker 1102, as described earlier. Note that the advertising portion 1022 now shows content that is directed by the selected channel (in the illustrated example, a channel providing information from SHOWTIME).

Figure 25B:
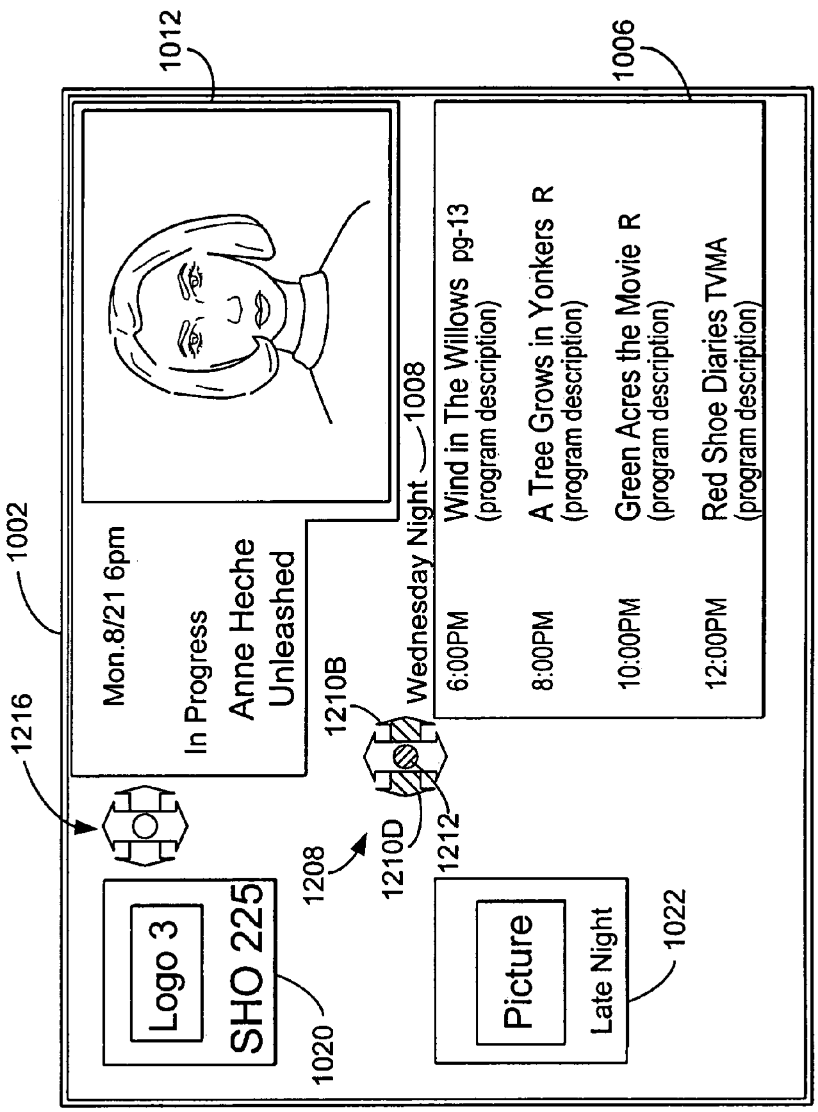
FIGS. 25A and 25B are diagrams illustrating the menu guide presented after the user navigates the menu content portion to shift forward to the same daypart one day in the future.
Figure 25A:
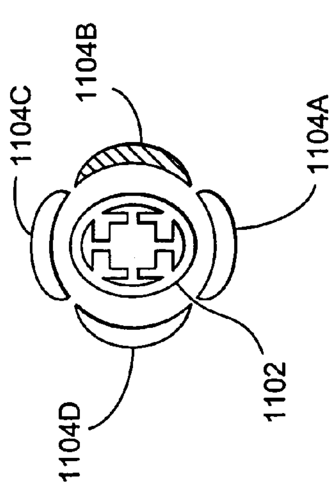

FIGS. 25A and 25B are diagrams illustrating the menu guide presented to the user after the user further navigates the menu content portion 1006 to shift forward to the same daypart another 24 hours in the future ("Wednesday Night"). This is analogous to navigating from 1002A(1,2) to 1002A(1,3) in FIG. 23A.

Navigating Between Dayparts on the Same Day

FIG. 26 is a diagram further illustrating navigation within the menu content portion 1006 of the menu guide 1002. As was shown with respect to FIG. 23, the user can scroll forward to view menu content 1004 in the menu content portion 1006 for the same daypart but on different days (e.g. from menu guide 1002A(1,1) to menu guide 1002A(1,2)). However, the user can also scroll forward to view menu content 1004 for adjacent dayparts later in the same day (e.g. from menu guide 1002A(1,1) to menu guide 1002A(2,1). By repeatedly inputting commands with the remote control 540, the user can navigate to any of the dayparts 1002A(1,1) through 1002A(5,7). Navigation between the menu guides for dayparts 1002A(1,1)-1002A(5,7) can also be expedited by a direct input selection if desired.

As described above, in addition to scrolling by forward (and backwards) to dayparts that are multiples of 24 hours ahead (or behind) the currently selected daypart, the menu guide 1002 also permits the user to scroll forward and backwards among adjacent dayparts as well.

In one embodiment of the invention, this is accomplished on a daypart-by-daypart basis. That is, by selection of appropriate buttons on the remote control 540 (e.g. the upper or lower periphery of the thumb rocker 1102), the user may navigate from a menu guide for the current daypart 1002A(1,1) to a menu guide for the next succeeding daypart 1002A(2,1), and the menu content portion 1006 presents programming information for the programs on the selected channel for the next daypart (in the illustrated example, "Late Night Tonight"). This can be accomplished, for example according to a navigation paradigm wherein depression of the thumb rocker 1102 in the left and right sides selects the same daypart on the next succeeding (or preceding) day, and depression of the thumb rocker 1102 in the up and down directions selects the next succeeding daypart (typically, on the same day, e.g. moving from the current daypart 1002A(1,1) to daypart 1002A(2,1).

In another embodiment of the invention, this is accomplished on a program-by-program basis. That is, selection of the appropriate buttons on the remote control 540 (e.g. the upper or lower periphery of the thumb rocker 1102), the menu content portion 1006 is changed to include the show succeeding programs one at a time, rather than a daypart at a time.

Figure 27B:
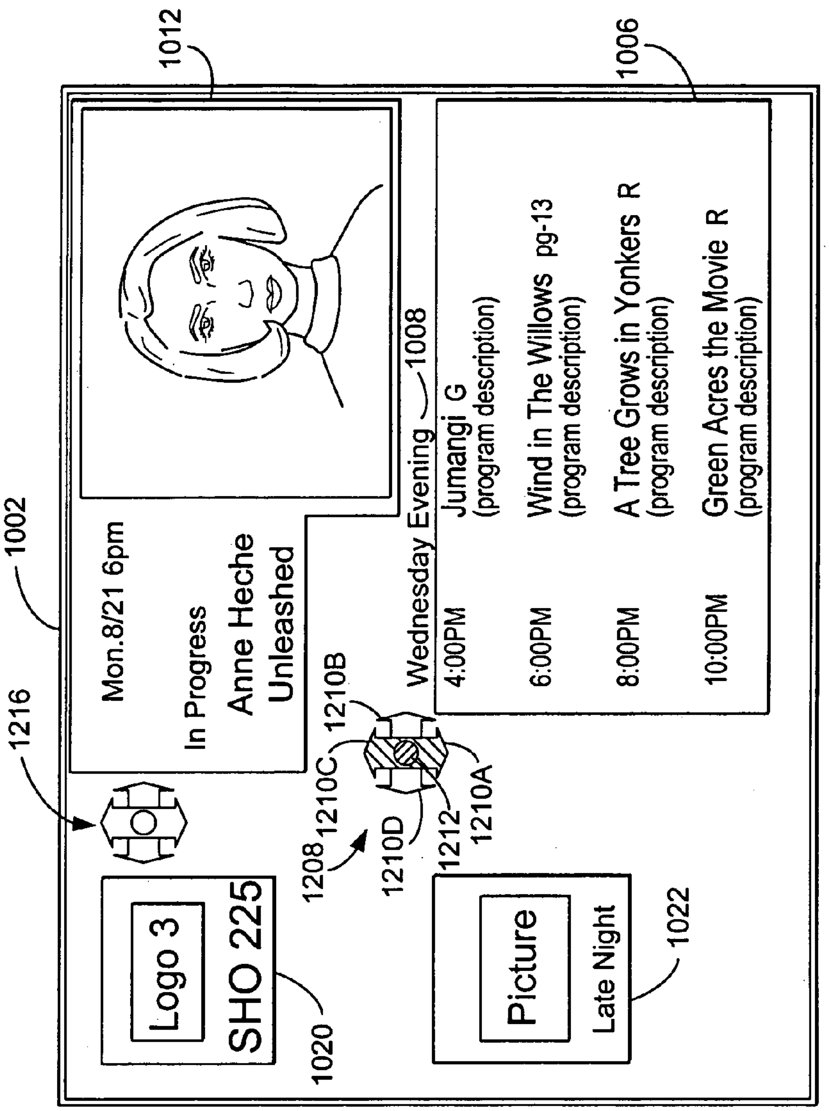
FIGS. 27A and 27B are diagrams illustrating a menu guide resulting from a program-by-program navigation of the menu content portion.
Figure 27A:
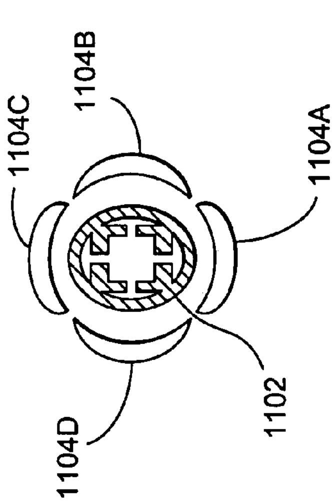

For example, suppose the user has navigated to the menu guide shown in FIG. 25 (e.g. 1002A(1,3)). This menu guide 1002 shows program guide information for the programs "Wind In the Willows", "A Tree Grows in Yonkers", "Green Acres the Movie" and "Red Shoe Diaries" in the menu content portion 1006. If the user wishes to see program guide information for one or more programs preceding those broadcast in the "Tonight" daypart (annotated as "Wednesday Night", because the user has moved forward 48 hours), the user can manipulate the upper periphery of the thumb rocker 1102 to navigate to the preceding program. The menu guide 1002 resulting from a program-by-program navigation of the menu content portion 1006 is shown in FIG. 27. Note that since the selected program (Jumangi) is broadcast at 4 PM, a time which is in the preceding daypart ("Evening"), hence, the menu guide 1002 is presenting programs which are in two dayparts. To indicate that the menu guide 1002 has transitioned to display programs in a new daypart, the display of the selected daypart 1008 in the daypart menu guide portion 1010 changes the display of the selected daypart from "Tonight" to "Evening."

Figure 28B:
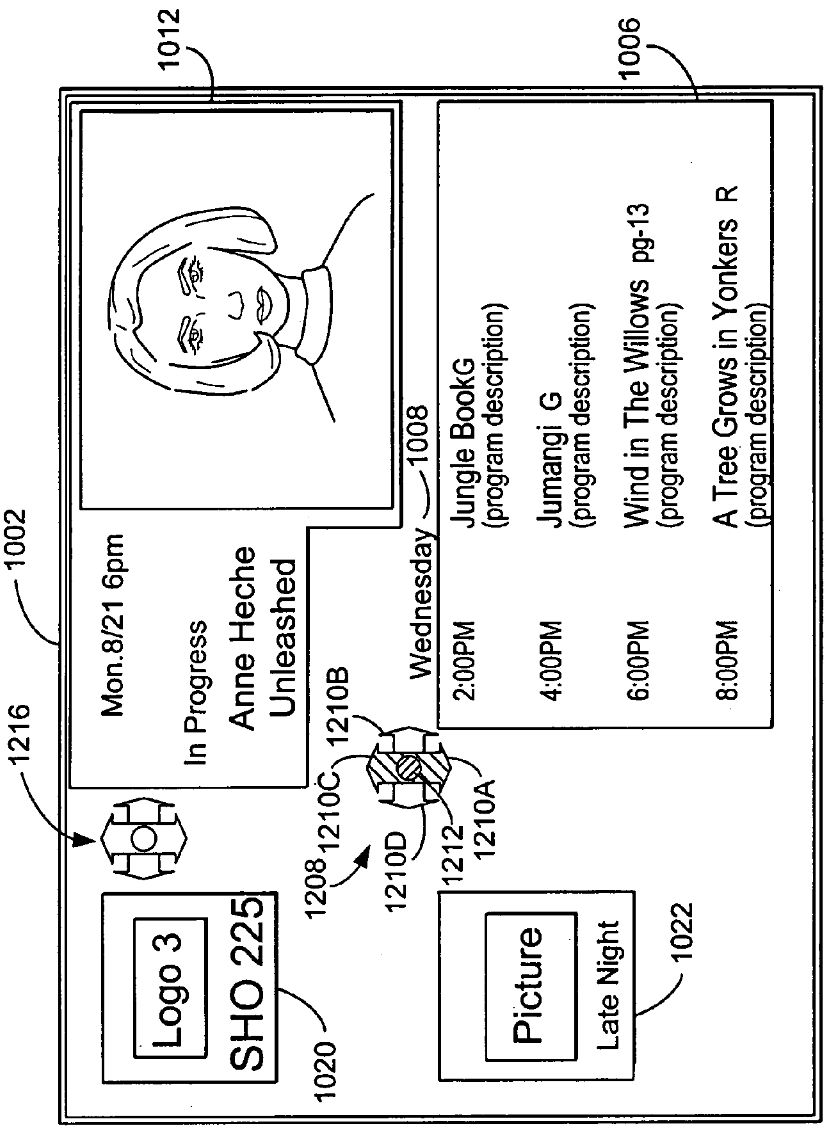
FIGS. 28A and 28B are diagrams illustrating a menu guide resulting from selecting one or more programs preceding those displayed in the menu content portion.
Figure 28A:
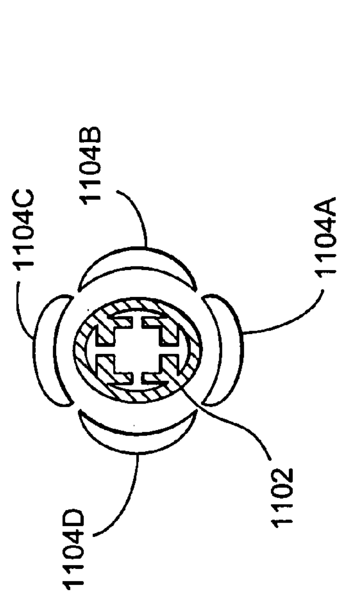

If the user navigates the menu guide shown in FIG. 27 to select one or more programs preceding those displayed, program information regarding the preceding program (in the illustrated example, "Jungle Book") is displayed, and the selected daypart is again changed to reflect the earliest program shown in the menu content portion 1006. An exemplary result is shown in FIG. 28.

Figure 29:
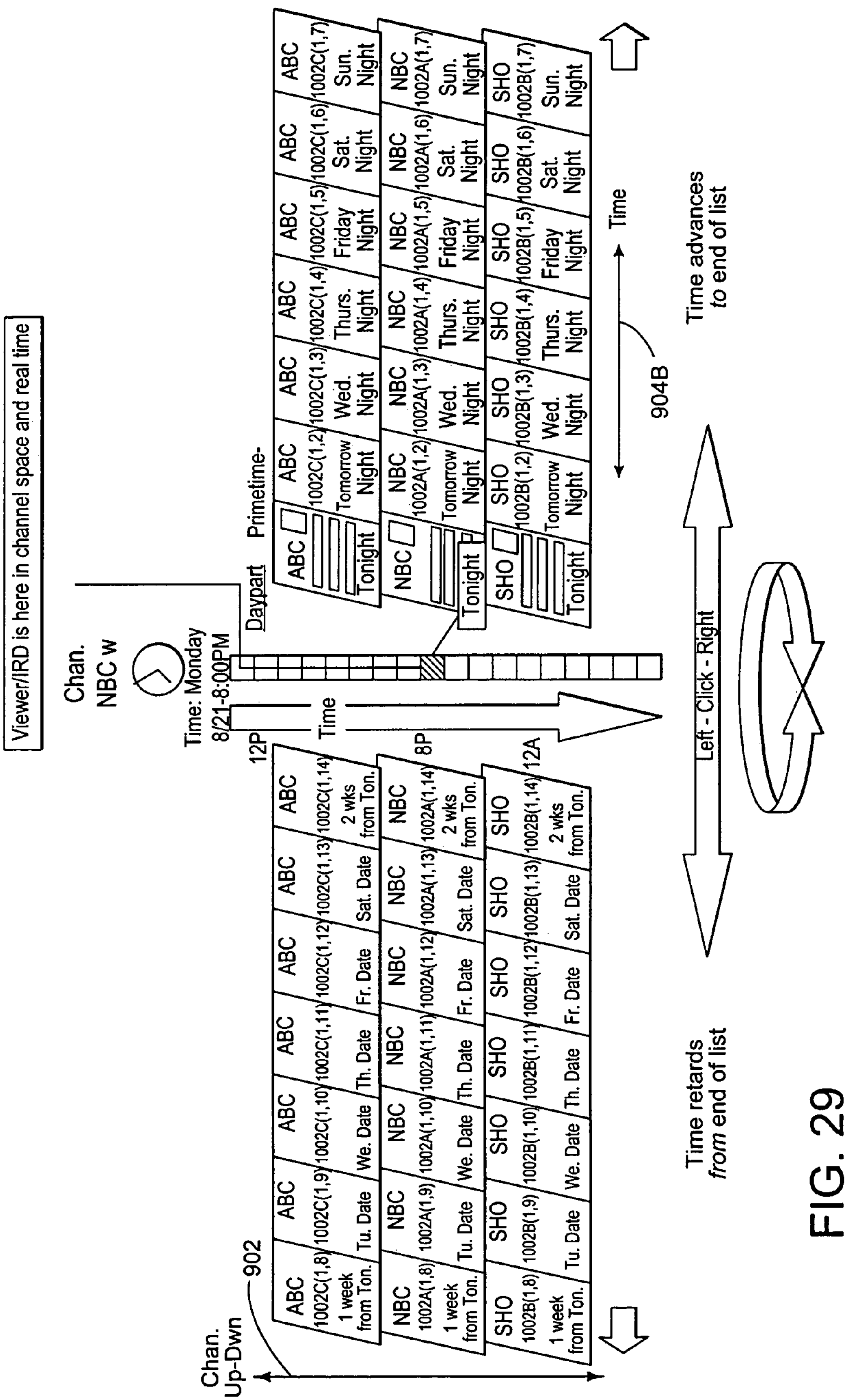
FIG. 29 is a diagram illustrating navigation between dayparts and among dayparts for different days.

The present invention also permits the user to navigate between dayparts and among dayparts for different days with a minimum of keystrokes. This process is illustrated in FIG. 29, which presents a representation of the program information space represented by dayparts. As shown in FIG. 29, the program information space 900 is wrapped in the time dimension 904. Thus, within seven keystrokes, the user can "hop" forward through the same daypart a full week ahead by clicking right (e.g. from menu guide 1002A(1,1) to menu guide 1002A(1,2) and the like to menu guide 1002A(1,7)). Fourteen clicks right advances through the entire two week time period (e.g. from 1002A(1,1) to 1002A(1,2) and the like to menu guide 1002A(1,14). Alternatively, by clicking left once, the user can "hop" or navigate directly to the end of the two week period (e.g. from menu guide 1002A(1,1) to 1002A(1,14) in a single click. By continuing left, the user may proceed retrograde through the entire time period (for example, from 1002A(1,14) to 1002A(1,13). As a result, the furthest point forward in navigation space 900 with a fourteen day time period can be as little as one, but not more than seven user commands away.

Returning to the Home Menu Guide

The user can return to the menu guide 1002A(1,1) showing the media programs broadcast in the current daypart by navigating the menu content portion in the other direction (essentially reversing the commands entered). This can also be accomplished by selecting a "home" key on the remote control 540 or other user input device. This can also be accomplished by navigating from the menu content portion 1006 to another portion of the menu guide 1002 (for example, the channel selector portion 1020). When any of these commands are provided, the menu content portion 1006 returns to displaying program information regarding the programs transmitted during the current daypart on the currently selected channel. FIG. 30 is an illustrative example showing how the user can navigate to return to the menu guide 1002A(1,1) showing the media programs broadcast in the current daypart by navigating to the channel selection portion 1020.

Channel Categorization and Sorting

Figure 30B:
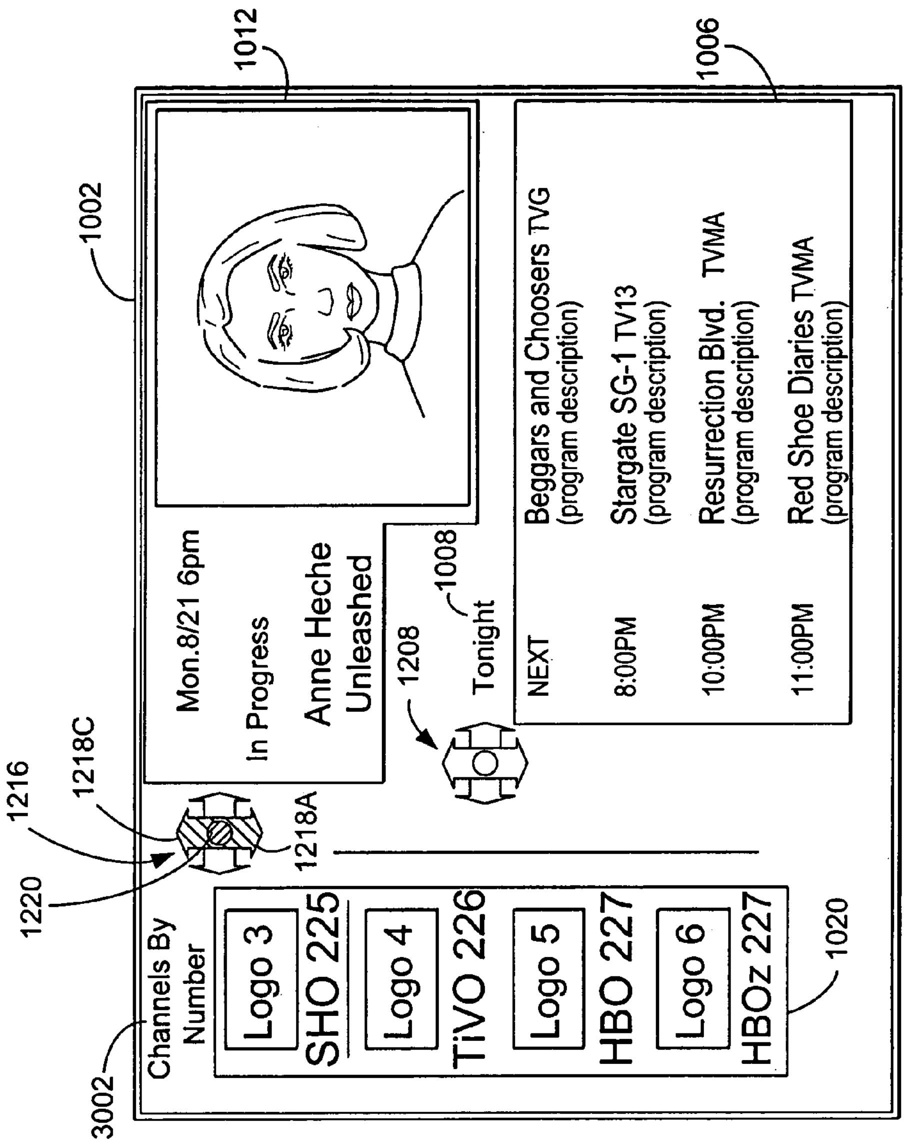
FIGS. 30A and 30B are diagrams illustrating the organization of the channel selection portion of the menu guide.
Figure 30A:
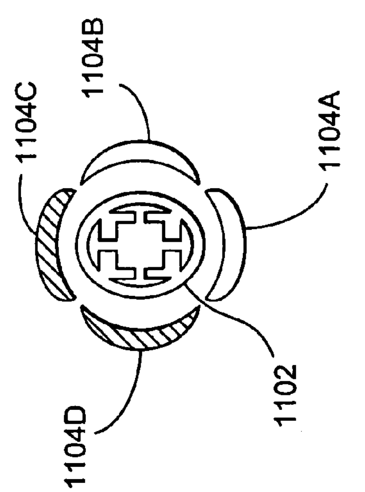
Figure 31B:
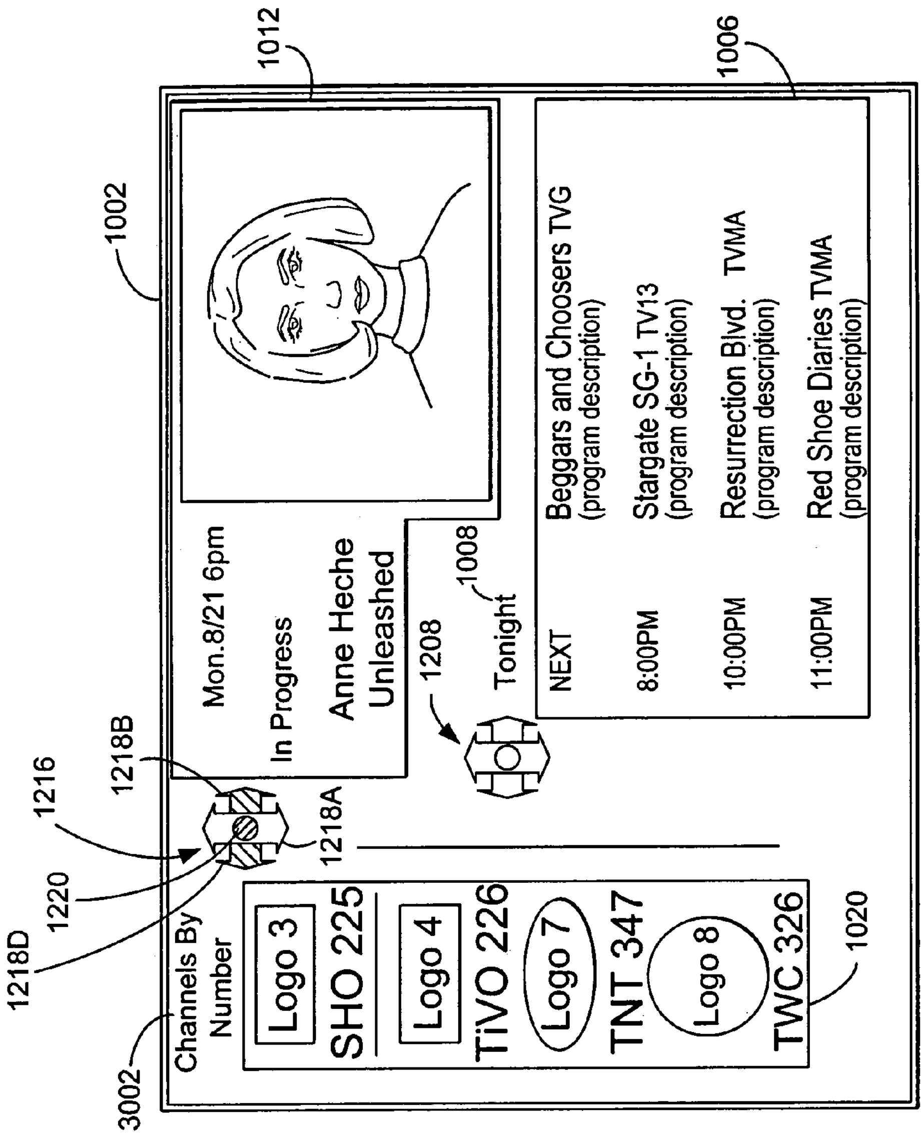
FIGS. 31A and 31B are diagrams illustrating channels organized into alphabetical order.
Figure 31A:
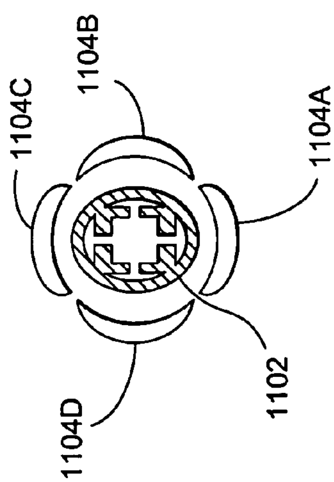

In one embodiment of the present invention, the channels presented in the channel selection portion 1020 can be organized in different ways that are selected by the user. For example, the channels may be organized by channel number, as shown in FIGS. 30A and 30B in either an ascending or descending order. A sorting annunciator 3002 or similar indication may be presented within or adjacent to the channel selection portion 1020 to indicate which sorting paradigm is used. The channels can also be organized, in alphabetical order, as shown in FIGS. 31A and 31B. This can be accomplished, for example, in response to a user's selection of the right or left periphery of the thumb rocker 1102. Further selection of the right or left periphery of the thumb rocker 1102 can select other sorting methods, including sorting by genre of programs provided on each channel. In this context, the "genre" of the programs can be determined by the ultimate provider of the programs on the channel or from the type of programs provided (e.g. music, movies, cartoons). The channels may also be sorted according to the user's favorite channels. The favorite channels can be defined directly by user input, or may be determined from stored viewing patterns. Further, since the IRD can retain information for multiple users, the determination of favorite channels can be determined as the favorites of an aggregate of all persons using the IRD 500, or can be unique to each user.

Figure 32B:
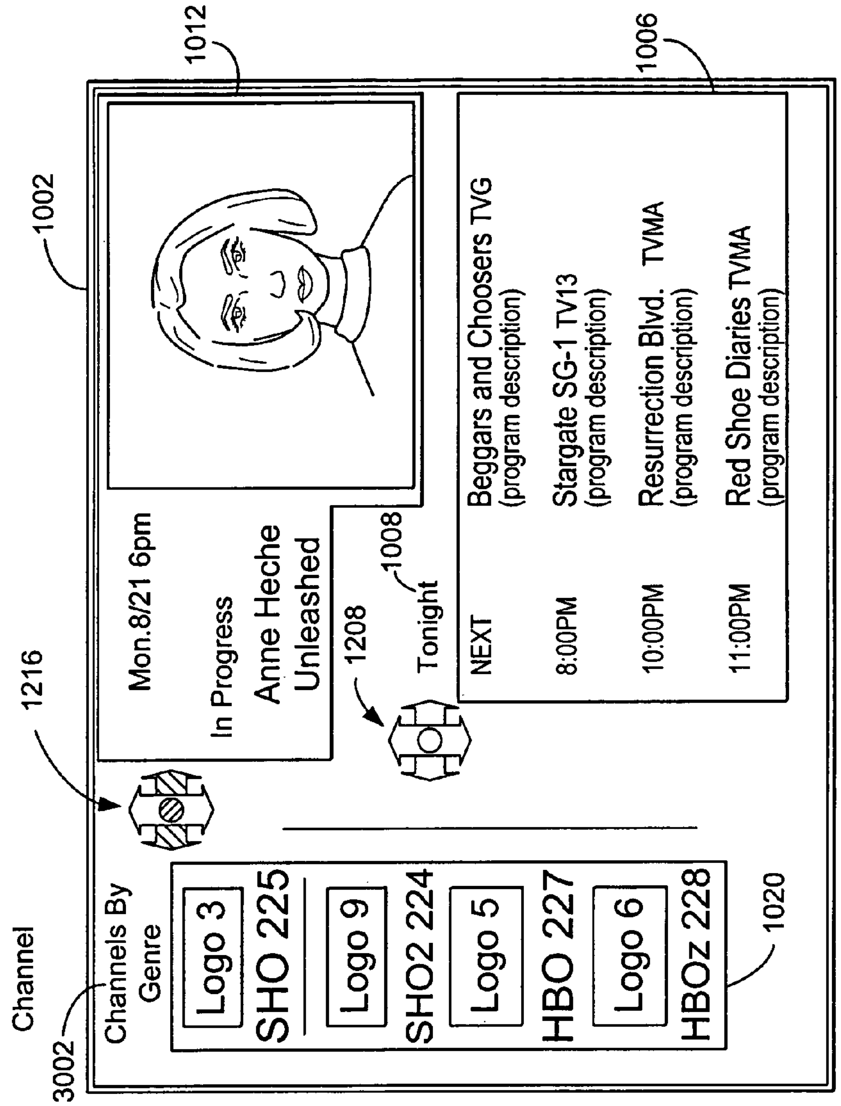
FIGS. 32A and 32B are diagrams illustrating the channels organized according to genre.
Figure 32A:
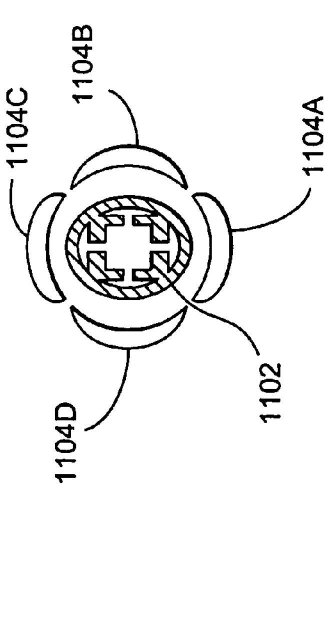
Figure 33B:
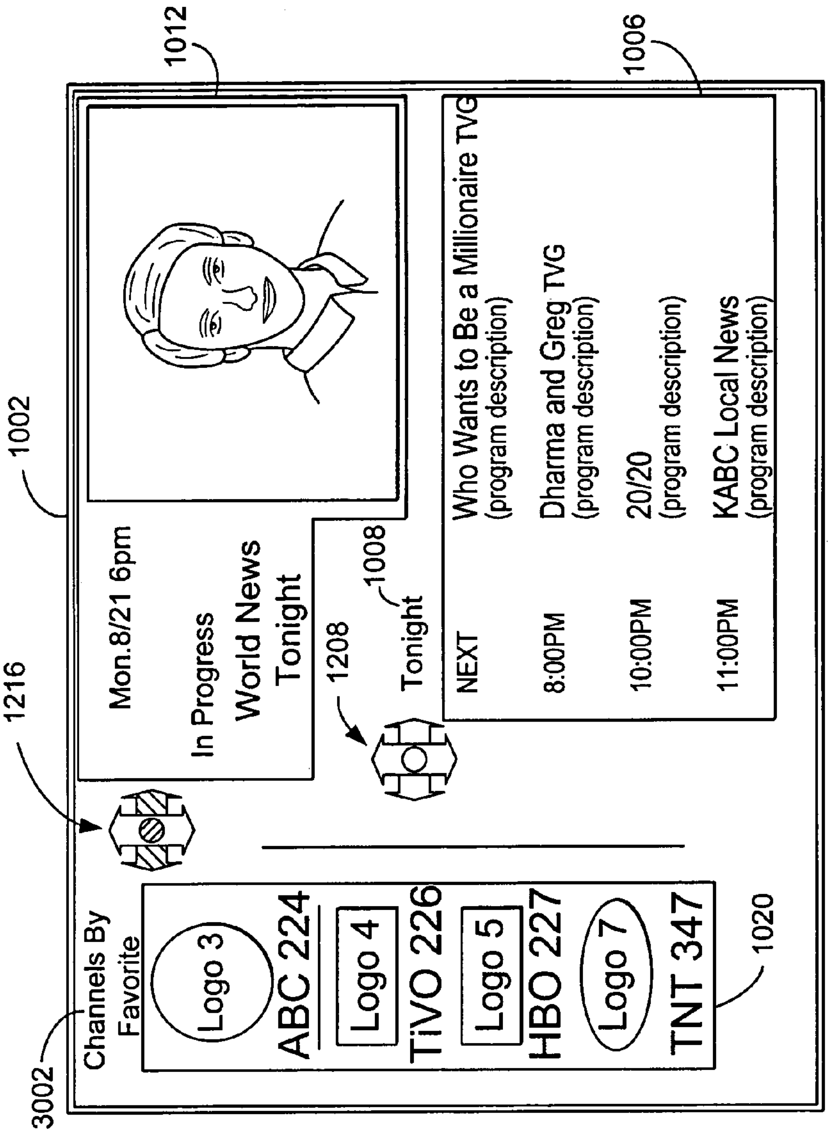
FIGS. 33A and 33B are diagrams illustrating a menu guide with channels organized according to favorites.
Figure 33A:
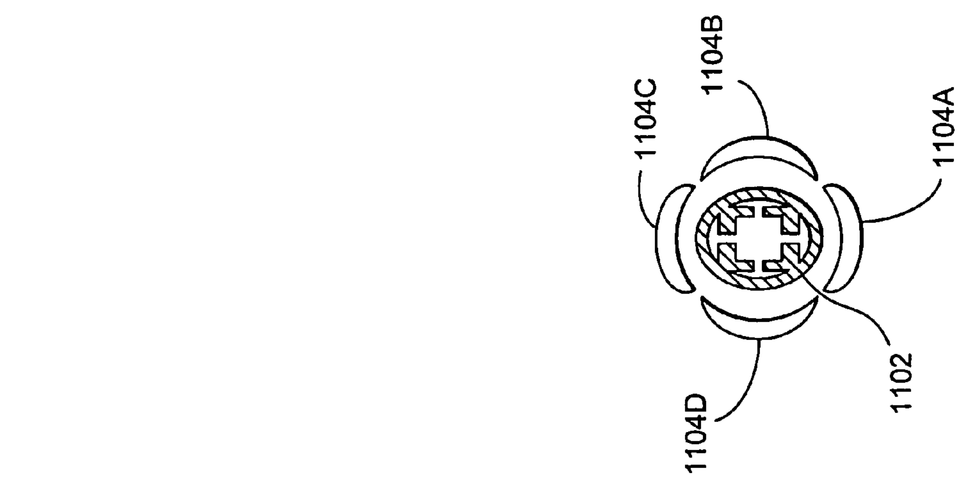

FIGS. 32A and 32B as well as FIGS. 33A and 33B show menu guides 1002 with the channel selection portion 1020 organized according to genre and favorites, respectively.

FIGS. 33A and 33B also show that when the user selects a different channel than the tuned channel (e.g. changing the channel selection from SHOWTIME channel 225 in FIG. 32 to the ABC channel 224), the PIG portion 1012 is updated to show the program transmitted on the currently selected channel (an in-progress program provided on channel 224), and the menu content portion 1006 is updated to provide program guide information regarding the programs to be transmitted during the current daypart.

Figure 34B:
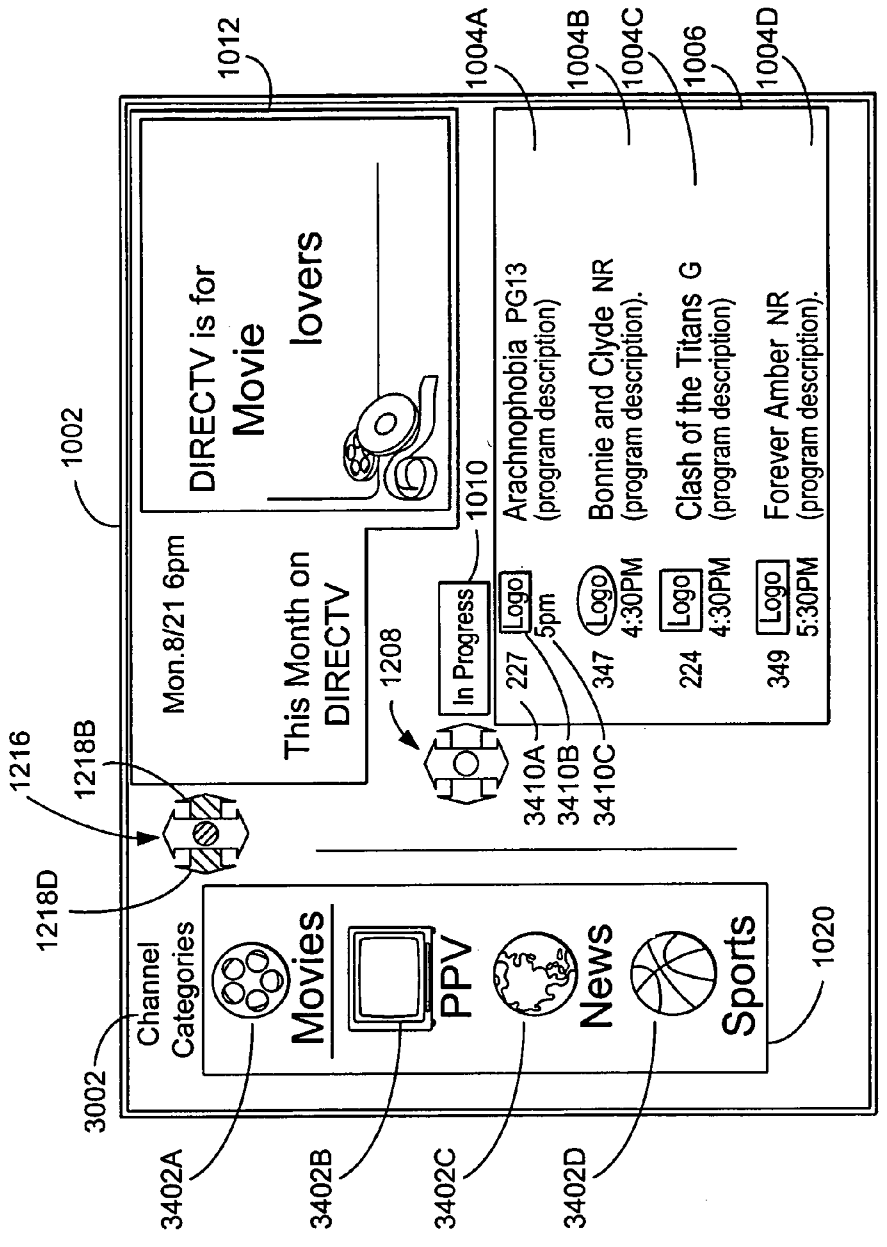
FIGS. 34A and 34B are diagrams illustrating a menu guide wherein the channel selection portion is organized according to channel categories.
Figure 34A:
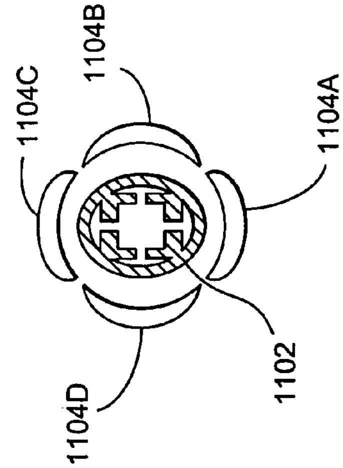

FIGS. 34A and 34B illustrate of a menu guide 1002 wherein the channel selection portion 1020 is organized according to channel categories. This organization can be selected by appropriate manipulation of the right and left periphery of the thumb rocker 1102. Channel categories include, for example, movies, pay-per-view (PPV) programs, news programs, and sports programs, each associated with an appropriate channel category indicator 3402 such as the movie category indicator 3402A, the PPV category indicator 3402B, the news category indicator 3402C, or the sports category indicator 3402D. The movie category can encompass all channels including PPV and all movies which have been recorded on a PVR or similar recording device.

When the channel selection portion 1020 of the menu guide is organized into channel categories, the menu content portion 1006 displays media guide content 1004 describing media programs currently available on different channels. When the category is selected, the data regarding media program is parsed to select those media programs belonging to that category, and the daypart menu guide portion 1010 is changed to indicate that the media programs described in the menu content portion are those which are "In Progress" or otherwise currently available (e.g. those which have been recorded or are in the process of being recorded by a PVR or similar device, and are hence at least partially available for viewing).

In the embodiment illustrated in FIG. 34, the media guide content 1004 presented in the menu content portion 1006 includes an indication of the channel providing the media program (which may include the channel number 3410A and/or logos 3410B or text), the time the transmission of the media program commenced or is to commence 3410C, and information regarding the media program itself, including the title (e.g. "Arachnophobia") and a short description of the media program. The media programs described in the menu content portion 1006 can be organized alphabetically, by start time, or by favorite channels designated by the user or determined from historical viewing patterns.

The PIG portion 1012 can either show the currently in-progress media program on the first channel in the menu content portion, or a program selected by manipulation of the remote control 540 buttons. Or, the PIG portion 1012 can play live barker channel video or a video program (e.g. a trailer) pre-stored on a storage device such as a hard drive in the IRD 500 or a PVR.

The PIG portion 1012 can also present advertising material. The advertising material can include information regarding a media program selected in the menu content portion 1006, or other media programs available from the same source (e.g. studio or distributor) as the selected media program.

Navigating the Menu Guide by Channel Categories

Figure 35B:
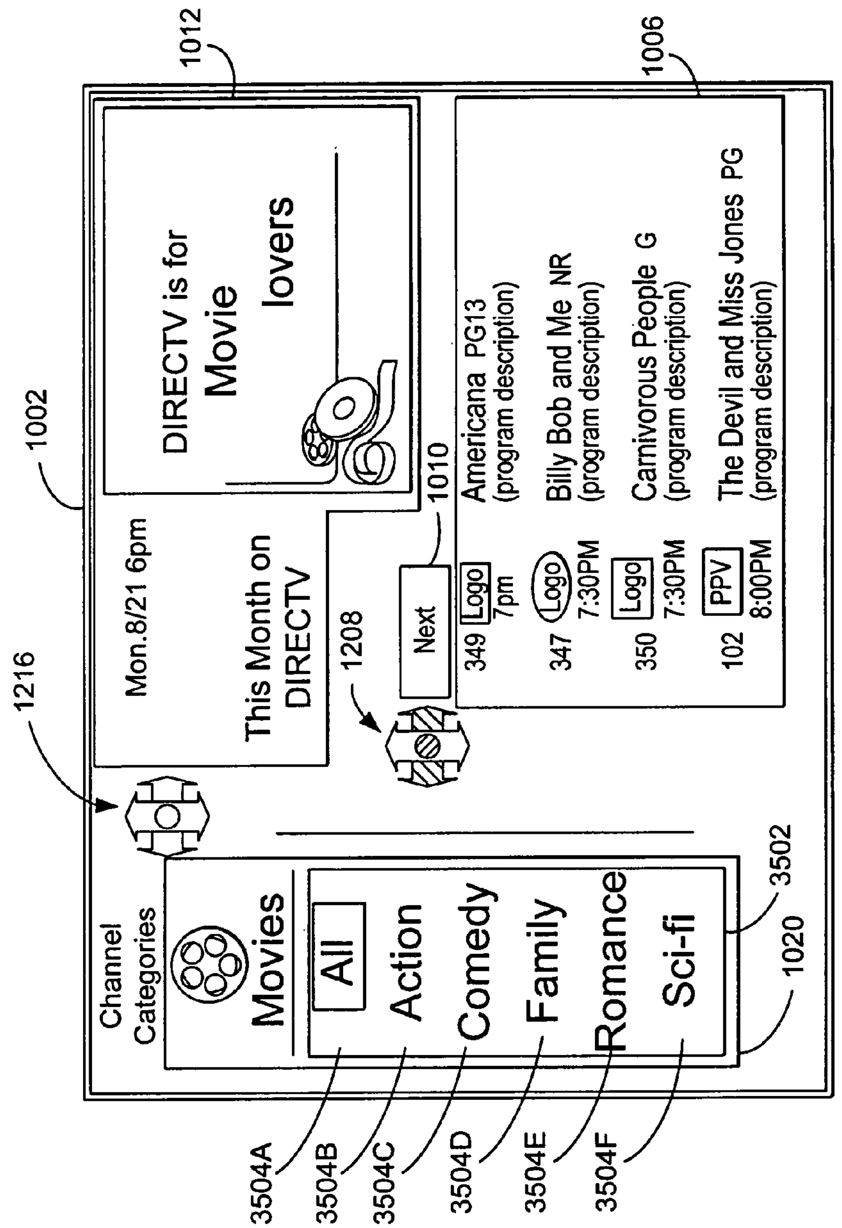
FIGS. 35A and 35B are diagrams illustrating how the menu guide can be used to manage the presentation of the content in a channel category.
Figure 35A:
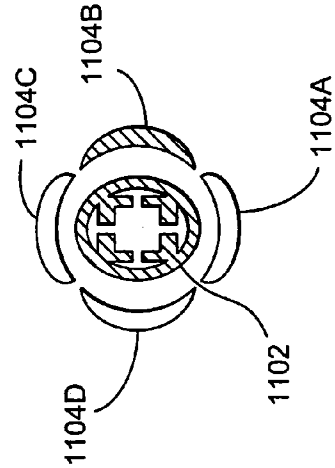

FIGS. 35A and 35B are diagrams illustrating how the menu guide 1002 can be used to manage the presentation of the content in a channel category. The selection of button 1104B activates the menu content portion 1006 of the menu guide 1002. Selecting the right periphery of the thumb rocker 1102 scrolls the list from "In Progress" to "Next" in which only those movies that have start time instances immediately following the current time of day are displayed. As previously described, the movies can be organized by alphabetical order, or another organization. Since the user has navigated away from the channel selection portion 1020 of the menu guide 1002, the menu guide 1002 is anchored to the "Movies" category. The channel selector portion 1020 now includes a channel subcategory portion 3502 in which the movies can be further categorized according to one or more groups (e.g. "action" 3504B, "comedy" 3504C, "family" 3504D, "romance" 3504E, "science fiction" 3504F, etc.), or all genres 3504A can be displayed. To select which of the subcategorizations should be applied, the user can select the upper or lower periphery of the thumb rocker 1102.

In one embodiment, in addition to showing the daypart-based information above, a the media program information can be categorized independently according to other parameters that are provided into the daypart-organized dayparts. The "Next" designation is an example of such a characterization. For example, if the user accesses the program space during the tonight daypart 1002A(1,1), media programs that are "In Progress" can be presented first. Further, media programs which are on "Next" can be presented before allowing the user to scroll to the next succeeding daypart.

Pre-recorded pay per view (PPV) media programs (those which were recorded in a memory in or accessible to the IRD 500 for PPV viewing can also be shown in the menu content portion 1006, or in another window adjacent to the media content portion 1006 or elsewhere in the menu guide 1002.

Figure 36A:
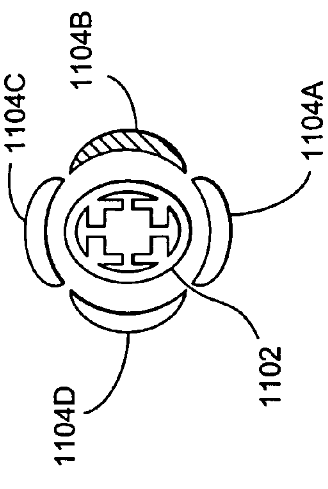
FIGS. 36A and 36B are diagrams illustrating how the menu guide can be used to present channel category content according to daypart.
Figure 36B:
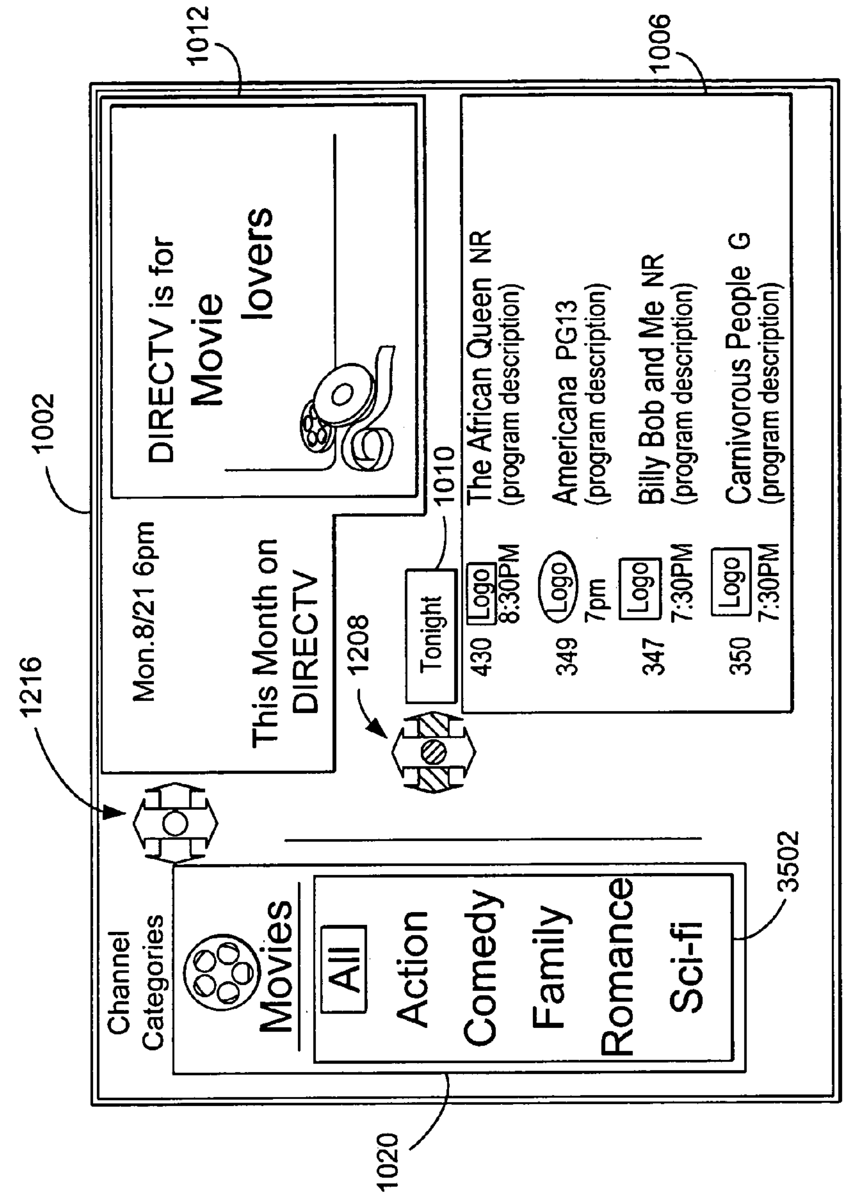

FIGS. 36A and 36B are diagrams illustrating how the menu guide 1002 can be used to present channel category content according to daypart. In the example shown, the user has selected the right periphery of the thumb rocker 1102 to navigate the menu guide 1002 from the "Next" to the "Tonight" daypart. The menu content portion 1006 now displays channels with all movies (the selected category and subcategory) that have start times following the current time of day (Monday at 6 PM). The daypart menu guide portion 1010 is changed to show that the currently selected daypart is the "Tonight" daypart.

Figure 37B:
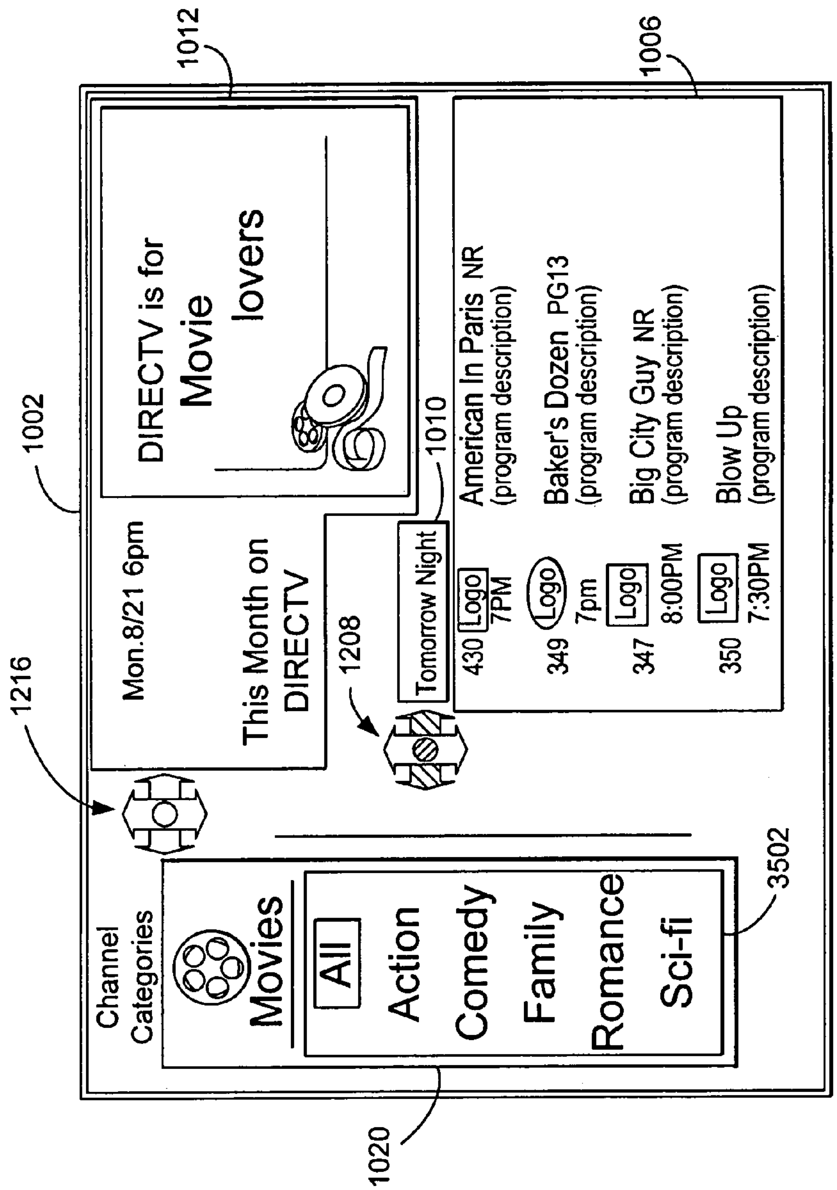
FIGS. 37A and 37B are diagrams illustrating how the menu guide can be navigated the same daypart on a different day.
Figure 37A:
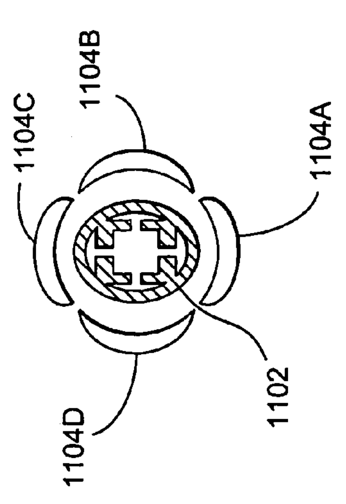

FIGS. 37A and 37B are diagrams illustrating how the menu guide 1002 can be navigated the same daypart on a different day. Here, the user has selected the right periphery of the thumb rocker 1102 to navigate the menu guide to include a menu guide 1002 from the "Tonight" daypart on Monday to the same daypart on Tuesday ("Tomorrow Night"). The menu content portion 1006 now presents information regarding media programs available in the "Tonight" daypart for the following day, and the daypart menu guide portion 1010 is changed to reflect this change.

Figure 38B:
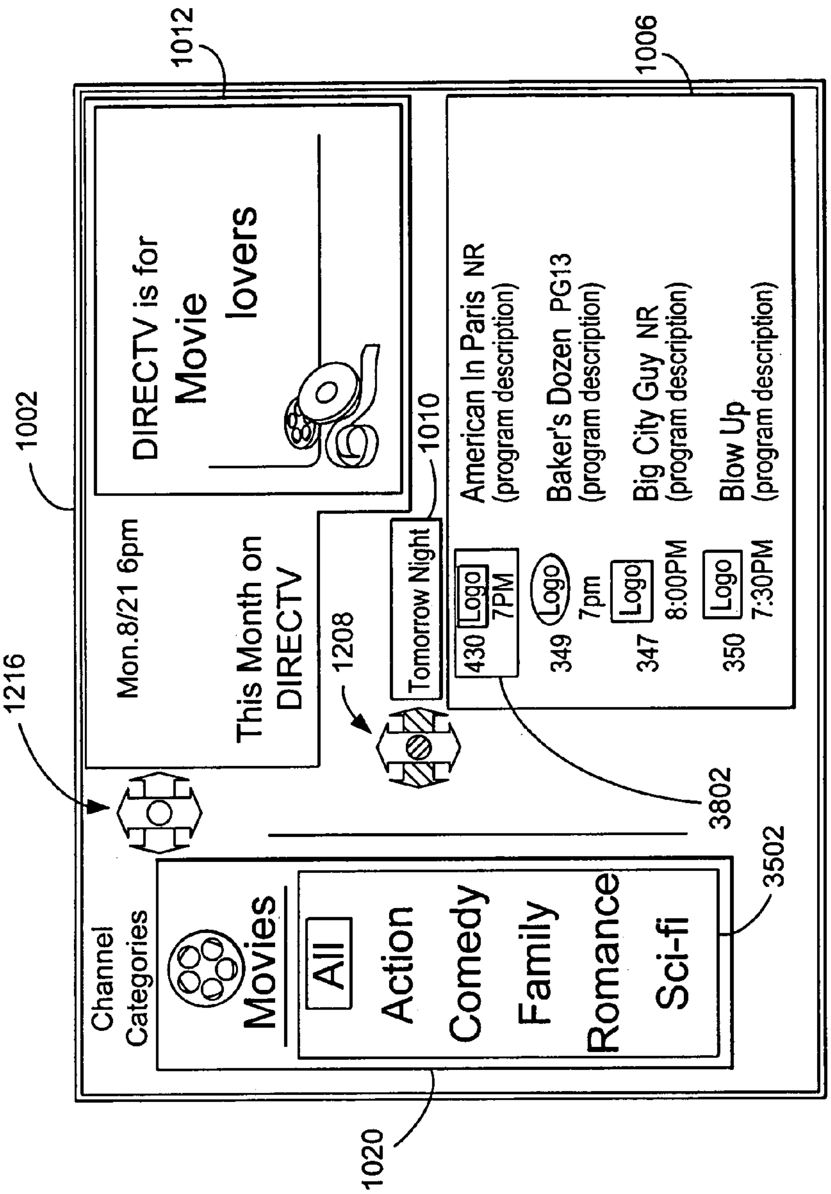
FIGS. 38A and 38B are diagrams illustrating how the menu content portion of the menu guide can be navigated.
Figure 38A:
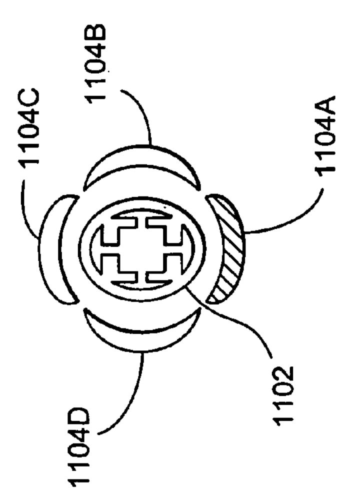

FIGS. 38A and 38B are diagrams illustrating how the menu content portion 1006 of the menu guide 1002 can be navigated. Here, the user has selected the bottom periphery of the thumb rocker 1102 to select a media program listed in the menu content portion 1006. The selected media program is highlighted or otherwise denoted by an annunciator 3802.

Figure 39B:
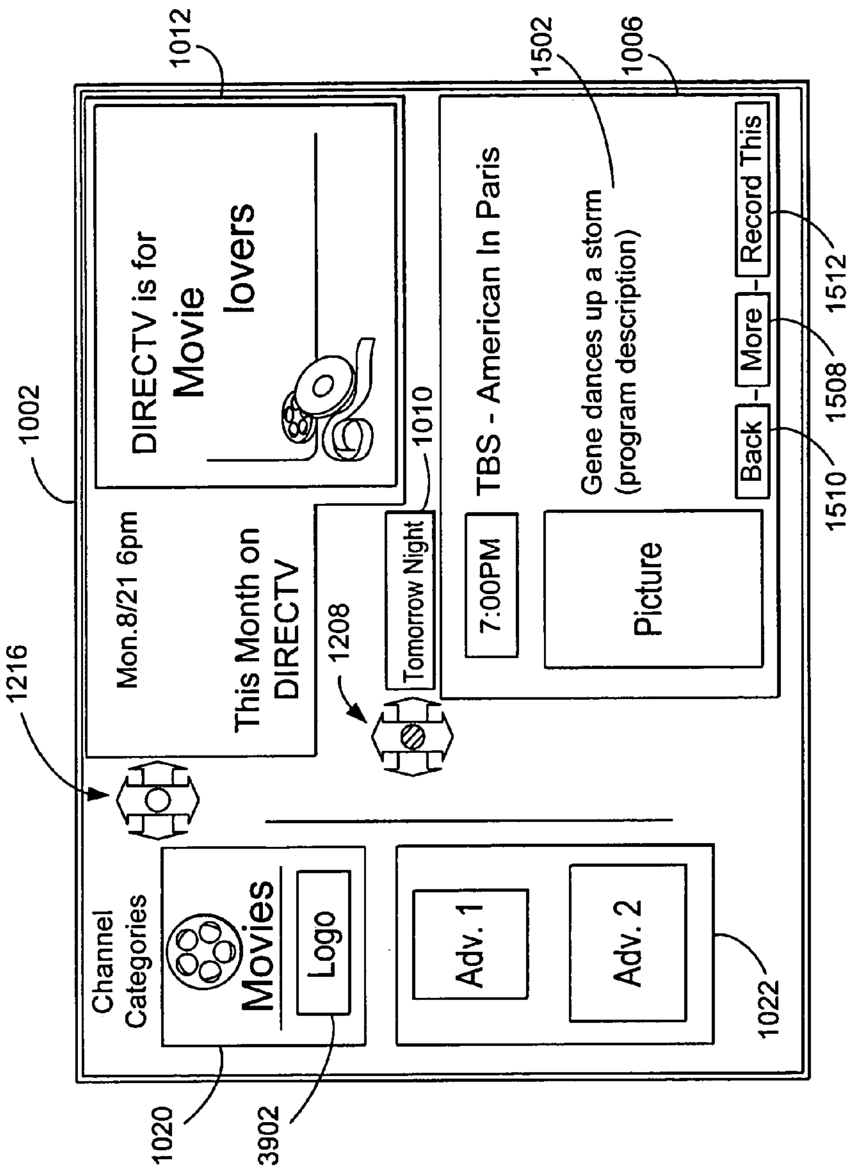
FIGS. 39A and 39B are diagrams illustrating how the user may obtain additional media program information regarding selected media programs listed in the media content portion.
Figure 39A:
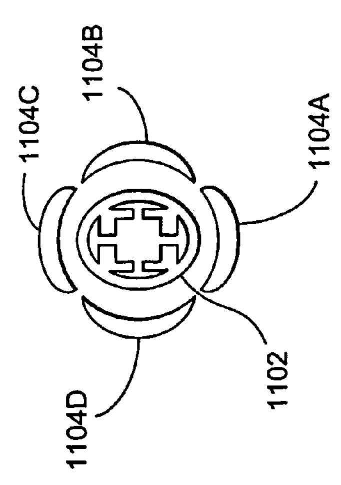

FIGS. 39A and 39B are diagrams illustrating how the user may obtain additional media program information regarding selected media programs listed in the media content portion 1006. Here, the user has clicked the thumb rocker 1102 to select the highlighted media program (in the illustrated example, "American In Paris"). The menu content portion 1006 is altered to display information about the selected program alone. The menu content portion 1006 now includes a photograph or sample video 1506 of the program, a detailed textural description of the program 1502. If the user wishes more detailed information about the selected media program, the user can indicate as such by manipulating the rocker button 1002 to select an icon or text such as the "More" text 1508. If the user wishes to return to the menu guide presented in FIG. 38, the user can select the "Back" text 1510. Further if the user would like to record the selected program on a PVR or similar device, this can be accomplished by selecting the "Record This" text 1512.

When the user has selected a particular channel, the channel portion displays the currently selected channel (or media program provider) 3902 in the channel selection window 1020, and the channel selection window 1020 is altered to permit the display of the advertising portion 1022. In the illustrated embodiment, the information presented in the advertising portion 1022 is interactive advertising that is related to the selected channel. In the illustrated example, the advertising includes a "Ted's Box" advertisement that is related to the TBS (Turner Broadcasting System) media provider. Advertisements may include icons, text, video clips, photographs, Java scripts, or equivalents.

Note that in the examples presented above the PIG portion 1012 displays placeholder information. In another embodiment of the present invention, the PIG portion 1012 of the menu guide 1002 can be put to use with directed or undirected advertising, or can be deleted entirely to make room for larger sized advertising portion 1022 or a larger sized menu content portion 1006.

Figure 40B:
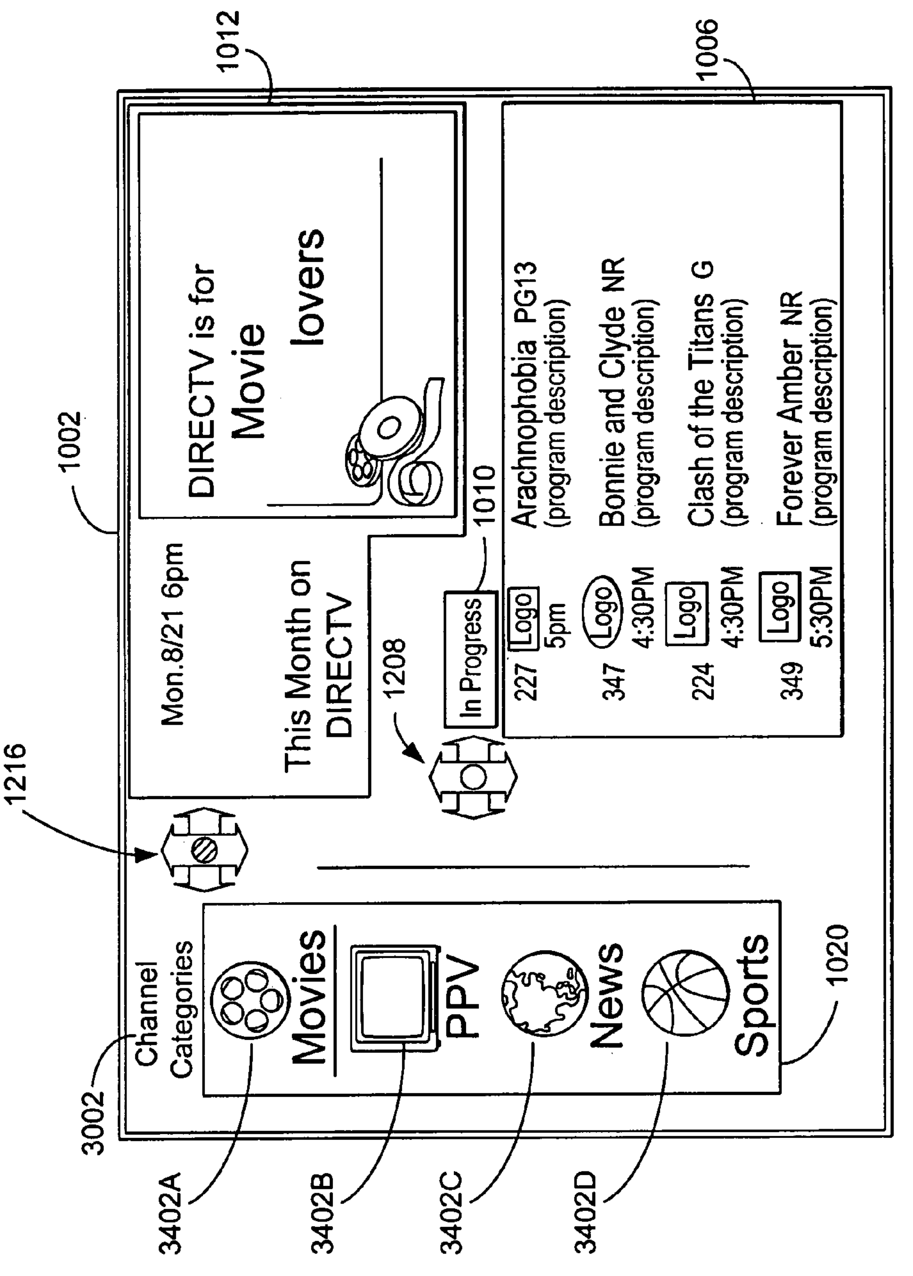
FIGS. 40A and 40B are diagrams illustrating how the user may use the menu guide 1002 to manage sports content.
Figure 40A:
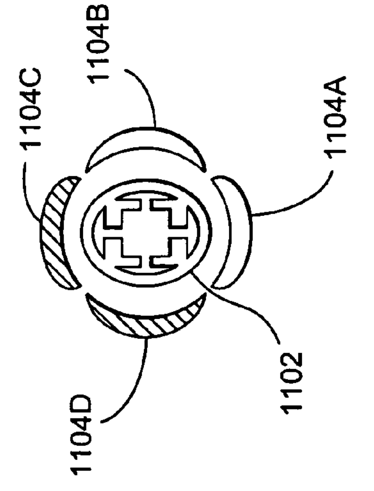

FIGS. 40A and 40B are diagrams illustrating how the user may use the menu guide 1002 to manage Sports Content. By suitable selection of remote control buttons (e.g. buttons 1104C and 1104D), the user can navigate to the channel selection window 1020. In one embodiment, the menu content portion 1006 retains the same content when the user navigates to the channel selection window 1020. In another embodiment, the menu content portion 1020 changes to display programs "In Progress" as shown in FIG. 40.

Figure 41B:
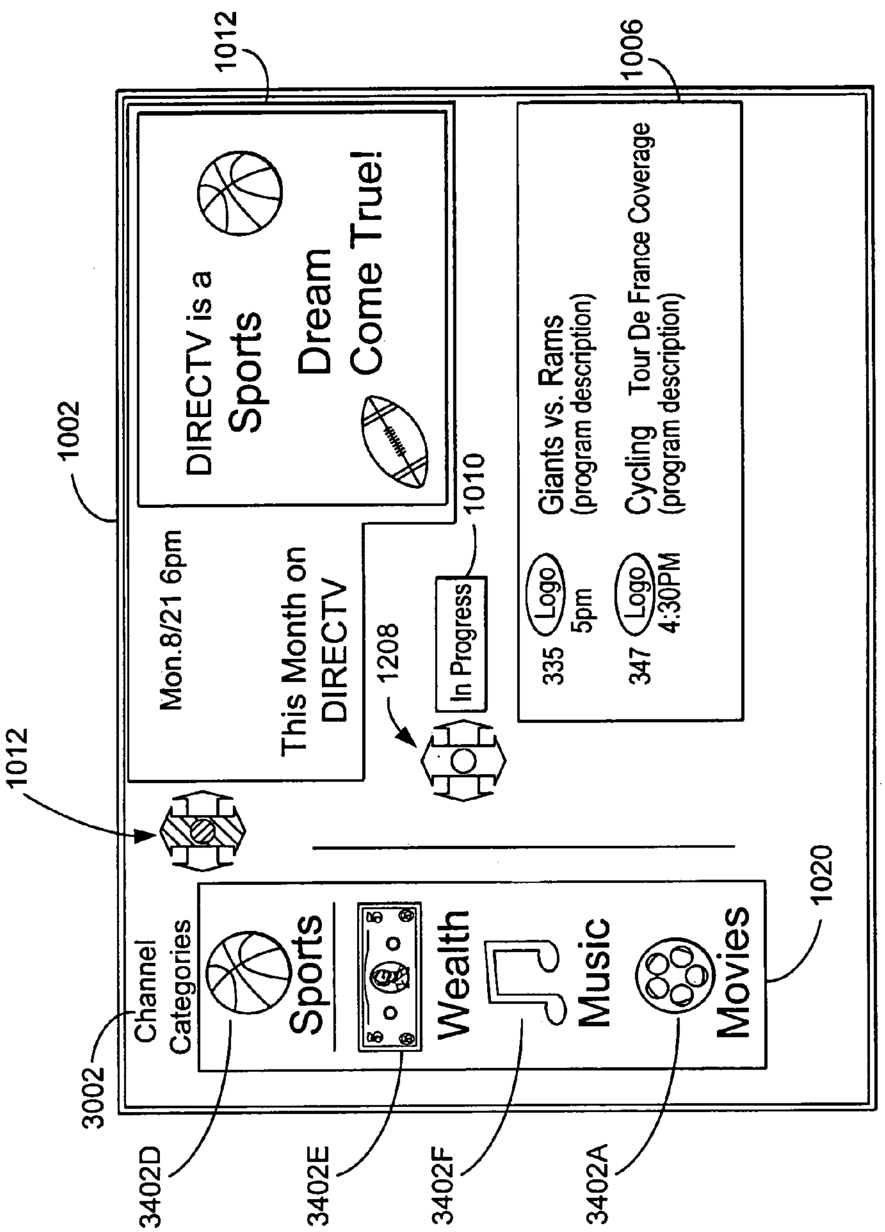
FIGS. 41A and 41B are diagrams further illustrating navigation of the channel selection portion.
Figure 41A:
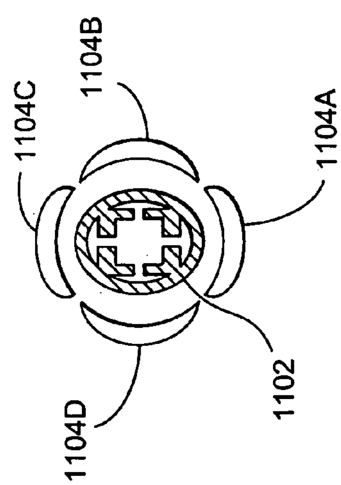

FIGS. 41A and 41B are diagrams further illustrating navigation of the channel selection portion 1020. Using the upper periphery of the thumb rocker 1102, the user can scroll the channel list presented in the channel selector portion 1020 to select a different channel category. In the illustrated example, additional channel categories 3402, including a wealth category 3402E and a music category 3402F are shown in the channel selection portion 1020. The selected channel category (the "Sports" channel category 3402D) can be indicated by an annunciator, or as simply the upper or lowermost channel presented in the channel selector portion 1020. As the user scrolls through the categories, the menu content portion 1006 of the menu guide is updated to show the media programs belonging to the selected category. In the illustrated example, the "In Progress" media programs belonging to the sports category are displayed in the menu content portion 1006. The PIG portion 1012 plays either a live "barker" channel having promotional material that can be related to provider content offerings. The barker channel can be include audio and/or video stored in a file on a storage device such as a hard drive within or accessible to the IRD 500.

The PIG portion 1012 may include advertising selected according to the selected category (e.g. sports advertising when the viewer selects the sports category, or a sports program). The PIG portion 1012 could default to a channel from a provider that has paid for that privilege, or to the current broadcast that is listed first in the content window (in the illustrated embodiment, the Giants vs. Rams).

Figure 42B:
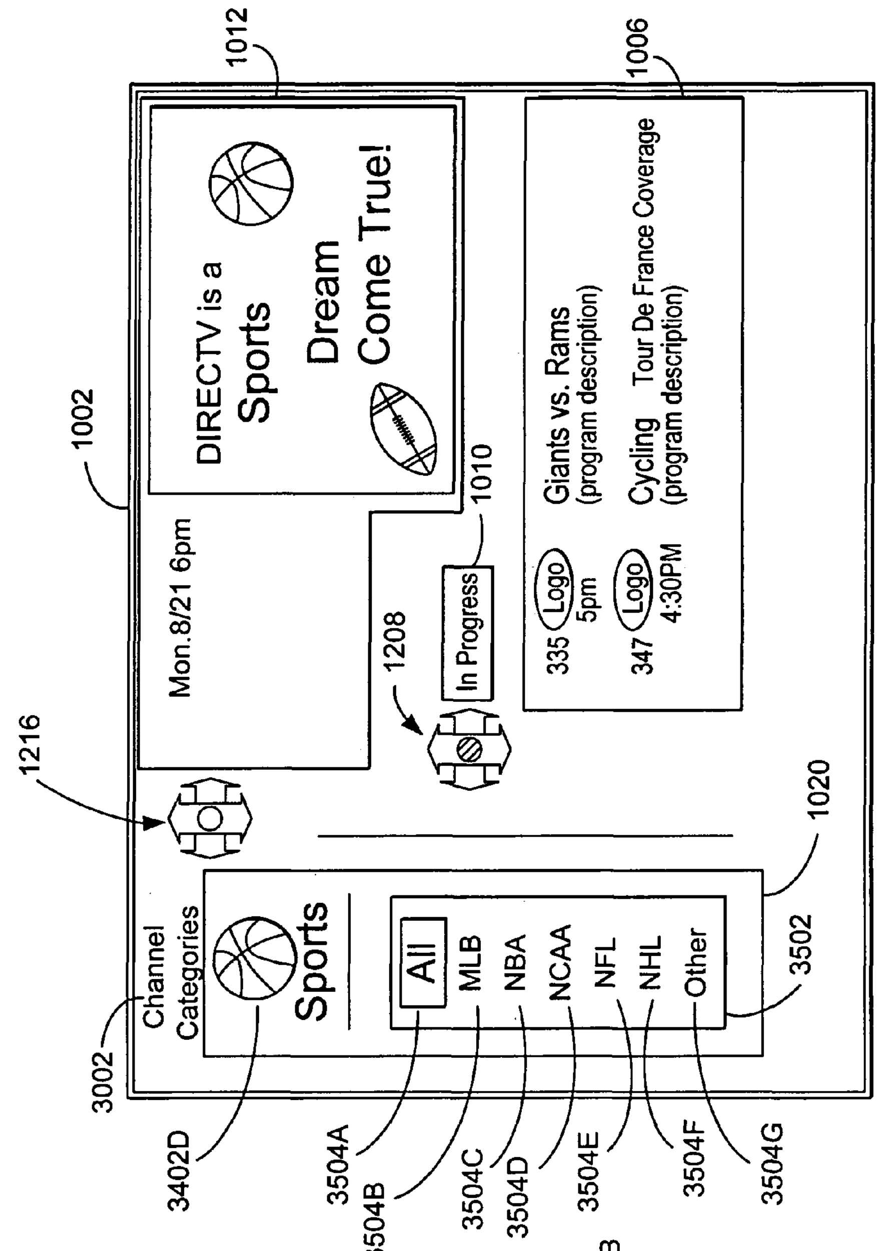
FIGS. 42A and 42B are diagrams further illustrating the navigation of the channel election portion according to channel categories.
Figure 42A:
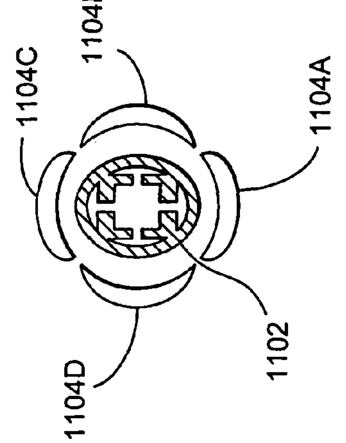

FIGS. 42A and 42B are diagrams further illustrating the navigation of the channel selection portion 1020 according to channel categories. The channel selection categories are presented in response to the user providing further input to the remote control 540 (in the illustrated embodiment, by depressing the center of the thumb rocker 1102). The channel selector portion 1020 again includes a channel subcategory portion 3502 in which the content of the selected category (here, "Sports") can be further categorized into one or more groups (e.g. "MLB" or Major League Baseball 3504B, "NBA" or National Basketball Association 3504C, "NCAA" or National Collegiate Athletic Association 3504D, "NFL" or National Football League 3504E, "NHL" or National Hockey League 3504F, or "Other" 3504G). The subcategories can be arranged alphabetically, according to explicit user preferences (obtained, for example by expressed viewer commands), implicit viewer preferences (obtained, for example, by from viewing patterns), or can be organized according to temporal considerations (e.g., placing the "NBA" subcategory at the end of the list off season or during time periods when NBA games are not scheduled, and/or moving the "NBA" subcategory to the top of the list during the NBA finals). The screen icons or text representing the subcategories may also change based upon whether there are any programs currently broadcast in that subcategory. For example, if the user particularly prefers cycling sporting events, a cycling subcategory can either be displayed only when cycling sporting event programs are currently broadcast, or a "Cycling" subcategory can change color or shape when an event is being currently broadcast. This feature prevents the user from scrolling through sporting event subcategories with no member programs.

The subcategories described above may be determined by the video service provider, or determined from user viewing patterns, or explicitly specified by the user.

Integrating and Managing Interactive Services

One advantage of the present invention is that it provides information centralized control of all services, including available interactive services.

Figure 43B:
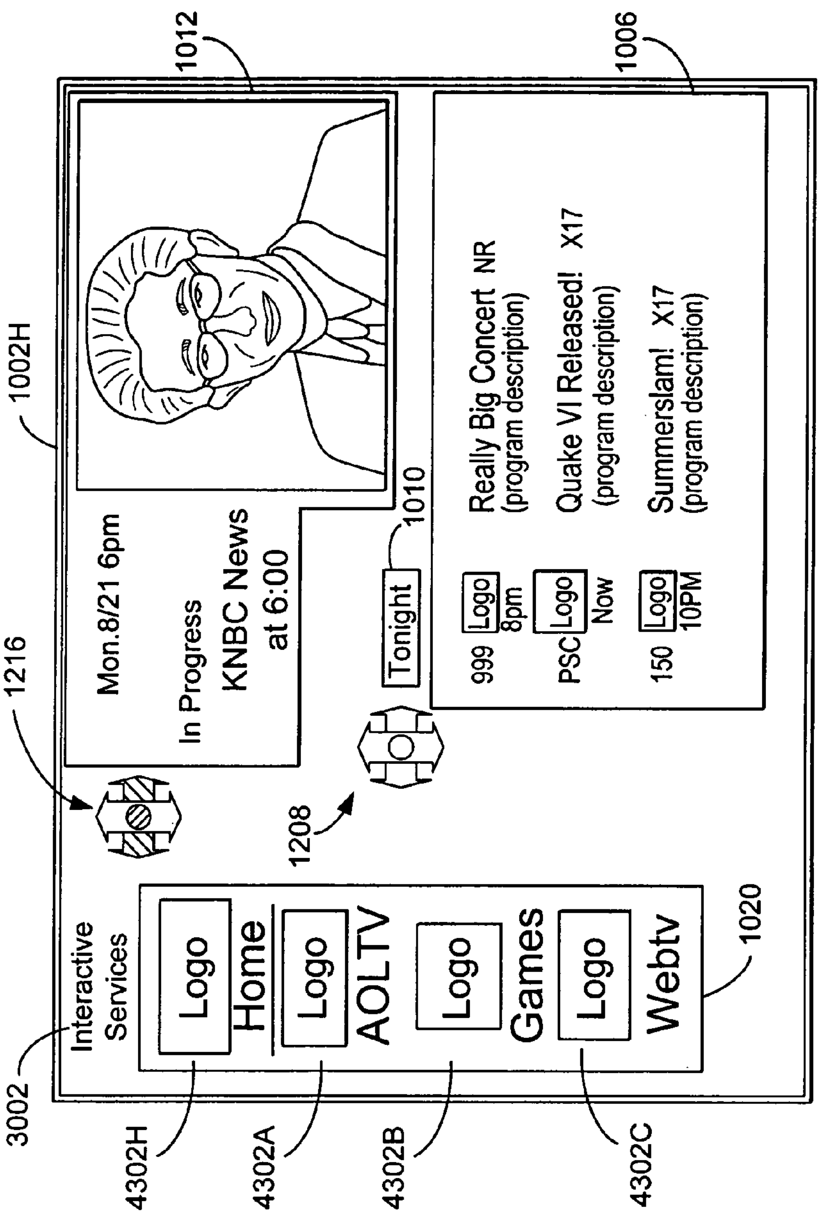
FIGS. 43A and 43B are diagrams illustrating the use of the menu guide to integrate and manage interactive services.
Figure 43A:
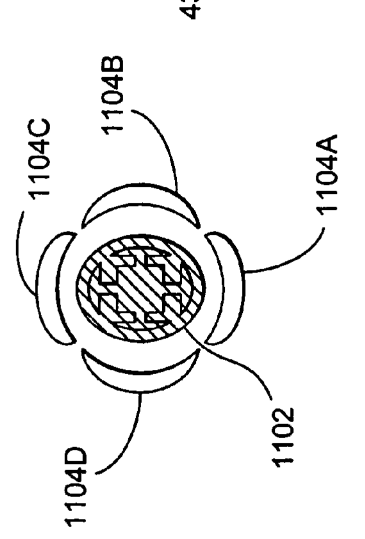

FIGS. 43A and 43B are diagrams illustrating the use of the menu guide 1002 to integrate and manage interactive services. The illustrated menu guide is a "home" menu guide 1002H that is presented in response to a user command provided to the IRD 500, for example, by the remote control 540. In the illustrated embodiment, this home menu guide 1002H is presented in response to the user selecting the left periphery of the thumb rocker 1102 when the channel portion 1020 is active for navigation.

The home menu guide 1002H features highlighted content and provides access to all services available to the user by the video distribution system 100, including subsystems that may be communicatively coupled to operate with the IRD 500.

The PIG portion 1012 of the home menu guide 1002H can display the content from the most recently viewed channel, media from a PVR device, or may be tuned to a channel based on explicit or derived user preferences. The PIG portion 1012 may also show information regarding the use and navigation of the home menu guide 1002H or any of the available services.

The channel portion 1020 of the home menu guide 1002H now includes a plurality of services 4302 including the home service 4302H, and other services 4302A-4302C. In the illustrated example, the other services 4302A-4302C are interactive services (e.g. services which support active interaction with the user through commands provided through the remote control 540 or other input device). The user can select one of the other services 4302A-4302C by selecting the upper or lower periphery of the thumb rocker 1102.

Selection of the right periphery of the thumb rocker 1102 changes the sorting of the interactive services 4302 (e.g. alphabetical or user-preference order). Further, while the initial left click of the periphery of the thumb rocker 1102 causes the display of the home menu guide 1002H as described above, subsequent clicks of the left periphery select different interactive category sorting, essentially scrolling backwards through a wrapped-around list of category sort options.

In one embodiment, when the user selects an interactive service (i.e. by depressing the center of the thumb rocker 1102) the menu guide system terminates, and the user is provided with the interface provided by the interactive service itself. In another embodiment, when the user selects an interactive service, the interface of the interactive service is presented within the context of the menu guide system (e.g. in a sub-window in a portion of the menu guide 1002). This allows the user to navigate from the interactive service to the menu guide as desired. If desired, the interactive service and the menu guide can be multi-tasked.

Through appropriate input, the user can select any of the provided services 4302 for further navigation and management. In one embodiment, this can be accomplished by depressing the center of the thumb rocker 1102.

Figure 44B:
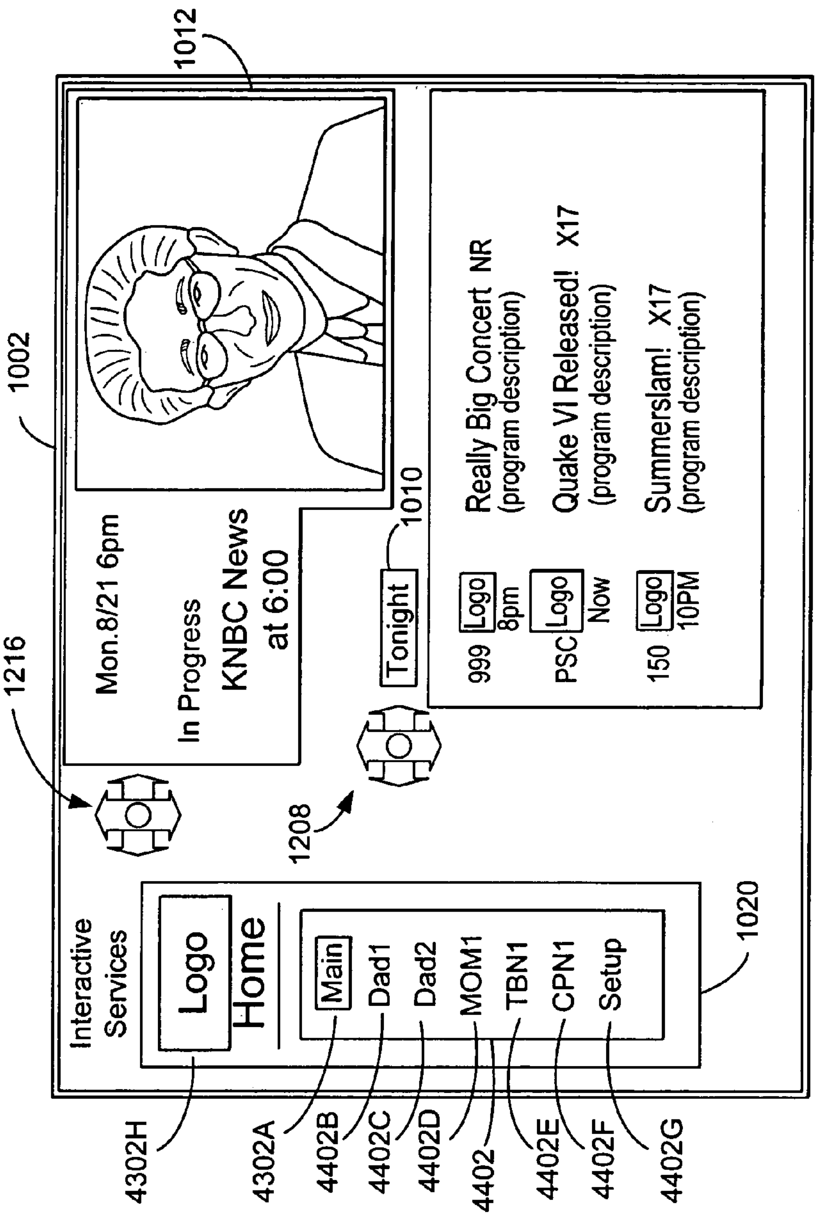
FIGS. 44A and 44B are diagrams illustrating the navigation of a selected service.
Figure 44A:
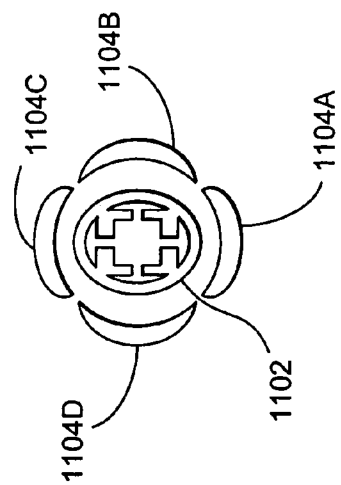

FIGS. 44A and 44B are diagrams illustrating the navigation of a selected service 4302. In the illustrated embodiment, the selected service is the home service 4302H. One or more interactive service navigation options 4402 are presented in the channel portion 1020. In the illustrated embodiment, these interactive service navigation options 4402 include a "main" service navigation option 4402A, a "Dad1" service navigation option 4402B, a "Dad 2" service navigation option 4402C, a "Mom1" service navigation option 4402D, a "TBN" service navigation option 4402E, a "CPN" service navigation option 4402F, and a "Setup" service navigation option 4402G.

Selection of service navigation options 4402A-4402D selects a family member's preferred mix of interactive services for display.

Figure 45B:
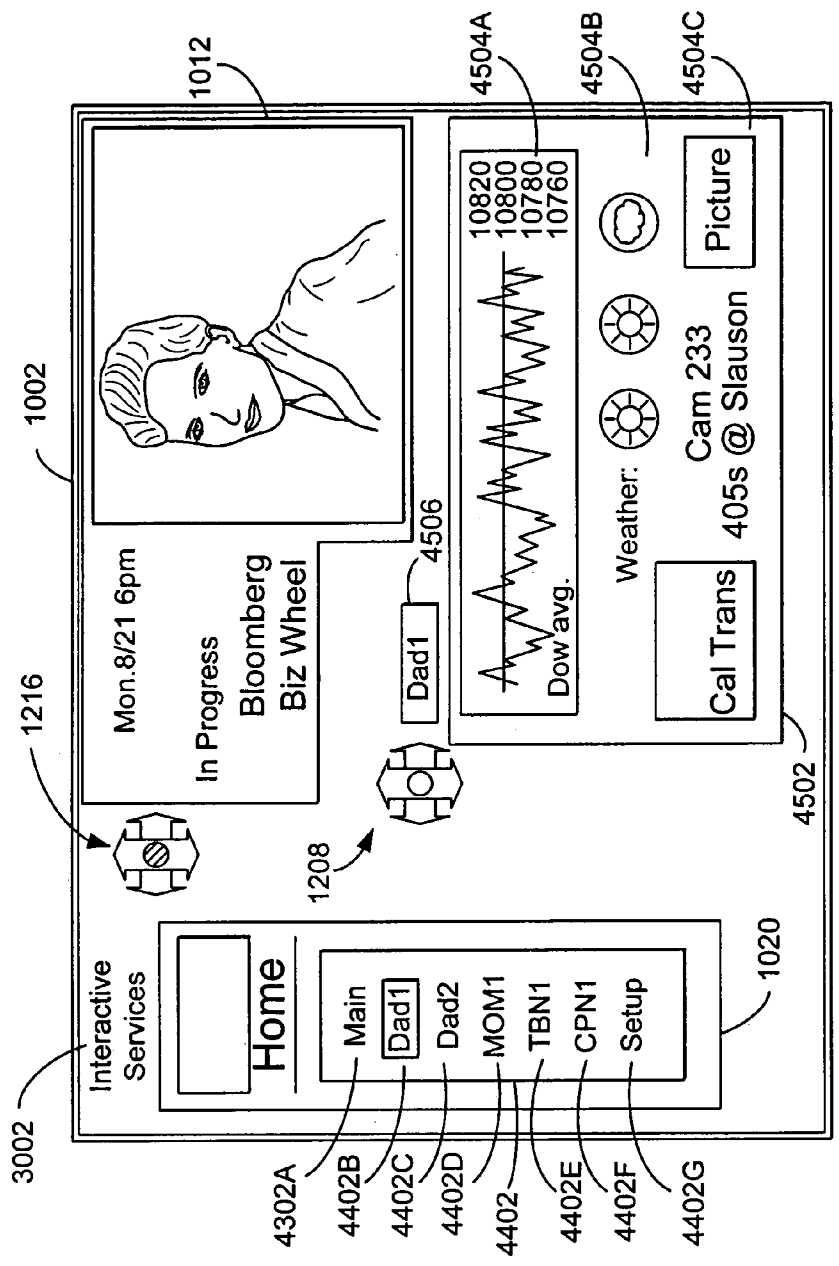
FIGS. 45A and 45B are diagrams further illustrating the navigation of the selected service.
Figure 45A:
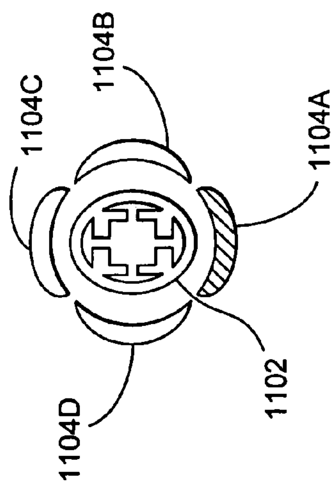

FIGS. 45A and 45B are diagrams further illustrating the navigation of the selected service 4302. In the illustrated embodiment, user selected the bottom periphery of the thumb rocker 1102 to scroll down to "Dad1" 4402B and depressed the center of the thumb rocker 1102 to select the "Dad1" service 4402B. The menu guide 1002 now presents interactive services associated with the selected navigation option 4402 (i.e. those associated with "Dad1").

In the illustrated embodiment, the selected interactive services include a channel providing business news in the PIG portion 1012 and a mix of a plurality of interactive content within what was formerly the menu content portion 1006 (now, designated as the interactive content portion 4502).

Just as a menu content description portion 1010 was included in the menu guide 1002 when the menu content portion 1006 is displayed, an interactive content description portion 4506 is presented adjacent to the interactive content portion 4502 to describe the content presented. In the illustrated embodiment, the interactive content description portion 4506 indicates that the interactive content portion 4506 is presenting content selected by "Dad".

In one embodiment, the interactive content portion 4502 is segmented into a plurality of subportions 4504A-4504C, and each subportion presents different interactive content. For example, in the illustrated embodiment, the first subportion 4504A presents a graph describing the historical Dow Jones Industrial Average, the second subportion 4504B presents information regarding local weather predictions and third subportion 4504C presents information regarding traffic conditions (including, for example, a live traffic cam picture). The information provided in the interactive content portion 4502 can be obtained from the Internet connection. This can be implemented through connection of the IRD 500 or associated to a data processing device such as a computer. This can be accomplished via a direct connection, a connection established through a wide area network (WAN) or a local area network (LAN), the Internet, or similar connection. The data provided to the IRD 500 may be resident in the computer itself (e.g. a computer-implemented video game) or may be obtained from an external connection such as the Internet.

Further, the IRD 500 itself may be directly connected obtain data via the Internet, LAN, or WAN (to permit communication between the IRD 500 and a plurality of without the use of a computer, through a modem (e.g. dial-up, DSL, or cable).

The information presented in the interactive content portion 4502 may also be processed (e.g. by the IRD 500) before presentation to the user. That is, instead of presenting three subportions 4504A-4504C, each showing information obtained from a particular source (e.g. web page), information from a plurality of sources may be combined and presented in the entire interactive content portion 4502. For example, the control center 102 may provide weather, stock, and traffic data that is transmitted to the user's IRD 500. This data can be pre-processed to eliminate information that is not selected by the user (e.g. traffic data for other cities) and to present the information to the user in a user-specified format. This feature allows the user to collect data from a variety of different sources, and to rearrange the presentation of the data to suit the user's requirements.

The user can also navigate within the interactive content portion 4502. This is accomplished by selecting the interactive content portion 4502, for example, by depressing the remote control 540 button 1104B.

Figure 46B:
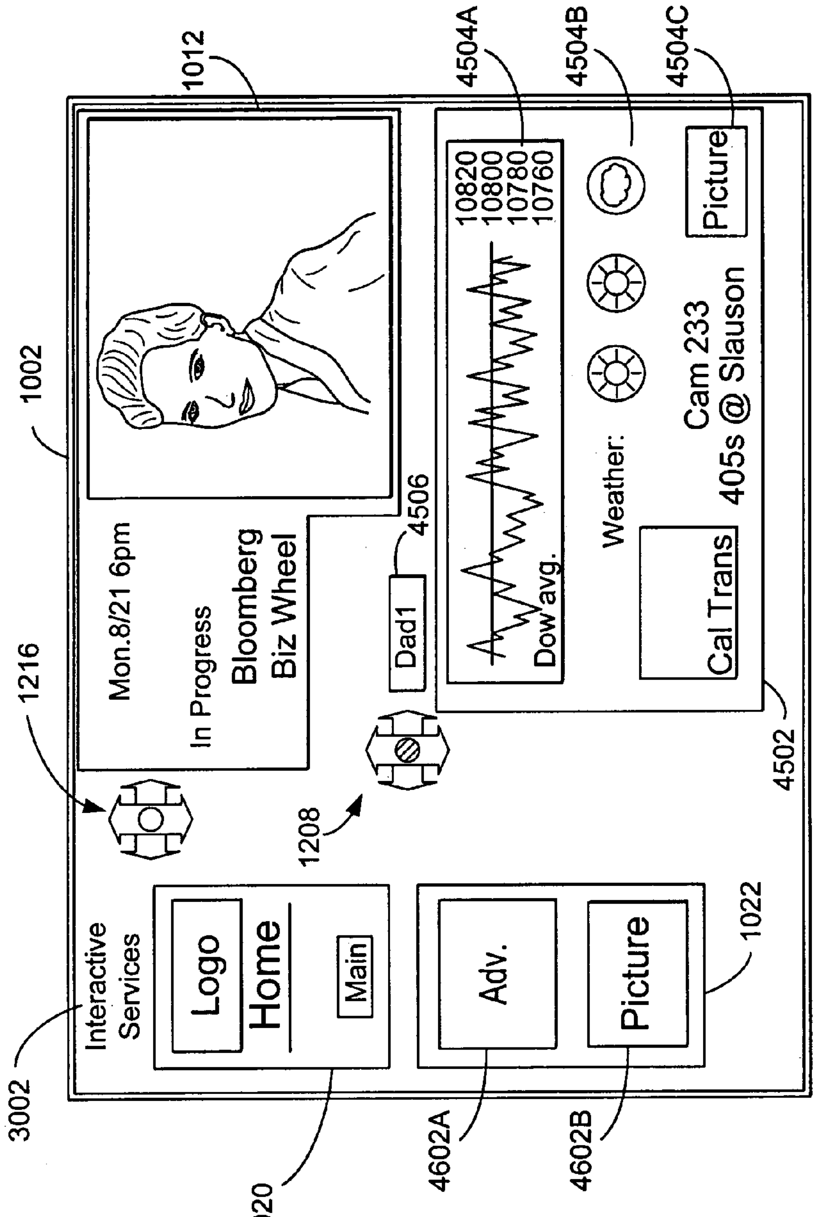
FIGS. 46A and 46B are diagrams illustrating navigation of the interactive content portion 4502.
Figure 46A:
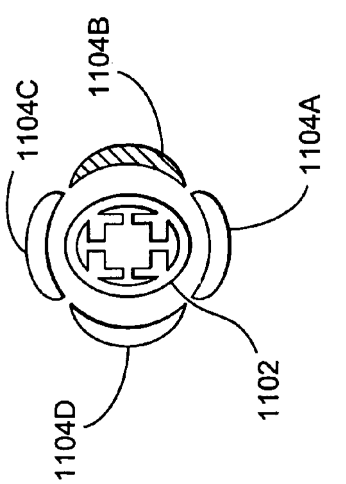

FIGS. 46A and 46B are diagrams illustrating navigation of the interactive content portion 4502. When the user navigates to the interactive content portion 4502, embedded advertisements 4602A and 4602B can be provided in the advertising portion 1022. Alternatively or in combination with the display of advertisements, the display real estate can be used to provide other interactive services or channel offerings. In one embodiment of the present invention, the advertisements 4602 in the advertising portion 1022 are keyed to the content presented in the interactive content portion 4502 or the content in the PIG portion 1012. For example, the first advertisement 4602A is an advertisement related to the content presented in the PIG portion 1012 (an advertisement from the provider of the media content in the PIG portion), and the second advertisement 4602B is an advertisement related to the content presented in the interactive content portion 4502 (the provider of the information presented in the second subportion 4504B). The advertisements 4602 can include still or moving images.

In accordance with the integration of PVR functionality with other menu guide 1002 information, any of the menu guides 1002 described above may also include a provision for "one touch" recording by the PVR. Such a one-touch recording control can be implemented within the PIG portion 1012, indicating to the user, that if that recording control is selected (i.e. by appropriate selection of remote control 540 buttons to select the one-touch recording function), the media content presented in the PIG portion 1012 will be recorded.

Navigation and Management of PVR Media

Figure 47B:
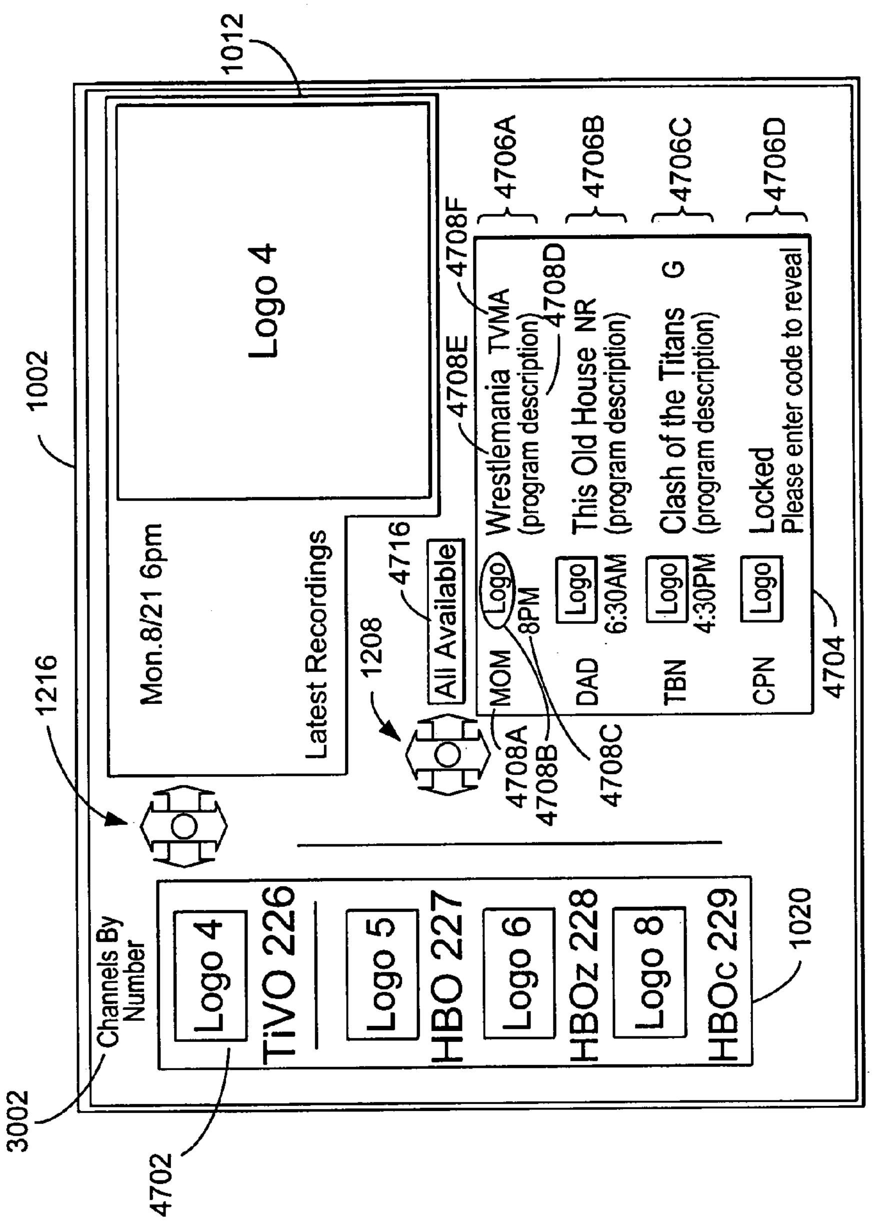
FIGS. 47A and 47B are diagrams illustrating the use of the menu guide to navigate and manage PVR media for one or more users.
Figure 47A:
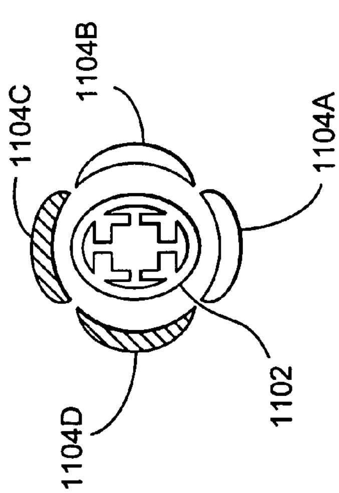

FIGS. 47A and 47B are diagrams showing the use of the menu guide 1002 to navigate and manage PVR media from one or more sources and for one or more users. This embodiment of the menu guide 1002 is obtained, for example, enabling navigation of the channel selector portion 1012 by selecting buttons 1104C and 1104D on the remote control 540. The channel selector portion 1012 can now be scrolled (via selection of the upper and lower periphery of the thumb rocker 1102) to a PVR management channel 4702 that is designated for managing PVR-based media. When the PVR management channel 4702 is selected, the menu guide 1002 now presents media available from the PVR within what was formerly the menu content portion 1006 (now designated as the PVR content portion 4704). A PVR content portion descriptor 4710 replaces the menu content description portion 1010.

The PVR content portion 4704 includes one or more PVR content descriptions 4706A. Each PVR content description 4706 may include a user indicator 4708A which indicates which user (e.g. household member) directed the PVR to record the PVR content, a PVR content source designator or icon 4708B, a broadcast time indicator 4708C indicating when the recorded program was broadcast, a title 4708E, a detailed description 4708D and a rating indicator 4708F.

The PVR content descriptions 4706 presented in the PVR content portion 4704 can be organized in a number of ways. For example, the PVR content portion 4704 may organize PVR content descriptions 4706 so that the last item recorded by each user is displayed. The PVR portion 4704 may also organize the PVR content descriptions 4706 so that the PVR content descriptions are presented in reverse temporal order (i.e. with the oldest recordings presented first. This is useful if the user is attempting to view the oldest programs so that they may be erased to make room for the recording of more programs. PVR content can also be organized by media program category. For example, PVR programs can be categorized into archived programs that are not intended to be erased at any time, and programs that are recorded for one viewing. PVR programs can also be categorized into different program types such as movies and sporting events. PVR programs can also be categorized by playback frequency, so that the most frequently played PVR programs are shown at the top of the PVR content portion 4704. PVR programs can also be categorized according to user, so that each particular user can view all of the PVR programs recorded by the user.

As was the case in the menu guide 1002 embodiments discussed above, further details regarding any of the PVR programs listed in the PVR content portion 4704 can be obtained by highlighting the related PVR content descriptions 4706 and manipulating the buttons 1104 or the thumb rocker 1102 or by similar user input. Other input or information regarding the PVR program (e.g. entering or changing the code for viewing the program) can be entered from this menu guide 1102 as well.

In some cases, media programs available from the PVR include programs that are not authorized for all viewers (programs with adult content, for example). To prevent unauthorized access to such programs, the present invention allows programs to be locked so that they cannot be played back and viewed without the entry of a secret code (e.g. by use of the remote control 540). To further ensure privacy and to prevent unauthorized access, the title of the media program presented in the PVR content description 4706 may be obfuscated. For example, in FIG. 47, the title of the PVR content description 4706D is changed to "Locked" from the actual title, and the area where the detailed description of the PVR content is ordinarily presented is changed to instruct the user to enter a code to display the title and/or the media program itself. Each of the IRD 500 users may have a separate user code to retain privacy among users. Further, the IRD 500 may also support a master code that allows access to any of the PVR recorded programs.

The PVR content portion 4704 can be navigated using user commands analogous to those which were used to navigate the menu content portion 1006 previously described (e.g. by manipulation of the thumb rocker 1102). Provision is also made for finding a PVR (or other) program via an alphanumeric keyword search facility. Further, such alphanumeric searching may also be provided for all programs in addition to those that are available from the PVR.

While the PVR content description 4706 is active, the PIG portion 1012 can be eliminated from the menu guide 1002 (to provide more real estate for the PVR content description 4706) or it can include advertising, or can preview a selected PVR media program.

The channel selector portion 1020 includes an PVR management channel portion 4702, which may include an icon and text. The channel selector portion 1020 can also include channel icons for other channels, directed advertising, or service highlights. The channel selector portion 1020 may also allow for control of the PVR.

Figure 48B:
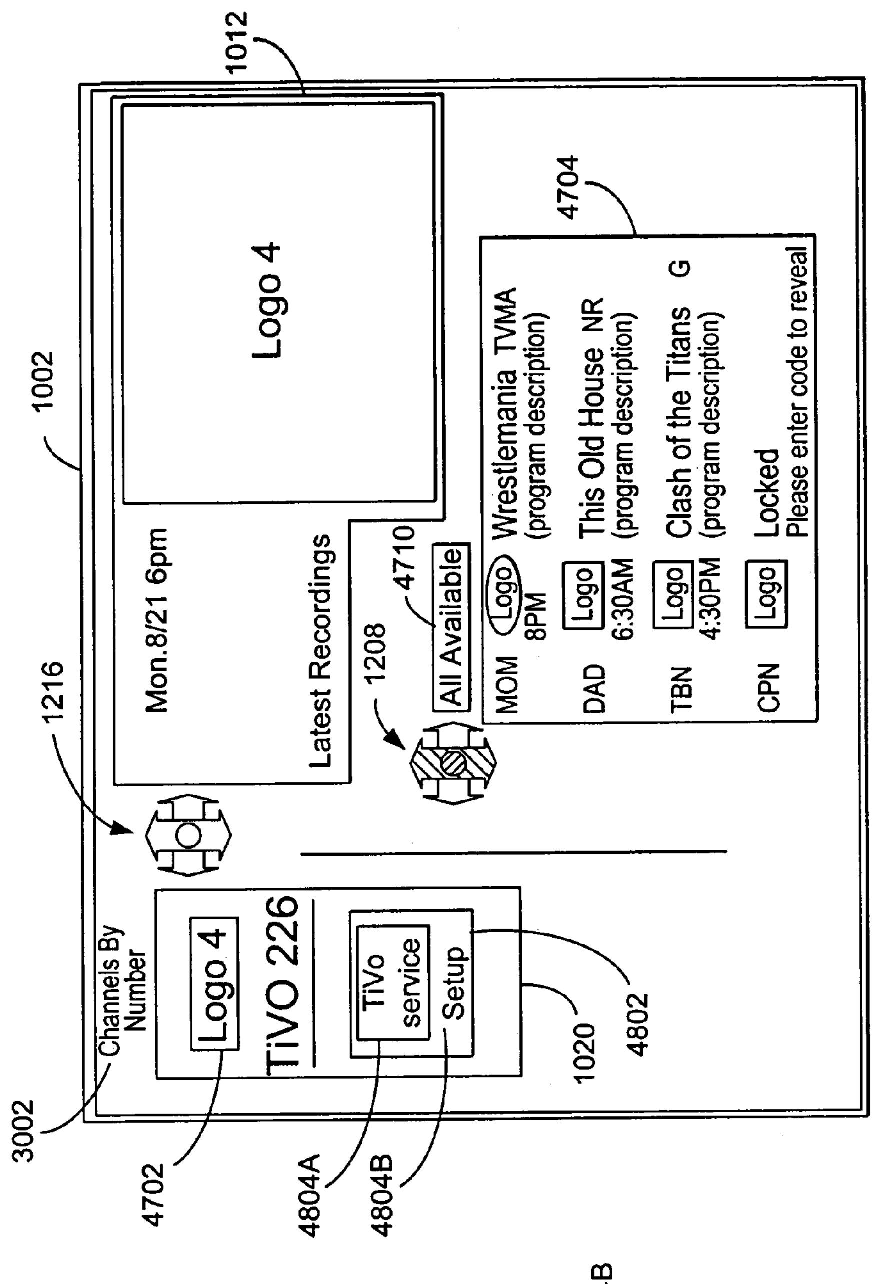
FIGS. 48A and 48B are diagrams illustrating one embodiment of the present invention in which the menu guide provides for control of the PVR.
Figure 48A:
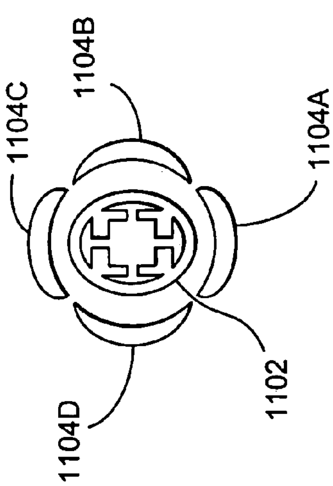

FIGS. 48*a* and 48B are diagrams illustrating one embodiment of the present invention in which the menu guide 1002 provides for control of the PVR. This embodiment of the menu guide 1002 is obtained by selecting the PVR management channel 4702 as described above. The channel selector portion 1020 now includes a PVR control portion 4802. The PVR control portion 4802 includes a PVR service portion 4804A and a PVR setup portion 4804B. The PVR control portion 4802 can be accessed and navigated by suitable manipulation of the remote control 540 controls.

"All" Mode

The present invention can also present a menu guide 1002 having information regarding all programs complying with user-selectable program presentation criteria. In this mode (hereinafter referred to as the "All" mode), the menu guide 1002 can include the channel portion 1020, the PIG portion 1012, and an advertising portion 1022 as earlier described, or the menu content portion 1006 can be expanded to include substantially all of the dimension available in the display space, with the channel portion, the PIG portion 1012, and the advertising portion 1022 no longer presented. The user-selected criteria can include media programs in progress, media programs to be transmitted one or more of the next succeeding dayparts, media programs of specific genres (e.g. drama, documentaries), specific viewer ratings (e.g. PG, TV14, etc.), or any other user-describable criteria.

Figure 49B:
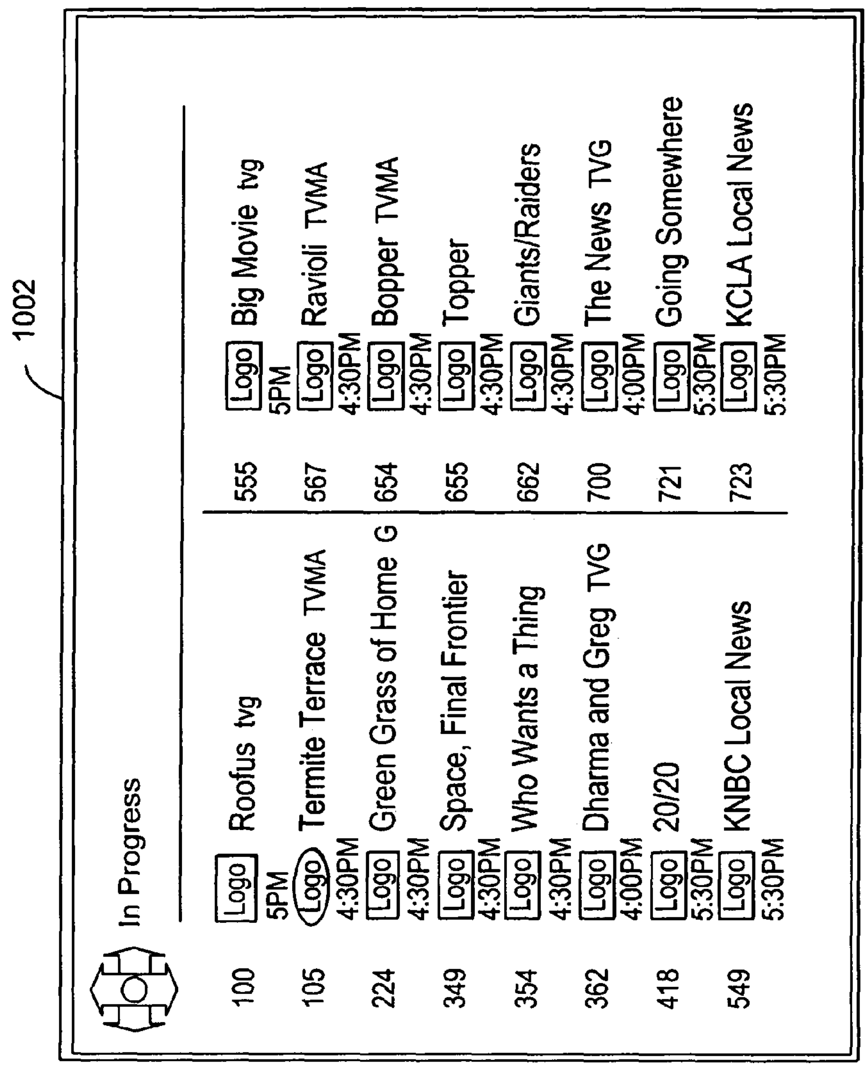
FIGS. 49A and 49B are diagrams showing an embodiment of the menu guide in the "all" mode.
Figure 49A:
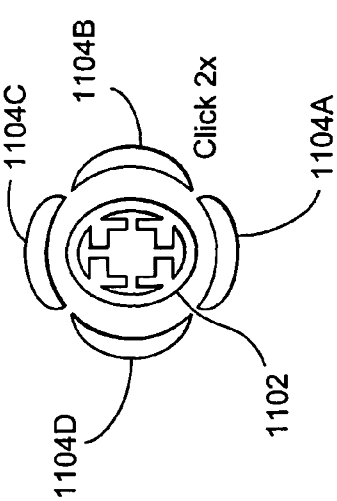

FIG. 49 is a diagram showing an embodiment of the menu guide 1002 in the "all" mode wherein the user has elected to view program information regarding media programs in progress. This menu guide 1002 can be accessed from any of the menu guides thus far presented by straightforward manipulation of the remote control 540, for example, by depressing the center of the thumb rocker 112 multiple times in rapid succession. In this mode, the menu guide 1002 displays program guide information regarding every media program transmitted on ever channel during the current daypart. In the illustrated example, the menu guide 1002 presents program guide information for every program currently in progress, sixteen programs at a time, in channel numeric order. The user can control the number of program descriptions presented at a time and how the program descriptions are organized (e.g. the user can command that the program descriptions are presented in alphabetical order, according to an explicit ordering scheme provided by the user, or according to the most frequently viewed channels).

By depressing the upper or lower periphery of the thumb rocker 1102, the list can be scrolled up and down as desired.

The "all" mode menu guide 1002 can also be scrolled forward in time to other daypart contexts by selection of the right and left periphery of the thumb rocker 1102. For example, selection of the right periphery of the thumb rocker 1102 can scroll the daypart context from "In Progress" to "Next", to "Tonight" to "Late Night", to "Tomorrow", to "Tomorrow Night" and so on.

Figure 50B:
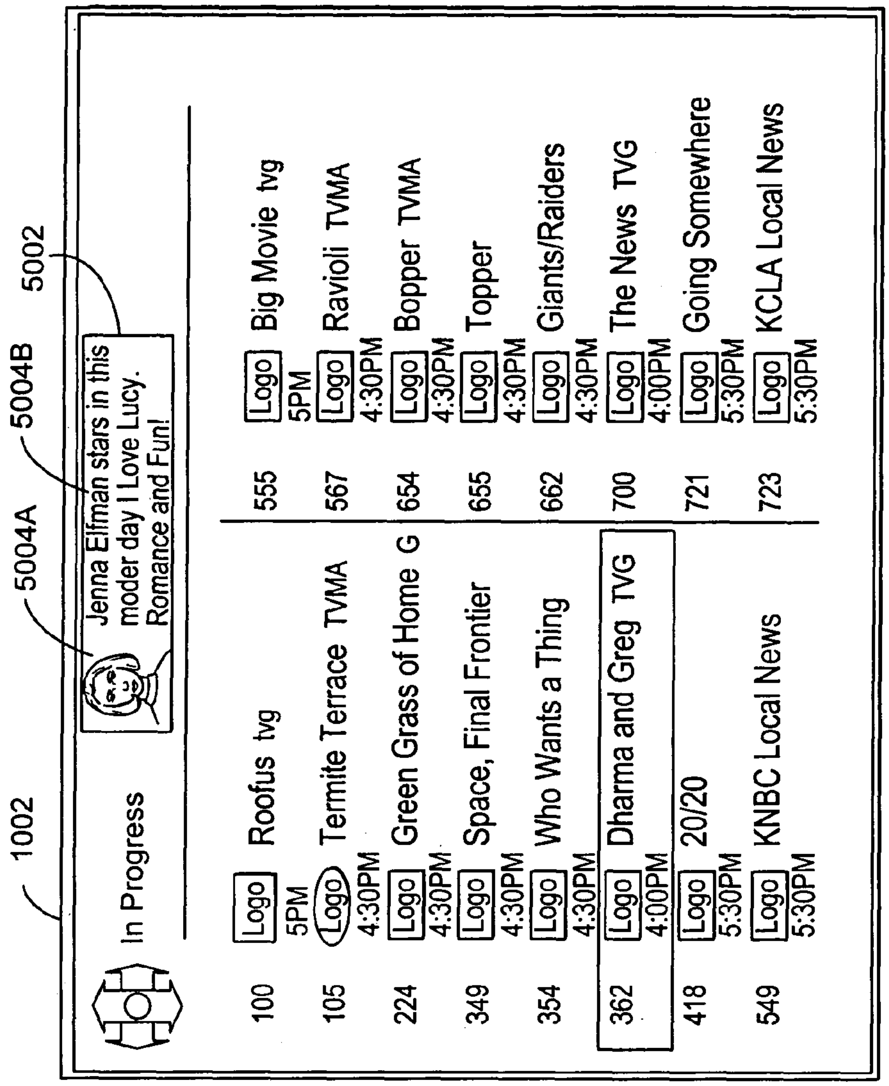
FIGS. 50A and 50B are diagrams illustrating how further information regarding particular programs displayed in the menu content portion of the menu guide can be obtained.
Figure 50A:
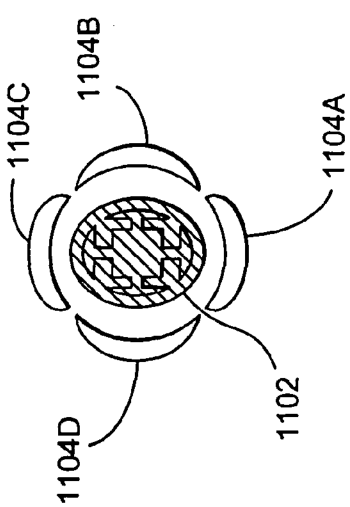

FIGS. 50A and 50B are diagrams illustrating how further information regarding particular programs displayed in the menu content portion of the menu guide can be obtained. Further information regarding particular programs displayed in the menu content portion 1006 of the menu guide 1002 can be obtained by scrolling to the program description for the desired program and selecting the center of the thumb rocker 1102. In one embodiment, the presentation of the information in the menu content portion 1006 remains unchanged, and the further information (which may include a multimedia portion 5004A and a textural portion 5004B) is presented in an "all" mode detailed information portion 50023. In another embodiment, the menu content portion 5004 is altered to permit the presentation of the "all" mode detailed information portion.

Flow Charts

FIGS. 51A-51F are flow charts provided to further illustrate the present invention. In block 5102 of FIG. 51A, a command to provide a menu guide is accepted. The menu guide one of a plurality of menu guides 1002 together defining a media program information space 900 segmented by daypart. In block 5104, the selected menu guide is provided. The menu guide 1002 includes a menu guide content portion 1006 presenting at least some of the media program information that describes at least one media program scheduled to be available on an active channel during either the current daypart (if no other daypart has been selected) or a selected daypart. Further command input and responses are provided in FIGS. 51B-51F.

Figure 51A:
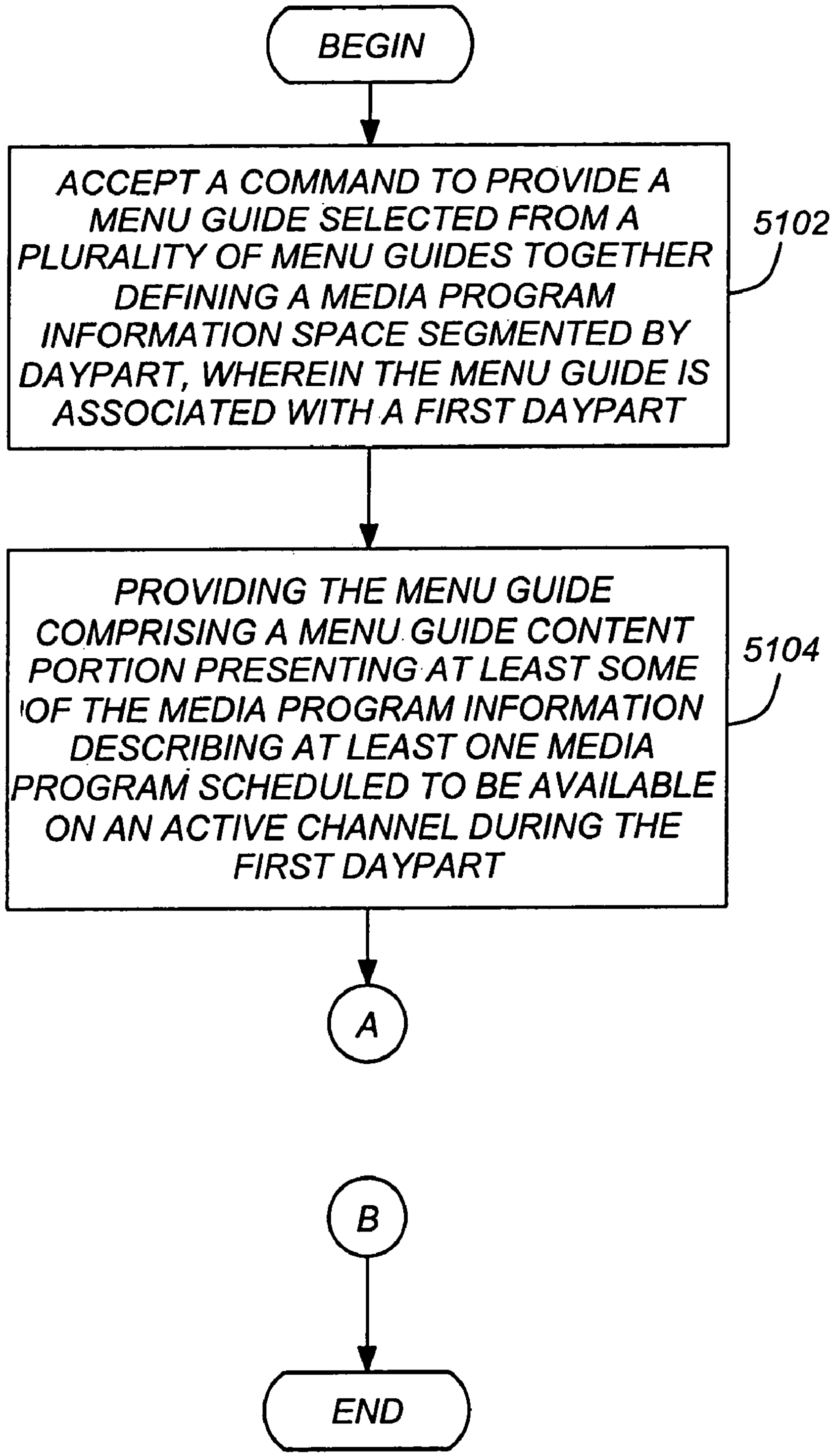
FIGS. 51A-51F are flow charts presenting illustrative examples operations for obtaining and navigating the menu guide.
Figure 51B:
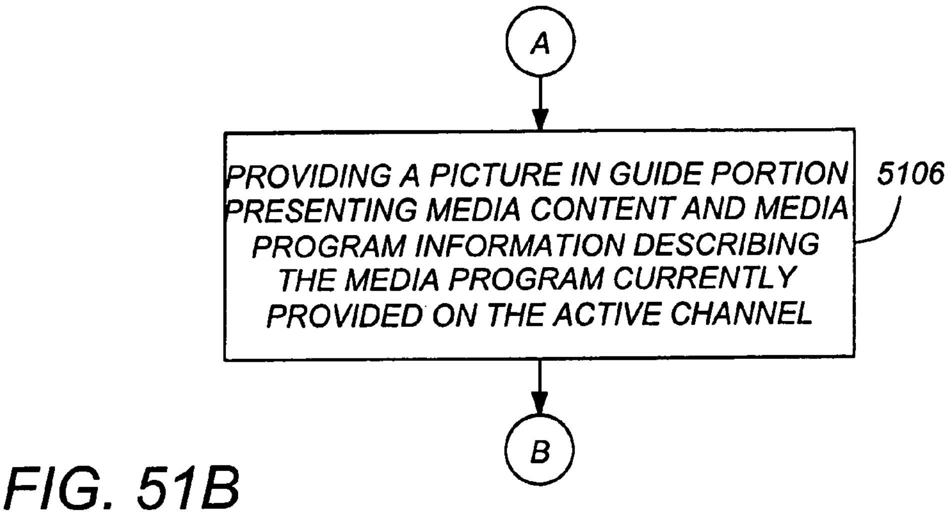

FIG. 51B is a flow chart showing exemplary operations used to provide a PIG portion 1012 in the menu guide 1002. As depicted in block 5106, the picture in guide portion 1012 presents media content (e.g. video and optionally audio) currently provided on the active channel (e.g. the channel currently tuned by the IRD 500). The PIG portion 1012 may also provide media program information describing the media content.

Figure 51C:
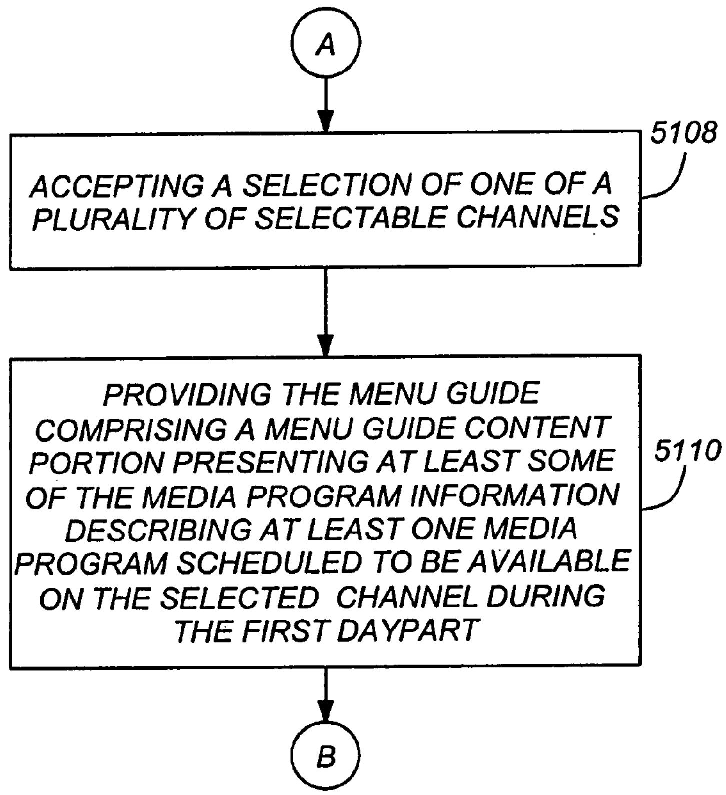

FIG. 51C is a flow chart showing exemplary operations in which the user selects different channels. In block 5108, a selection of one of a plurality of selectable channels 1704A-1704C is accepted. In block 5110, a menu guide 1002 is provided. The menu guide 1002 includes a menu guide content portion 1006 presenting at least some of the media program information describing at least one media program (e.g. the "Nightly News with Tom Brokaw" in FIG. 17B) scheduled to be available on the selected channel during the first daypart (in the example presented in FIG. 17B, NBC, or channel 223 during the "Tonight" daypart).

Figure 51D:
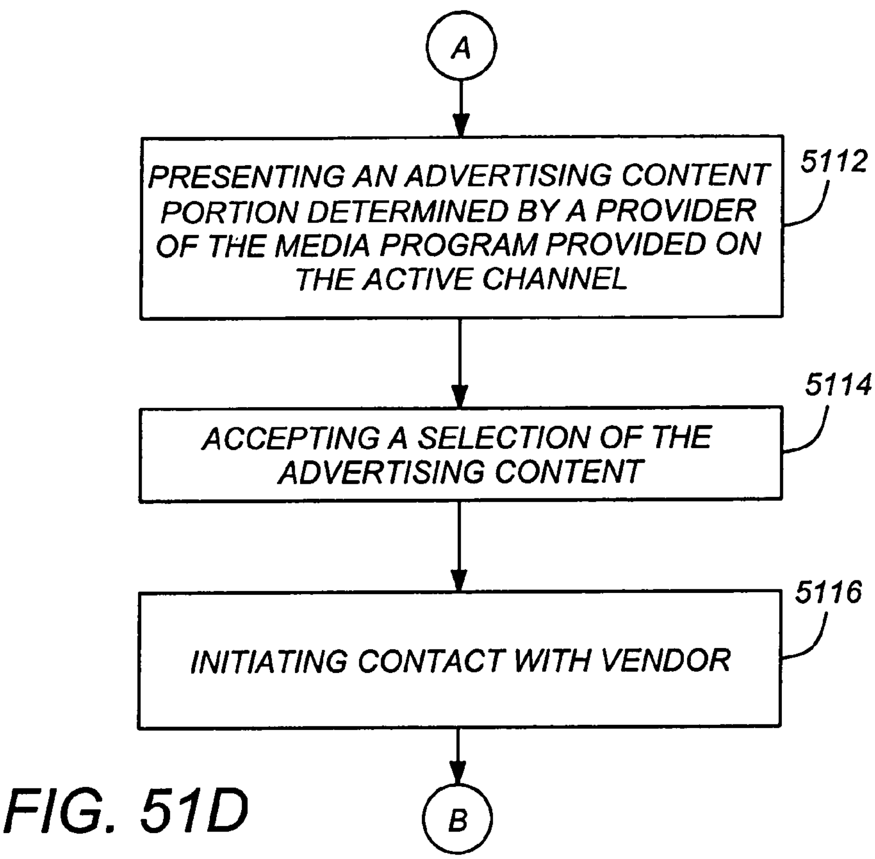

FIG. 51D is a flow chart showing exemplary operations in which the user is presented with advertising content. First, an advertising content portion 1022 of the menu guide 1002 is presented, as shown in block 5112. In block 5114, the user can then select one of the advertisements in the advertising content portion, and this selection is accepted. This selection can initiate contact with the vendor whose services or products are the subject of the advertising, or to provide additional information, as depicted in block 5116.

Figure 51E:
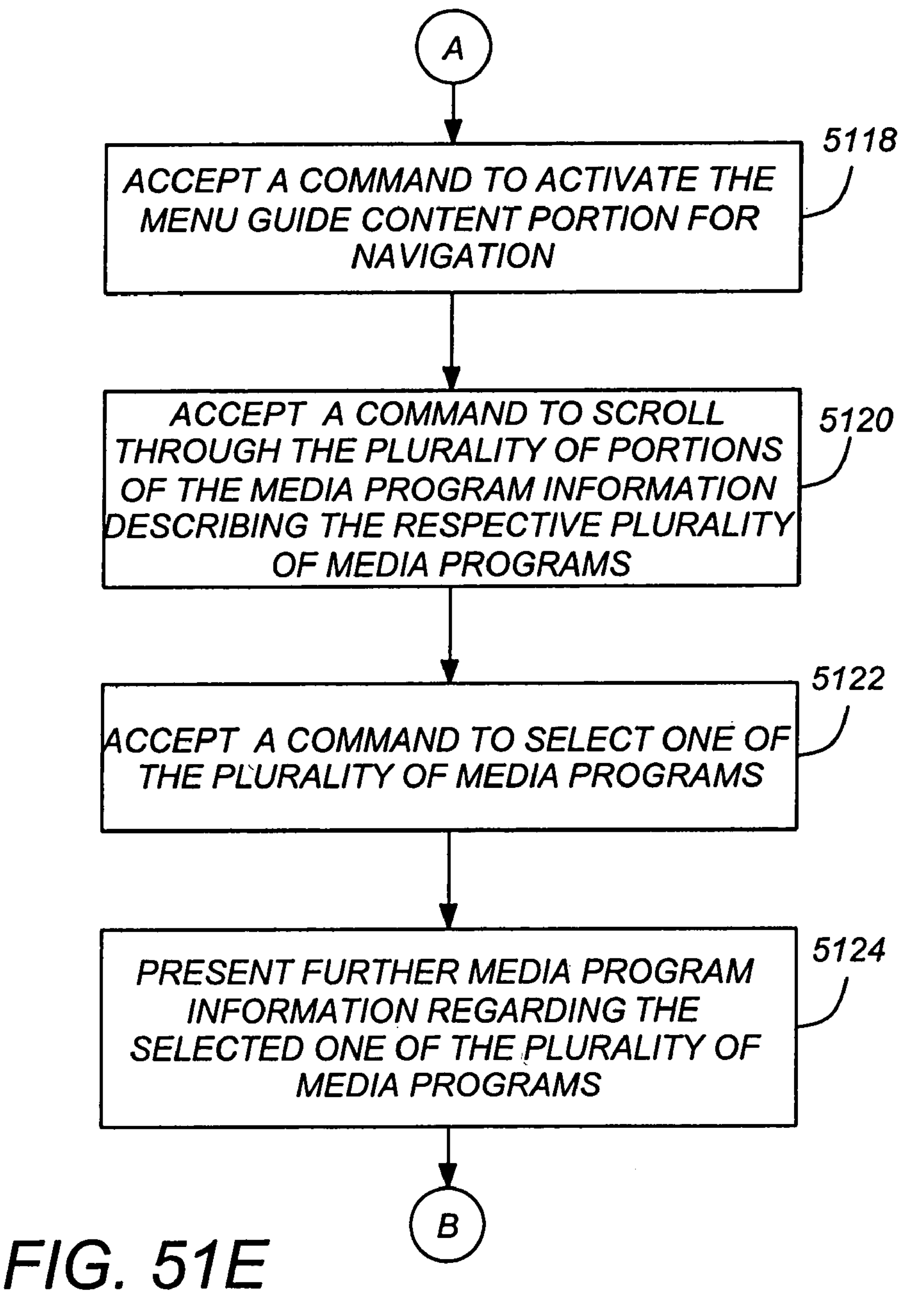

FIG. 51E is a flow chart showing exemplary operations in which the user activates the menu guide content portion 1006 of the menu guide 1002 and to navigate the menu guide content portion to select media programs. A command to activate the menu guide content portion for navigation is accepted, as shown in block 5118. The acceptance of this command can be indicated by a visual element such as the navigator icon 1208. One or more commands to scroll through the menu content portion 1006 are then accepted, as shown in block 5120. The acceptance of these commands can be indicated by suitable modification of the navigator icon 1208, if desired. A selection of one of the plurality of media programs can then be accepted, as shown in block 5122. Further information regarding the selected program can be presented, as shown in block 5124, or other operations related to the selected media program can be performed at this point (e.g. selecting the media recording by a PVR communicatively coupled to the IRD, or accessing an Internet web site that provides additional information relevant to the selected media program).

In one embodiment, if this technique can be used to select media program information for subsequent dayparts. That is, when the user scrolls down the media programs listed in the menu content portion 1006 to a media program listed in another daypart, the daypart indicator 1008 for the selected daypart changes to indicate the selected daypart. Alternatively or in combination with the foregoing, media program information for media programs scheduled to be provided in different dayparts can be obtained by accepting a direct selection of another daypart (rather than by scrolling through media programs provided in the current daypart).

Figure 51F:
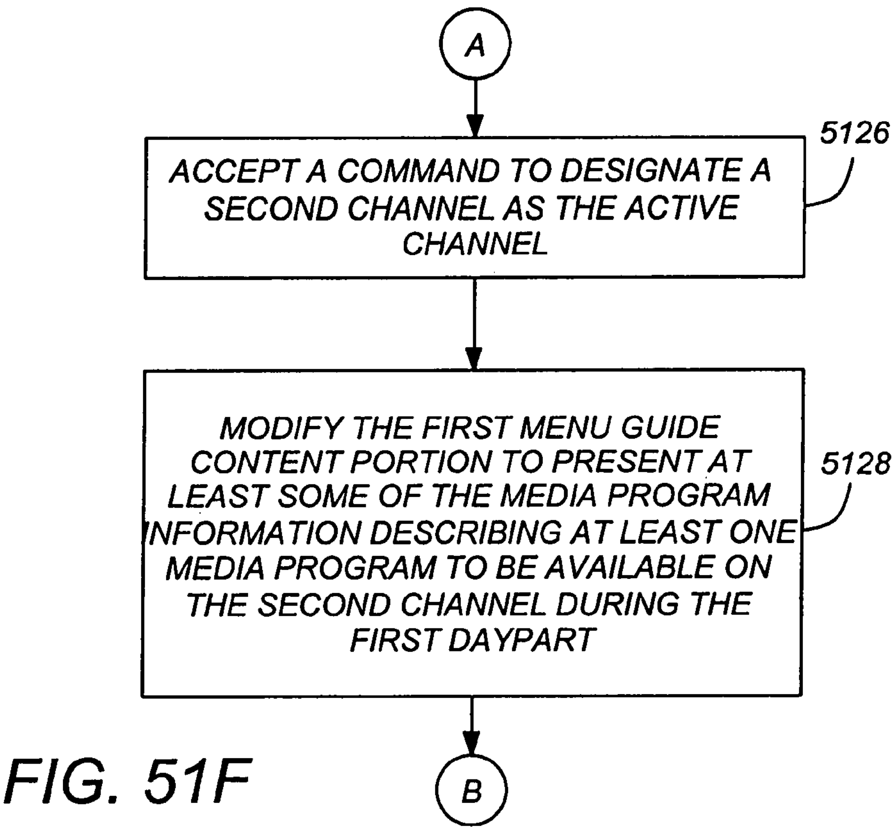

FIG. 51F is a flow chart illustrating exemplary operations used to navigate to different dayparts directly. A selection of the second daypart is accepted, as shown in block 5130. In response, a second menu guide is presented. The presented menu guide 1002 has a menu guide content portion presenting at least some of the media program information describing at least onemedia program scheduled to be available on the active channel during the second daypart.

CONCLUSION

This description of the preferred embodiment of the invention is presented for the purposes of illustration and description. It is not intended to be exhaustive or to limit the invention to the precise form disclosed. Many modifications and variations are possible in light of the above teaching. For example while the following description presents the application of a daypart categorization in the development and presentation of menu guides to the user, other embodiments using different categorizations may be advantageously used as well.

What is claimed is:

1. A method of providing information regarding media programs received by a receiver, comprising the steps of:

accepting a command to select an active channel from a plurality of selectable channels wherein the active channel is one of the selectable channels to which the receiver is tuned;

accepting a command to provide a menu guide selected from a plurality of menu guides together defining a media program information space segmented by daypart, wherein a daypart is a period of time during which viewers characteristically view media programs, the media programs being related so as to infer which other media programs the viewers would be interested in viewing, and wherein the menu guide is associated with a first daypart; and providing the menu guide, the menu guide comprising a menu guide content portion presenting media program information regarding media programs consisting of all of the media programs scheduled to be available during the first daypart on a channel consisting of the active channel.

2. The method of claim 1, wherein the menu guide further comprises a channel portion separate from the media guide portion indicating the active channel.

3. The method of claim 2, wherein the channel portion further indicates the selectable channels.

4. The method of claim 2, wherein the channel portion indicated selectable channels are organized according to a sort selected from the group comprising alphabetical order, wherein each of the selectable channels is associated with a unique alphabetical designator, numerical order, wherein each of the selectable channels is associated with a unique numerical designator implicit user preference;

explicit user preference; and at least one category, wherein at least some of the selectable channels are members of the at least one category.

5. The method of claim 1, wherein the menu guide further comprises a picture in guide (PIG) portion.

6. The method of claim 5, wherein the PIG portion presents media content for an active media program, wherein the active media program is a media program currently provided on the active channel.

7. The method of claim 5, wherein the PIG portion presents media program information regarding the media program currently provided on the active channel.

8. The method of claim 1, wherein the menu guide content portion comprises:

a plurality of portions of the media program information, each portion describing a respective one of the media programs scheduled to be available during the first daypart on the active channel.

9. The method of claim 8, wherein the plurality of portions are scrollable and each of the plurality of portions are selectable.

10. The method of claim 8, further comprising the step of:

accepting a command to select one of the plurality of media programs available during the first daypart on the active channel; and presenting further media program information further describing the selected one of the media programs.

11. The method of claim 1, wherein the menu guide further comprises an advertising content portion having advertising content.

12. The method of claim 11, wherein the advertising content is determined by a provider of the media program provided on the active channel.

13. The method of claim 11, wherein the advertising content is contextually related to the media program provided on the active channel.

14. The method of claim 11, wherein the advertising content is determined according to user preferences.

15. The method of claim 11, wherein the advertising content is determined according to user viewing habits.

16. The method of claim 11, wherein the advertising content is determined according to the first daypart.

17. The method of claim 11, wherein the advertising content is user-selectable and selecting the advertising content initiates contact with a vendor.

18. The method of claim 1, wherein the menu guide content portion comprises a plurality of portions of the media program information, each portion describing a respective one of the media programs scheduled to be available during the first daypart on the active channel, and the method further comprises the steps of:

accepting a command to activate the menu guide content portion for navigation;

accepting a command to scroll through the plurality of portions of the media program information; and accepting a command to select one of the plurality of media programs.

19. The method of claim 18, further comprising the step of:
presenting further media program information regarding the selected one of the plurality of media programs.

20. The method of claim 18, further comprising the step of:
designating the selected media program as the home media program.

21. The method of claim 18, further comprising the step of:
designating the selected media program for recording.

22. The method of claim 1, wherein the first daypart is a current daypart.

23. The method of claim 1, wherein the first daypart is a selected daypart.

24. The method of claim 1, wherein the media program information is wrappably scrollable in daypart increments in a time dimension and scrollable in a channel dimension.

25. The method of claim 1, further comprising the steps of:
accepting a selection of a second daypart from the media program information space; and
providing a second menu guide, the second menu guide comprising the menu guide content portion presenting media program information describing media programs consisting of all of the media programs scheduled to be available on the active channel during the second daypart.

26. The method of claim 25, wherein:
the selected second daypart is temporally distant from the first daypart by a time period selected from the group comprising:
a daypart;
a day;
a week;
a month; and
the step of accepting a selection of the second daypart comprises the step of selecting a single user input.

27. The method of claim 25, wherein the step of accepting a selection of a second daypart from the media program information space comprises the steps of:
activating the menu guide content portion of the menu guide for navigation;
accepting a selection of a media program scheduled to be available on an active channel during the second daypart.

28. The method of claim 27, wherein the menu guide includes a menu content portion navigation icon indicating when the menu content portion of the menu guide is activated for navigation.

29. The method of claim 28, wherein the menu content navigation icon further comprises a plurality of elements indicating navigation of the menu content portion of the menu guide.

30. The method of claim 1, further comprising the steps of:
accepting a command to designate a second channel as the active channel;
modifying the first menu guide content portion to present media program information describing media programs consisting of all of the media programs scheduled to be available on the second channel during the first daypart.

31. The method of claim 30, wherein the menu guide further comprises a channel portion indicating an active channel and selectable channels, and the step of accepting a command to designate a second channel as the active channel comprises the steps of:
accepting a command to activate the channel portion of the menu guide; and
accepting a command to designate one of the selectable channels as the active channels.

32. The method of claim 30, wherein the selectable channels are selectably organizable according to a sort selected from the sort group comprising:
alphabetical order, wherein each of the selectable channels is associated with a unique alphabetical designator,
numerical order, wherein each of the selectable channels is associated with a unique numerical designator
implicit user preference;
explicit user preference; and
at least one category, wherein at least some of the selectable channels are members of the at least one category.

33. The method of claim 32, further comprising the steps of:
accepting a command to organize the selectable channels according to the sort selected from the sort group; and
organizing the selectable channels according to the selected sort.

34. The method of claim 30, wherein the selectable channels are organized according to a plurality of categories, and the method further comprises the steps of:
accepting a selection of a category from the plurality of categories;
modifying the first menu guide content portion to present media program information describing media programs consisting of all of the media programs scheduled to be available on the channels belonging to the selected category during the first daypart.

35. The method of claim 30, wherein the selectable channels are organized according to a category selected from the category group comprising:
a movie category;
a pay per view category;
a news category; and
a sports category.

36. The method of claim 35, wherein at least one of the categories further comprises a plurality of subcategories.

37. The method of claim 36, further comprising the steps of:
accepting a selection of a subcategory from the plurality of subcategories;
modifying the first menu guide content portion to present media program information describing media programs consisting of all of the media programs scheduled to be available on the channels belonging to the selected subcategory during the first daypart.

38. The method of claim 37, further comprising the step of:
selecting a second daypart;
providing a second menu guide, the second menu guide comprising the menu guide content portion presenting media program information describing media programs consisting of all of the media programs scheduled to be available on the channels belonging to the selected subcategory during the second daypart.

39. The method of claim 30, wherein the second channel is a channel providing access to an interactive service.

40. The method of claim 30, wherein the channel is a personal video recorder (PVR) channel providing access to media programs recorded on the PVR, and the first menu guide content portion describes at least one media program available on the PVR channel.

41. An apparatus for providing media program information describing media programs, comprising:
a receiver, having:
a tuner for receiving the media program and the media program information,
a processor, communicatively coupled to the tuner, for accepting a command via an input device to select an active channel from a plurality of selectable channels the active channel being one of the selectable channels to which the receiver is tuned;

for accepting a command via the input device to provide a menu guide selected from a plurality of menu guides together defining a media program information space segmented by daypart, wherein a daypart is a period of time during which viewers characteristically view media programs, the media programs related to as to infer which other media programs the viewers would be interested in viewing, and wherein the menu guide is associated with a first daypart; and for providing the menu guide, the menu guide having a menu guide content portion presenting media program information regarding media programs consisting of all of the media programs scheduled to be available during the first daypart on the active channel.

42. The apparatus of claim 41, wherein the menu guide further comprises a channel portion indicating the active channel.

43. The apparatus of claim 42, wherein the channel portion further indicates the selectable channels.

44. The apparatus of claim 42, wherein the channel portion indicated selectable channels are organized according to a sort selected from the group comprising alphabetical order, wherein each of the selectable channels is associated with a unique alphabetical designator, numerical order, wherein each of the selectable channels is associated with a unique numerical designator implicit user preference;

explicit user preference; and at least one category, wherein at least some of the selectable channels are members of the at least one category.

45. The apparatus of claim 43, wherein the menu guide further comprises a picture in guide (PIG) portion.

46. The apparatus of claim 45, wherein the PIG portion presents media content for an active media program, wherein the active media program is a media program currently provided on the active channel.

47. The apparatus of claim 45, wherein the PIG portion presents media program information regarding the media program currently provided on the active channel.

48. The apparatus of claim 41, wherein the menu guide content portion comprises:

a plurality of portions of the media program information, each portion describing a respective one of the media programs scheduled to be available during the first daypart on the active channel.

49. The apparatus of claim 48, wherein the plurality of portions are scrollable and each of the plurality of portions are selectable.

50. The apparatus of claim 48, wherein:

the input device further accepts a command to select one of the plurality of media programs available during the first daypart on the active channel; and the processor further presents media program information further describing the selected one of the media programs.

51. The apparatus of claim 41, wherein the menu guide further comprises an advertising content portion having advertising content.

52. The apparatus of claim 51, wherein the advertising content is determined by a provider of the media program provided on the active channel.

53. The apparatus of claim 51, wherein the advertising content is contextually related to the media program provided on the active channel.

54. The apparatus of claim 51, wherein the advertising content is determined according to user preferences.

55. The apparatus of claim 51, wherein the advertising content is determined according to user viewing habits.

56. The apparatus of claim 51, wherein the advertising content is determined according to the first daypart.

57. The apparatus of claim 51, wherein the advertising content is user-selectable and selecting the advertising content initiates contact with a vendor.

58. The apparatus of claim 41, wherein the menu guide content portion comprises a plurality of portions of the media program information, each portion describing a respective one of the media programs scheduled to be available during the first daypart on the active channel, and wherein the input device further accepts:

a command to activate the menu guide content portion for navigation, a command to scroll through the plurality of portions of the media program information; and a command to select one of the plurality of media programs.

59. The apparatus of claim 58, wherein the processor further presents further media program information regarding the selected one of the plurality of media programs.

60. The apparatus of claim 58, wherein the input device further accepts an input to designate the selected media program as the home media program.

61. The apparatus of claim 58, wherein the input device further accepts an input to designate the selected media program for recording.

62. The apparatus of claim 41, wherein the first daypart is the current daypart.

63. The apparatus of claim 41, wherein the first daypart is a selected daypart.

64. The apparatus of claim 41, wherein the media program information is wrappably scrollable in daypart increments in a time dimension and scrollable in a channel dimension.

65. The apparatus of claim 41, wherein:

the input device further accepts a selection of a second daypart from the media program information space;

the processor further provides a second menu guide in response to the selection of the second daypart from the media program information space, the second menu guide comprising the menu guide content portion presenting media program information describing media programs consisting of all of the media programs scheduled to be available on the active channel during the second daypart.

66. The apparatus of claim 65, wherein:

the selected second daypart is temporally distant from the first daypart by a time period selected from the group comprising:

a daypart;

a day;

a week;

a month; and the selection of the second daypart from the media program information space is accomplished with a single input.

67. The apparatus of claim 65, wherein the input device further accepts a command to activate the menu guide content portion of the menu guide for navigation, and accepts a selection of a media program scheduled to be available on an active channel during the second daypart.

68. The apparatus of claim 67, wherein the menu guide includes a menu content portion navigation icon indicating when the menu content portion of the menu guide is activated for navigation.

69. The apparatus of claim 68, wherein the menu content navigation icon further comprises a plurality of elements indicating navigation of the menu content portion of the menu guide.

70. The apparatus of claim 41, wherein:

the input device further accepts a command to designate a second channel as the active channel;

the processor further modifies the first menu guide content portion to present media program information describing media programs consisting of all of the media programs to be available on the second channel during the first daypart.

71. The apparatus of claim 70, wherein the menu guide further comprises a channel portion indicating an active channel and selectable channels, and the input device further accepts a command to activate the channel portion of the menu guide, and a command to designate one of the selectable channels as the active channels.

72. The apparatus of claim 70, wherein the selectable channels are selectably organizable according to a sort selected from the sort group comprising:

alphabetical order, wherein each of the selectable channels is associated with a unique alphabetical designator, numerical order, wherein each of the selectable channels is associated with a unique numerical designator implicit user preference;

explicit user preference; and at least one category, wherein at least some of the selectable channels are members of the at least one category.

73. The apparatus of claim 72, wherein:

the input device further accepts a command to organize the selectable channels according to the sort selected from the sort group; and the processor further organizes the selectable channels according to the selected sort in response to the command to organize the selectable channels according to the sort selected from the sort group.

74. The apparatus of claim 70, wherein the selectable channels are organized according to a plurality of categories, and wherein:

the input device further accepts a selection of a category from the plurality of categories;

the processor further modifies the first menu guide content portion to present media program information describing media programs consisting of all of the media programs scheduled to be available on the channels belonging to the selected category during the first daypart in response to the selection of a category from the plurality of categories.

75. The apparatus of claim 70, wherein the selectable channels are organized according to a category selected from the category group comprising:

a movie category;

a pay per view category;

a news category; and a sports category.

76. The apparatus of claim 75, wherein at least one of the categories further comprises a plurality of subcategories.

77. The apparatus of claim 76, wherein:

the input device further accepts a selection of a subcategory from the plurality of subcategories;

the processor further modifies the first menu guide content portion to present media program information describing media programs consisting of all of the media programs scheduled to be available on the channels belonging to the selected subcategory during the first daypart.

78. The apparatus of claim 77, wherein:

the input device further accepts a selection of a second daypart; and the processor further provides a second menu guide, the second menu guide comprising the menu guide content portion presenting of the media program information describing media programs consisting of all of the media programs scheduled to be available on the channels belonging to the selected subcategory during the second daypart.

79. The apparatus of claim 70, wherein the second channel is a channel providing access to an interactive service.

80. The apparatus of claim 70, wherein the channel is a personal video recorder (PVR) channel providing access to media programs recorded on the PVR, and the first menu guide content portion describes at least one media program available on the PVR channel.

81. A method of presenting advertising in a menu guide, comprising the steps of:

accepting advertising media content and a media program from a media content provider; and providing the media program information to a subscriber on an active channel; and providing a menu guide selected from a plurality of menu guides together defining a media program information space segmented by daypart, wherein a daypart is a period of time during which viewers characteristically view media programs, the media programs related to as to infer which other media programs the viewers would be interested in viewing, and wherein the menu guide includes a menu guide content portion presenting media program information for media programs consisting of all of the media programs scheduled to be available on the active channel during a daypart selected from a current daypart and a selected daypart.

82. A menu guide for presenting media program information, comprising:

a menu guide content portion presenting media program information regarding media programs consisting of all of the media programs scheduled to be available during a first daypart on a selected channel; and wherein the menu guide is selected from a plurality of menu guides together defining a media program information space segmented by a daypart wherein the daypart is a period of time during which viewers characteristically view media programs, the media programs related to as to infer which other media programs the viewers would be interested in viewing.

83. A method of presenting media program information describing at least one media program according to daypart, wherein a daypart is a period of time during which viewers characteristically view media programs, the media programs being related so as to infer which other media programs the viewers would be interested in viewing, the method comprising the steps of:

accepting a command to access the media program information at a time of day;

determining a first daypart selected from the group comprising a current daypart defined from the time of day and a selected daypart; and providing a menu guide having menu guide content including media program information, the media program information describing media programs consisting of all of the media programs scheduled to be available during the first daypart on a selected channel.

84. The method of claim 83, wherein the media program information is further based on the time of day.

85. The method of claim 1, wherein the period of time is selected from a group consisting of:

a morning daypart from 6 AM to 10 AM;
a daytime daypart from 10 AM to 4 PM;
a fringe daypart from 4 PM to 8 PM;
a primetime daypart from 8 PM to 12 PM;
a late night daypart from 12 PM to 2 AM; and
an early morning daypart from 2 AM to 6 AM.

86. The apparatus of claim 41, wherein the period of time is selected from a group consisting of:

a morning daypart from 6 AM to 10 AM;
a daytime daypart from 10 AM to 4 PM;
a fringe daypart from 4 PM to 8 PM;
a primetime daypart from 8 PM to 12 PM;
a late night daypart from 12 PM to 2 AM; and
an early morning daypart from 2 AM to 6 AM.

87. The method of claim 83, wherein the period of time is selected from a group consisting of:

a morning daypart from 6 AM to 10 AM;
a daytime daypart from 10 AM to 4 PM;
a fringe daypart from 4 PM to 8 PM;
a primetime daypart from 8 PM to 12 PM;
a late night daypart from 12 PM to 2 AM; and
an early morning daypart from 2 AM to 6 AM.

88. A method of providing information regarding media programs received by a receiver, comprising the steps of:

accepting a command via an input device to select an active channel from a plurality of selectable channels, wherein the active channel is a channel to which the receiver is tuned;

accepting a command via the input device to provide a menu guide selected from a plurality of menu guides together defining a media program information space segmented by daypart, wherein the menu guide is associated with a first daypart selected from a group consisting of:

a morning daypart from 6 AM to 10 AM;
a daytime daypart from 10 AM to 4 PM;
a fringe daypart from 4 PM to 8 PM;
a primetime daypart from 8 PM to 12 PM;
a late night daypart from 12 PM to 2 AM; and
an early morning daypart from 2 AM to 6 AM; and providing the menu guide, the menu guide comprising a menu guide content portion presenting media program information regarding media programs consisting of all of the media programs scheduled to be available during the first daypart on a channel consisting of the active channel.

89. The method of claim 88, wherein the dayparts are periods of during which viewers characteristically view media programs, the media programs related to as to infer which other media programs the viewers would be interested in viewing.

90. The method of claim 88, wherein the menu guide further comprises a channel portion separate from the menu guide content portion indicating the active channel.

91. The method of claim 88, wherein the menu guide further comprises a picture in guide (PIG) portion, wherein the PIG portion presents media program information regarding the media program currently provided on the active channel.

92. The method of claim 88, wherein the menu guide content portion comprises:

a plurality of portions of the media program information, each portion describing a respective one of the media programs scheduled to be available during the first daypart on the active channel.

93. The method of claim 88, wherein the menu guide further comprises an advertising content portion separate from the menu guide content portion having advertising content determined by a provider of the media program provided on the active channel.

94. The method of claim 93, wherein the advertising content is contextually related to the media program provided on the active channel.

95. The method of claim 93, wherein the advertising content is determined according to user preferences.

96. The method of claim 93, wherein the advertising content is determined according to user viewing habits.

97. The method of claim 88, wherein the media program information is wrappably scrollable in daypart increments in a time dimension and scrollable in a channel dimension.

98. The method of claim 88, further comprising the steps of:

accepting a selection of a second daypart from the media program information space; and providing a second menu guide, the second menu guide comprising the menu guide content portion presenting media program information describing media programs consisting of all of the media programs scheduled to be available on the active channel during the second daypart.

99. The method of claim 98, wherein the step of accepting a selection of a second daypart from the media program information space comprises the steps of:

activating the menu guide content portion of the menu guide for navigation; and accepting a selection of a media program scheduled to be available on an active channel during the second daypart.

100. The method of claim 88, further comprising the steps of:

accepting a command to designate a second channel as the active channel; and modifying the first menu guide content portion to present media program information describing media programs consisting of all of the media programs scheduled to be available on the second channel during the first daypart.

101. The method of claim 100, wherein the menu guide further comprises a channel portion indicating an active channel and selectable channels, and the step of accepting a command to designate a second channel as the active channel comprises the steps of:

accepting a command to activate the channel portion of the menu guide; and accepting a command to designate one of the selectable channels as the active channels.

102. An apparatus for providing media program information describing media programs, comprising:

a receiver, having:

a tuner for receiving the media program and the media program information, a processor, communicatively coupled to the tuner;

for accepting a command via an input device to select an active channel from a plurality of selectable channels wherein the active channel is a channel to which the receiver is tuned, and for accepting a command via the input device to provide a menu guide selected from a plurality of menu guides together defining a media program information space segmented by daypart, wherein the menu guide is associated with a first daypart selected from a group comprising a morning daypart from 6 AM to 10 AM, a daytime daypart from 10 AM to 4 PM, a fringe daypart from 4 PM to 8 PM, a primetime daypart from 8 PM to 12 PM and a late night daypart from 12 PM to 2 AM, and for providing the menu guide, the menu guide having a menu guide content portion presenting media program information regarding media programs consisting of all of the media programs scheduled to be available during the first daypart on the active channel.

103. The apparatus of claim 102, wherein the dayparts are periods of time during which viewers characteristically view media programs, the media programs related to as to infer which other media programs the viewers would be interested in viewing.

104. The apparatus of claim 102, wherein:

the input device further accepts a command to select one of the plurality of media programs available during the first daypart on the active channel; and the processor further presents media program information further describing the selected one of the media programs.

105. The apparatus of claim 102, wherein the menu guide further comprises an advertising content portion having advertising content.

106. The apparatus of claim 105, wherein the advertising content is determined by a provider of the media program provided on the active channel.

107. The apparatus of claim 105, wherein the advertising content is contextually related to the media program provided on the active channel.

108. The apparatus of claim 105, wherein the advertising content is determined according to user preferences.

109. The apparatus of claim 105, wherein the advertising content is determined according to user viewing habits.

110. The apparatus of claim 105, wherein the advertising content is determined according to the first daypart.

111. The apparatus of claim 102, wherein the media program information is wrappably scrollable in daypart increments in a time dimension and scrollable in a channel dimension.

112. The apparatus of claim 102, wherein:

the input device further accepts a selection of a second daypart from the media program information space; and the processor further provides a second menu guide in response to the selection of the second daypart from the media program information space, the second menu guide comprising the menu guide content portion presenting media program information describing media programs consisting of all of the media programs scheduled to be available on the active channel during the second daypart.

113. The apparatus of claim 102, wherein:

the input device further accepts a command to designate a second channel as the active channel; and the processor further modifies the first menu guide content portion to present media program information describing media programs consisting of all of the media programs to be available on the second channel during the first daypart.

114. A method of presenting advertising in a menu guide, comprising the steps of:

accepting advertising media content and a media program from a media content provider;

providing the media program information to a subscriber on an active channel to which a receiver is currently tuned; and providing a menu guide selected from a plurality of menu guides together defining a media program information space segmented by daypart selected from a group consisting of:

a morning daypart from 6 AM to 10 AM;

a daytime daypart from 10 AM to 4 PM;

a fringe daypart from 4 PM to 8 PM;

a primetime daypart from 8 PM to 12 PM;

a late night daypart from 12 PM to 2 AM; and an early morning daypart from 2 AM to 6 AM;

wherein the menu guide includes a menu guide content portion presenting media program information for media programs consisting of all of the media programs scheduled to be available on the active channel during a daypart selected from a current daypart and a selected daypart.

* * * * *